US012772133B2

(12) United States Patent
Barac et al.

(10) Patent No.: US 12,772,133 B2
(45) Date of Patent: Oct. 20, 2026

(54) HANDLING CONFIGURATIONS IN SOURCE INTEGRATED ACCESS BACKHAUL (IAB) DONOR DURING TEMPORARY TOPOLOGY ADAPTATIONS

(71) Applicant: Telefonaktiebolaget LM Ericsson (publ), Stockholm (SE)

(72) Inventors: Filip Barac, Huddinge (SE); Ritesh Shreevastav, Upplands Väsby (SE); Marco Belleschi, Solna (SE); Ajmal Muhammad, Sollentuna (SE); Jose Luis Pradas, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 377 days.

(21) Appl. No.: 18/553,814

(22) PCT Filed: May 19, 2022

(86) PCT No.: PCT/SE2022/050489
§ 371 (c)(1),
(2) Date: Oct. 3, 2023

(87) PCT Pub. No.: WO2022/245273
PCT Pub. Date: Nov. 24, 2022

(65) Prior Publication Data

US 2024/0187953 A1 Jun. 6, 2024

Related U.S. Application Data

(60) Provisional application No. 63/190,727, filed on May 19, 2021.

(51) Int. Cl.
*H04W 36/22* (2009.01)
*H04W 36/08* (2009.01)
(Continued)

(52) U.S. Cl.
CPC ......... *H04W 36/22* (2013.01); *H04W 36/087* (2023.05); *H04W 36/324* (2023.05); *H04W 84/042* (2013.01); *H04W 88/085* (2013.01)

(58) Field of Classification Search
CPC . H04W 36/22; H04W 36/087; H04W 36/324; H04W 84/042; H04W 88/085;
(Continued)

(56) References Cited

U.S. PATENT DOCUMENTS

2022/0070740 A1* 3/2022 Futaki .............. H04W 36/0061
2023/0239754 A1* 7/2023 Barac ............... H04W 36/0088 370/331
(Continued)

FOREIGN PATENT DOCUMENTS

WO 2020067736 A1 4/2020
WO 2020164546 A1 8/2020
(Continued)

OTHER PUBLICATIONS

"3GPP TS 29.281 V15.6.0", 3rd Generation Partnership Project; Technical Specification Group Core Network and Terminals; General Packet Radio System (GPRS) Tunnelling Protocol User Plane (GTPv1-U) (Release 15), Sep. 2019, pp. 1-32.
(Continued)

*Primary Examiner* — Jae Y Lee
*Assistant Examiner* — Haeshil Jessica Choi
(74) *Attorney, Agent, or Firm* — Murphy, Bilak & Homiller, PLLC

(57) ABSTRACT

Embodiments include methods for a source donor centralized unit (CU) in an integrated access backhaul (IAB) wireless network. Such methods include determining that traffic between the source donor CU and a top-level IAB node in the wireless network needs to be offloaded to a target donor CU in the wireless network. Such methods include
(Continued)

sending, to one or more descendant nodes of the source donor CU, a first indication that at least one configuration for traffic between the source donor CU and at least one IAB node is suspended, in association with migration of the top-level IAB node from the source donor CU to the target donor CU. Other embodiments include complementary methods for a target donor CU and for an IAB node, as well as CUs and IAB nodes configured to perform such methods.

21 Claims, 18 Drawing Sheets

(51) Int. Cl.
*H04W 36/32* (2009.01)
*H04W 84/04* (2009.01)
*H04W 88/08* (2009.01)

(58) Field of Classification Search
CPC ... H04W 40/02; H04W 40/22; H04W 40/248; H04W 40/36; H04W 36/0016; H04W 84/047; H04W 92/20
USPC .......................................................... 370/254
See application file for complete search history.

(56) References Cited

U.S. PATENT DOCUMENTS

2023/0262827 A1* 8/2023 Liu ....................... H04W 76/20 370/329
2024/0031880 A1* 1/2024 Huang .................. H04L 5/0053

FOREIGN PATENT DOCUMENTS

| | | | |
|---|---|---|---|
| WO | 2020191768 | A1 | 10/2020 |
| WO | 2021026707 | A1 | 2/2021 |
| WO | 2022225440 | A1 | 10/2022 |

OTHER PUBLICATIONS

"3GPP TS 38.322 V16.2.0", 3rd Generation Partnership Project; Technical Specification Group Radio Access Network; NR; Radio Link Control (RLC) protocol specification (Release 16), Dec. 2020, pp. 1-33.
"3GPP TS 38.425 V15.6.0", 3rd Generation Partnership Project; Technical Specification Group Radio Access Network; NG-RAN; NR user plane protocol (Release 15), Jul. 2019, pp. 1-22.
"3GPP TS 38.463 V15.4.0", 3rd Generation Partnership Project; Technical Specification Group Radio Access Network; NG-RAN; E1 Application Protocol (E1AP) (Release 15), Jul. 2019, pp. 1-177.
"3GPP TS 38.473 V16.5.0", 3rd Generation Partnership Project; Technical Specification Group Radio Access Network; NG-RAN; F1 application protocol (F1AP) (Release 16), Apr. 2021, pp. 1-463.
"Agenda", 3GPP TSG-RAN WG3 #112-e, R3-211400, Online, May 17-27, 2021, pp. 1-18.
"Discussion on inter-donor IAB node migration procedure", 3GPP TSG-RAN WG3 #110-e, R3-205999, Online, Nov. 2-12, 2020, pp. 1-4.
"List of E-mail Discussions", 3GPP TSG-RAN WG3 #111-e, R3-210532, Online, Jan. 25-Feb. 4, 2021, pp. 1-24.
"3GPP TS 38.423 V16.5.0", 3rd Generation Partnership Project; Technical Specification Group Radio Access Network; NG-RAN; Xn application protocol (XnAP) (Release 16), Apr. 2021, pp. 1-461.
"3GPP TS 38.401 V15.6.0", 3rd Generation Partnership Project; Technical Specification Group Radio Access Network; NG-RAN; Architecture description (Release 15), Jul. 2019, pp. 1-46.
"3GPP TS 38.401 V16.5.0", 3rd Generation Partnership Project; Technical Specification Group Radio Access Network; NG-RAN; Architecture description (Release 16), Apr. 2021, pp. 1-79.
"3GPP TS 38.300 V16.5.0", 3rd Generation Partnership Project; Technical Specification Group Radio Access Network; NR; NR and NG-RAN Overall Description; Stage 2 (Release 16), Mar. 2021, pp. 1-151.
"3GPP TS 38.331 V16.4.1", 3rd Generation Partnership Project; Technical Specification Group Radio Access Network; NR; Radio Resource Control (RRC) protocol specification (Release 16), Mar. 2021, pp. 1-949.
"3GPP TR 38.806 V15.0.0", 3rd Generation Partnership Project; Technical Specification Group Radio Access Network; Study of separation of NR Control Plane (CP) and User Plane (UP) for split option 2; (Release 15), Dec. 2017, pp. 1-22.
"3GPP TR 38.874 V0.2.1", 3rd Generation Partnership Project; Technical Specification Group Radio Access Network; Study on Integrated Access and Backhaul; (Release 15), May 2018, pp. 1-19.
"3GPP TR 38.801 V14.0.0", 3rd Generation Partnership Project; Technical Specification Group Radio Access Network; Study on new radio access technology: Radio access architecture and interfaces (Release 14), Mar. 2017, pp. 1-91.
"3GPP TS 33.401 V15.8.0", 3rd Generation Partnership Project; Technical Specification Group Services and System Aspects; 3GPP System Architecture Evolution (SAE); Security architecture (Release 15), Jun. 2019, pp. 1-163.
"3GPP TS 23.501 V15.5.0", 3rd Generation Partnership Project; Technical Specification Group Services and System Aspects; System Architecture for the 5G System; Stage 2 (Release 15), Mar. 2019, pp. 1-241.
"Mitigation of packet loss", 3GPP TSG-RAN WG3 Meeting #110-e, R3-206209, Electronic Meeting, Nov. 2-13, 2020, pp. 1-3.
"Summary of Offline Discussion on Inter-donor Migration", 3GPP TSG-RAN WG3 Meeting #109-e, R3-205466, Online, Aug. 17-27, 2020, pp. 1-17.
"Necessity of flow control for various U-plane alternatives", 3GPP TSG RAN WG2 Meeting #83, R2-132443, Barcelona, Spain, Aug. 19-23, 2013, pp. 1-4.
"IAB Inter-donor Topology Adaptation", 3GPP TSG-RAN WG3 Meeting #112-e, R3-211724, Online, May 17-27, 2021, pp. 1-9.

* cited by examiner

HANDLING CONFIGURATIONS IN SOURCE INTEGRATED ACCESS BACKHAUL (IAB) DONOR DURING TEMPORARY TOPOLOGY ADAPTATIONS

TECHNICAL FIELD

The present application relates generally to the field of wireless communication networks, and more specifically to integrated access backhaul (IAB) networks in which the available wireless communication resources are shared between user access to the network and backhaul of user traffic within the network (e.g., to/from a core network).

INTRODUCTION

Currently the fifth generation ("5G") of cellular systems, also referred to as New Radio (NR), is being standardized within the Third-Generation Partnership Project (3GPP). NR is developed for maximum flexibility to support multiple and substantially different use cases. These include enhanced mobile broadband (eMBB), machine type communications (MTC), ultra-reliable low latency communications (URLLC), side-link device-to-device (D2D), and several other use cases.

FIG. 1 illustrates a high-level view of the 5G network architecture, consisting of a Next Generation RAN (NG-RAN) 199 and a 5G Core (5GC) 198. NG-RAN 199 can include one or more gNodeB's (gNBs) connected to the 5GC via one or more NG interfaces, such as gNBs 100, 150 connected via interfaces 102, 152, respectively. More specifically, gNBs 100, 150 can be connected to one or more Access and Mobility Management Functions (AMFs) in the 5GC 198 via respective NG-C interfaces. Similarly, gNBs 100, 150 can be connected to one or more User Plane Functions (UPFs) in 5GC 198 via respective NG-U interfaces. Various other network functions (NFs) can be included in the 5GC 198, including Session Management Function(s) (SMF).

Although not shown, in some deployments 5GC 198 can be replaced by an Evolved Packet Core (EPC), which conventionally has been used together with a Long-Term Evolution (LTE) Evolved UMTS RAN (E-UTRAN). In such deployments, gNBs 100, 150 can connect to one or more Mobility Management Entities (MMEs) in EPC 198 via respective S1-C interfaces. Similarly, gNBs 100, 150 can connect to one or more Serving Gateways (SGWs) in EPC via respective NG-U interfaces.

In addition, the gNBs can be connected to each other via one or more Xn interfaces, such as Xn interface 140 between gNBs 100 and 150. The radio technology for the NG-RAN is often referred to as "New Radio" (NR). With respect the NR interface to UEs, each of the gNBs can support frequency division duplexing (FDD), time division duplexing (TDD), or a combination thereof.

NG-RAN 199 is layered into a Radio Network Layer (RNL) and a Transport Network Layer (TNL). The NG-RAN architecture, i.e., the NG-RAN logical nodes and interfaces between them, is defined as part of the RNL. For each NG-RAN interface (NG, Xn, F1) the related TNL protocol and the functionality are specified. The TNL provides services for user plane transport and signaling transport. In some exemplary configurations, each gNB is connected to all 5GC nodes within an "AMF Region."

The NG RAN logical nodes shown in Figure include a Central Unit (CU or gNB-CU) and one or more Distributed Units (DU or gNB-DU). For example, gNB 100 includes gNB-CU 110 and gNB-DUs 120 and 130. CUs are logical nodes that host higher-layer protocols and perform various gNB functions such controlling the operation of DUs, which are decentralized logical nodes that host lower layer protocols and can include various subsets of the gNB functions. As such, each of the CUs and DUs can include various circuitry needed to perform their respective functions, including processing circuitry, transceiver circuitry (e.g., for communication), and power supply circuitry. Moreover, the terms "central unit" and "centralized unit" are used interchangeably herein, as are the terms "distributed unit" and "decentralized unit."

A gNB-CU connects to one or more gNB-DUs over respective F1 logical interfaces, such as interfaces 122 and 132 shown in FIG. 1. However, a gNB-DU can be connected to only a single gNB-CU. The gNB-CU and connected gNB-DU(s) are only visible to other gNBs and the 5GC as a gNB. In other words, the F1 interface is not visible beyond gNB-CU. F1 supports control plane (CP) and user plane (UP) separation into F1-AP and F1-U protocols, respectively, such that a gNB-CU may also be separated into CP and UP logical entities or functions (discussed below). Additionally, the F1 interfaces separates the RNL and the TNL.

The F1-U protocol is used to convey control information related to the user data flow management of data radio bearers (DRBs), as defined in 3GPP TS 38.425 (v15.6.0). F1-U protocol data is conveyed by the GTP-U protocol, more specifically by a "RAN Container" GTP-U extension header as defined in 3GPP TS 29.281 (v15.6.0). In other words, the GTP-U protocol over user datagram protocol (UDP) over Internet Protocol (IP) carries data streams on the F1 interface. A GTP-U "tunnel" between two nodes is identified in each node by tunnel endpoint identifier (TEID), an IP address, and a UDP port number. A GTP-U tunnel is necessary to enable forwarding packets between GTP-U entities.

Densification via the deployment of more and more base stations (e.g., macro or micro base stations) is one way to satisfy the increasing demand for bandwidth and/or capacity in mobile networks, which is mainly driven by the increasing use of video streaming services. Due to the availability of more spectrum in the millimeter wave (mmw) band, deploying small cells that operate in this band is an attractive deployment option for these purposes. However, the normal approach of connecting the small cells to the operator's backhaul network with optical fiber can end up being very expensive and impractical. Employing wireless links for connecting the small cells to the operator's network is a cheaper and more practical alternative.

One such approach is an integrated access backhaul (IAB) network where the operator can repurpose radio resources conventionally used for network access (e.g., by UEs) for use to connect small cells to the operator's backhaul network. IAB was studied earlier in 3GPP in the scope of LTE Rel-10. That work produced an architecture based on a Relay Node (RN) with the functionality of an LTE eNB and UE modem. The RN is connected to a donor eNB which has a S1/X2 proxy functionality hiding the RN from the rest of the network. That architecture enabled the Donor eNB to also be aware of the UEs behind the RN but hide any UE mobility between Donor eNB and connected RN(s) from the CN.

Similar IAB options can also be considered for 5G/NR networks. One difference compared to LTE is the gNB-CU/DU split architecture described above, which separates time critical RLC/MAC/PHY protocols from less time critical RRC/PDCP protocols. In general, the 3GPP NR IAB specifications reuse existing functions and interfaces defined in NR. Each IAB node can include the functionality of a gNB-DU (also referred to as "IAB-DU") that terminates the radio interface layers of access links towards served UEs and backhaul links towards immediately "downstream" IAB nodes.

Each IAB node can also include a Mobile-Termination function (referred to as MT or "IAB-MT") that terminates the radio interface layers of a backhaul link towards an immediately upstream (or "parent") DU, i.e., either an IAB-DU or a donor gNB. The MT functionality is similar to functionality that enables UEs to access the IAB network and has been specified by 3GPP as part of the Mobile Equipment (ME).

In addition to the connection to downstream IAB-MTs and/or UEs, each IAB-DU also has an upstream F1 connection to the CU part of a donor gNB, also referred to as an "IAB-donor CU". This connection is via a particular DU of the donor gNB, also referred to as an "IAB-donor DU". Each IAB-donor CU may be associated with multiple IAB-donor DUs, like the arrangement shown in FIG. 1.

SUMMARY

In some scenarios, an IAB node may need to be migrated (or moved) during operation such that its connection is handed over to a different parent DU, i.e., IAB-DU or IAB-donor DU. This new parent DU may be connected to the same IAB-donor DU, a different IAB-donor DU but the same IAB-donor CU, or different IAB-donor DU and CU. There are various problems, issues, and/or difficulties with IAB-node migration to a different IAB-donor CU.

Accordingly, embodiments of the present disclosure address these and other difficulties in integrating IAB nodes into a wireless network, thereby enabling the otherwise-advantageous deployment of IAB solutions.

Some embodiments of the present disclosure include methods (e.g., procedures) for a source donor centralized unit (CU) in an integrated access backhaul (IAB) wireless network.

These exemplary methods can include determining that the traffic between the source donor CU and a top-level IAB node in the wireless network needs to be offloaded to a target donor CU in the wireless network. These exemplary methods can also include sending, to one or more descendant nodes of the source donor CU, a first indication that at least one configuration for traffic between the source donor CU and at least one IAB node is suspended, in association with migration of the top-level IAB node from the source donor CU to the target donor CU.

In some embodiments, the first indication includes respective first identifiers of the at least one configuration (i.e., one identifier per configuration). In other embodiments, the first indication includes respective second identifiers of at least one descendant node that needs to be migrated to the target donor CU, with each configuration being associated with only one of the descendant nodes.

In some embodiments, the traffic between the source donor CU and the at least one IAB node, for which the at least one configuration is suspended, includes traffic between the source donor CU and any of the following:

- a DU part of the top-level IAB node;
- one or more IAB nodes that are descendant nodes of the top-level IAB node; and
- UEs served by the top-level IAB node or any of the descendent nodes.

In some embodiments, these exemplary methods can also include offloading the traffic to the target donor CU based on one of the following:

- a proxy-based migration in which the top-level IAB node's MT part migrates to the target donor CU, but F1 and RRC connections of top-level IAB node's DU part and of all descendant nodes of the top-level IAB node remain anchored at the source donor CU; or
- a full migration in which all F1 and RRC connections of the top-level IAB and of all descendant nodes of the top-level IAB node are migrated to the target donor CU.

In some embodiments, these exemplary methods can also include, after offloading the traffic to the target donor CU, determining that the traffic no longer needs to be offloaded to the target donor CU and sending, to the one or more descendant nodes, a second indication that that the at least one configuration is reactivated. In some of these embodiments, these exemplary methods can also include, in response to determining that the traffic no longer needs to be offloaded, sending to the target donor CU a third indication that the offloading is revoked.

In some embodiments, the descendant nodes of the source donor CU include the top-level IAB node and a source donor DU and the at least one configuration for the traffic between the source donor DU and the top-level IAB node includes any of the following:

- mapping configurations for downlink (DL) traffic at the source donor DU;
- mapping configurations for uplink (UL) traffic at the top-level IAB node; and
- Internet Protocol (IP) addresses used by the top-level IAB node.
- ingress-egress mapping configurations for backhaul radio link control (BH RLC) channels at the top-level IAB node; and
- backhaul adaptation protocol (BAP) routing tables at the top-level IAB node.

In some embodiments, the descendant nodes of the source donor CU also include one or more ancestor nodes of the top-level IAB node and the at least one configuration for the traffic between the source donor DU and the top-level IAB node also includes any of the following at the ancestor nodes of the top-level IAB node: ingress-egress mapping configurations for BH RLC channels, and BAP routing tables.

In some embodiments, the descendant nodes of the source donor CU also include one or more descendant nodes of the top-level IAB node and the at least one configuration for the traffic between the source donor DU and the top-level IAB node also includes any of the following used by the descendant nodes of the top-level IAB node: IP addresses, and cell resource configurations.

Other embodiments include methods (e.g., procedures) for a target donor CU in a wireless network.

These exemplary methods can include receiving, from a source donor CU in the wireless network, an indication that traffic between the source donor CU and a top-level IAB node in the wireless network needs to be offloaded to the target donor CU. These exemplary methods can also include migrating one or more descendant nodes of the source donor CU to the target donor CU such that the target donor CU handles the offloaded traffic. These exemplary methods can also include receiving, from the source donor CU, an indication that the offloading is revoked. In some embodiments, these exemplary methods can also include, based on the indication that the offloading is revoked, migrating the one or more descendant nodes from the target donor CU to the source donor CU such that the source donor CU handles the traffic for which the offloading was revoked.

In some embodiments, migrating the one or more descendant nodes of the source donor CU to the target donor CU is based on one of the following:

- a proxy-based migration in which the top-level IAB's mobile terminal (MT) part migrates to the target donor CU, but F1 and RRC connections of top-level IAB's distributed unit (DU) part and of all descendant nodes of the top-level IAB node remain anchored at the source donor CU; or
- a full migration in which all F1 and RRC connections of the top-level IAB and of all descendant nodes of the top-level IAB node are migrated to the target donor CU.

In some embodiments, the offloaded traffic includes traffic between the source donor CU and any of the following:

- a DU part of the top-level IAB node;
- one or more IAB nodes that are descendants of the top-level IAB node; and
- UEs served by the top-level IAB node or any of the descendant nodes.

Other embodiments include methods (e.g., procedures) for an IAB node a wireless network.

These exemplary methods can include receiving, from a source donor CU in the wireless network, a first indication that at least one configuration for traffic between the source donor CU and at least one IAB node is suspended, in association with migration of a top-level IAB node from the source donor CU to a target donor CU. These exemplary methods can also include suspending the at least one configuration in accordance with the first indication.

In some embodiments, these exemplary methods can also include receiving, from the source donor CU, a second indication that that the at least one configuration is reactivated and reactivate the at least one configuration in accordance with the second indication.

In some of these embodiments, these exemplary methods can also include the following operations: after or in conjunction with suspending the at least one configuration, performing a first migration from the source donor CU to the target donor CU such that the target donor CU handles the traffic between the source donor CU and the IAB node; and after or in conjunction with reactivating the at least one configuration, performing a second migration from the target donor CU to the source donor CU such that the source donor CU handles the traffic between the source donor CU and the IAB node according to the at least one configuration.

In some of these embodiments, the IAB node is the top-level IAB node, and the first migration is a proxy-based migration in which the top-level IAB node's MT part migrates to the target donor CU, but F1 and RRC connections of top-level IAB node's DU part and of all descendant nodes of the top-level IAB node remain anchored at the source donor CU. In other of these embodiments, the IAB node is the top-level IAB node or a descendant node of the top-level IAB node, and the first migration is a full migration in which all F1 and RRC connections of the top-level IAB node and of all descendant nodes of the top-level IAB node are migrated to the target donor CU.

In some embodiments, the first indication includes respective first identifiers of the at least one configuration (i.e., one identifier per configuration). In other embodiments, the first indication includes respective second identifiers of at least one descendant node that needs to be migrated to the target donor CU, with each configuration being associated with only one of the descendant nodes.

In some embodiments, the IAB node is the top-level IAB node and the at least one configuration includes a configuration for traffic between the source donor CU and the (top-level) IAB node. This configuration includes one or more of the following:

- mapping configurations for DL traffic at a source donor DU associated with the source donor CU;
- mapping configurations for UL traffic at the IAB node;
- IP addresses used by the IAB node;
- ingress-egress mapping configurations for BH RLC channels at the IAB node; and
- BAP routing tables at the IAB node.

In other embodiments, the IAB node is an ancestor node of the top-level IAB node and the at least one configuration includes a configuration for traffic between the source donor CU and the (ancestor) IAB node. This configuration includes one or more of the following at the (ancestor) IAB node: ingress-egress mapping configurations for BH RLC channels, and BAP routing tables.

In other embodiments, the IAB node is a descendant node of the top-level IAB node and the at least one configuration includes a configuration for traffic between the source donor CU and the (descendant) IAB node. This configuration includes one or more of the following used by the (descendant) IAB node: Internet Protocol (IP) addresses, and cell resource configurations.

In some embodiments, the traffic between the source donor CU and the top-level IAB node includes traffic between the source donor CU and any of the following:

- a DU part of the top-level IAB node;
- one or more IAB nodes that are descendant nodes of the top-level IAB node; and
- UEs served by the top-level IAB node or any of the descendant nodes.

Other embodiments include donor CUs (e.g., source and target) and IAB nodes (e.g., IAB-MT and IAB-DU) configured to perform operations corresponding to any of the exemplary methods described herein. Other embodiments also include non-transitory, computer-readable media storing computer-executable instructions that, when executed by processing circuitry, configure such donor CUs and IAB nodes to perform operations corresponding to any of the exemplary methods described herein.

These and other embodiments described herein can simplify and/or accelerate the revocation of inter-donor topology adaptation by avoiding the need to rebuild from scratch all configurations for serving traffic previously offloaded to another donor CU network and subsequently returned. For example, embodiments can reduce and/or eliminate excessive signaling traffic and node processing requirements associated with rebuilding such configurations according to conventional techniques. In this manner, embodiments can facilitate deployment and/or use of IAB architectures in wireless networks, which can reduce overall network deployment cost and/or improve coverage in certain bands (e.g., mmw).

These and other objects, features, and advantages of the present disclosure will become apparent upon reading the following Detailed Description in view of the Drawings briefly described below.

DETAILED DESCRIPTION

Figure 1:
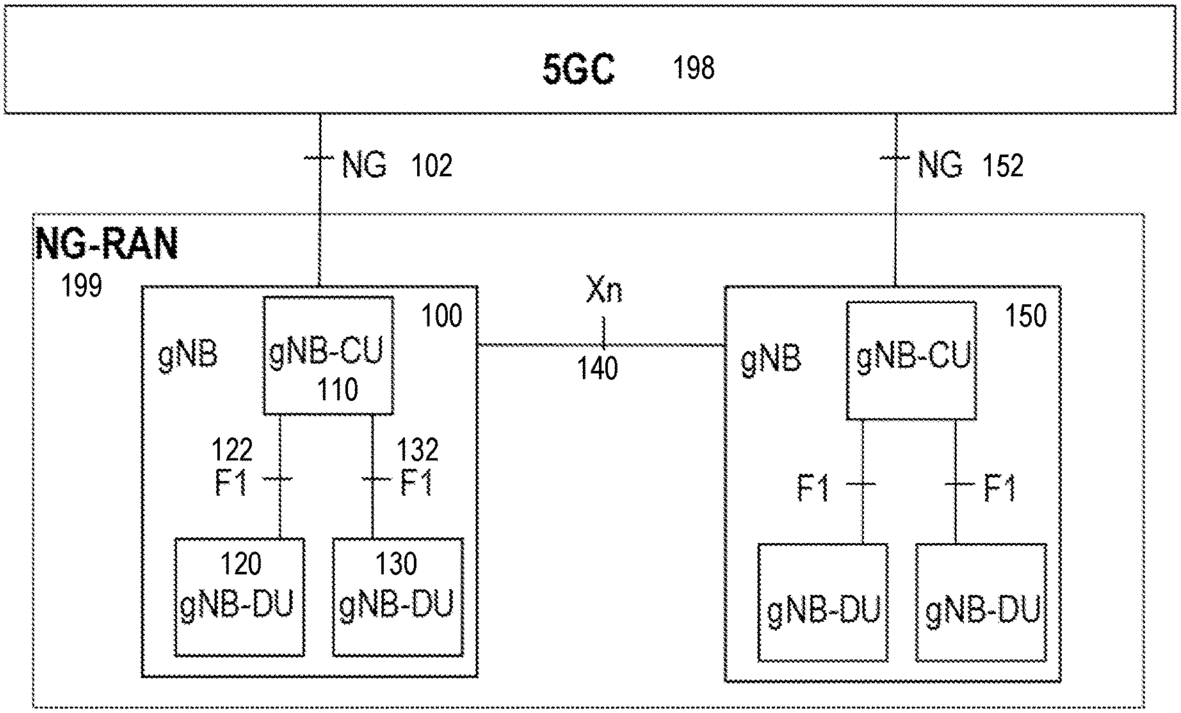
FIG. 1 shows a high-level view of an exemplary 5G network architecture.

Embodiments briefly summarized above will now be described more fully with reference to the accompanying drawings. These descriptions are provided by way of example to explain the subject matter to those skilled in the art and should not be construed as limiting the scope of the subject matter to only the embodiments described herein. More specifically, examples are provided below that illustrate the operation of various embodiments according to the advantages discussed above.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods and/or procedures disclosed herein do not have to be performed in the exact order disclosed, unless a step is explicitly described as following or preceding another step and/or where it is implicit that a step must follow or precede another step. Any feature of any of the embodiments disclosed herein can be applied to any other embodiment, wherever appropriate. Likewise, any advantage of any of the embodiments can apply to any other embodiments, and vice versa. Other objectives, features and advantages of the enclosed embodiments will be apparent from the following description.

Furthermore, the following terms are used throughout the description given below:

Radio Access Node: As used herein, a "radio access node" (or equivalently "radio network node," "radio access network node," or "RAN node") can be any node in a radio access network (RAN) of a cellular communications network that operates to wirelessly transmit and/or receive signals. Some examples of a radio access node include, but are not limited to, a base station (e.g., a New Radio (NR) base station (gNB) in a 3GPP Fifth Generation (5G) NR network or an enhanced or evolved Node B (eNB) in a 3GPP LTE network), base station distributed components (e.g., CU and DU), a high-power or macro base station, a low-power base station (e.g., micro, pico, femto, or home base station, or the like), an integrated access backhaul (IAB) node (or component thereof such as MT or DU), a transmission point, a remote radio unit (RRU or RRH), and a relay node.

Core Network Node: As used herein, a "core network node" is any type of node in a core network. Some examples of a core network node include, e.g., a Mobility Management Entity (MME), a serving gateway (SGW), a Packet Data Network Gateway (P-GW), an access and mobility management function (AMF), a session management function (AMF), a user plane function (UPF), a Service Capability Exposure Function (SCEF), or the like.

Wireless Device: As used herein, a "wireless device" (or "WD" for short) is any type of device that has access to (i.e., is served by) a cellular communications network by communicate wirelessly with network nodes and/or other wireless devices. Communicating wirelessly can involve transmitting and/or receiving wireless signals using electromagnetic waves, radio waves, infrared waves, and/or other types of signals suitable for conveying information through air. Unless otherwise noted, the term "wireless device" is used interchangeably herein with "user equipment" (or "UE" for short). Some examples of a wireless device include, but are not limited to, smart phones, mobile phones, cell phones, voice over IP (VOIP) phones, wireless local loop phones, desktop computers, personal digital assistants (PDAs), wireless cameras, gaming consoles or devices, music storage devices, playback appliances, wearable devices, wireless endpoints, mobile stations, tablets, laptops, laptop-embedded equipment (LEE), laptop-mounted equipment (LME), smart devices, wireless customer-premise equipment (CPE), mobile-type communication (MTC) devices, Internet-of-Things (IOT) devices, vehicle-mounted wireless terminal devices, mobile terminals (MTs), etc.

Radio Node: As used herein, a "radio node" can be either a "radio access node" (or equivalent term) or a "wireless device."

Network Node: As used herein, a "network node" is any node that is either part of the radio access network (e.g., a radio access node or equivalent term) or of the core network (e.g., a core network node discussed above) of a cellular communications network. Functionally, a network node is equipment capable, configured, arranged, and/or operable to communicate directly or indirectly with a wireless device and/or with other network nodes or equipment in the cellular communications network, to enable and/or provide wireless access to the wireless device, and/or to perform other functions (e.g., administration) in the cellular communications network.

Node: As used herein, the term "node" (without any prefix) can be any type of node that is capable of operating in or with a wireless network (including a RAN and/or a core network), including a radio access node (or equivalent term), core network node, or wireless device.

Parent Node: As used herein, the terms "parent node", "parent", and "parent IAB node" refer to a node immediately upstream from a particular IAB node in an IAB network (e.g., an IAB node one hop closer to a donor gNB). Even so, a parent node may be only one of the nodes upstream from the particular IAB node in the network, e.g., if there are multiple hops to a donor gNB.

Child node: As used herein, the terms "child node", "child", and "child IAB node" refer to a node immediately downstream from a particular IAB node (e.g., an IAB node one hop further from a donor gNB) in an IAB network. Even so, a child node may be only one of the nodes downstream from the particular IAB node in the network, e.g., if there are multiple hops to served UEs.

Note that the description given herein focuses on a 3GPP cellular communications system and, as such, 3GPP terminology or terminology similar to 3GPP terminology is generally used. However, the concepts disclosed herein are not limited to a 3GPP system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from the concepts, principles, and/or embodiments described herein.

In addition, functions and/or operations described herein as being performed by a wireless device or a network node may be distributed over a plurality of wireless devices and/or network nodes. Furthermore, although the term "cell" is used herein, it should be understood that (particularly with respect to 5G NR) beams may be used instead of cells and, as such, concepts described herein apply equally to both cells and beams.

As briefly mentioned above, an IAB node may need to be migrated (or moved) during operation such that its connection is handed over to a different parent node, i.e., IAB-DU or IAB-donor DU. This new parent node may be connected to the same IAB-donor DU, a different IAB-donor DU but the same IAB-donor CU, or a different IAB-donor CU. There are various problems, issues, and/or difficulties with IAB-node migration to a different IAB-donor CU. This is discussed in more detail below, after the following discussion of architectures and protocols.

Figure 2:
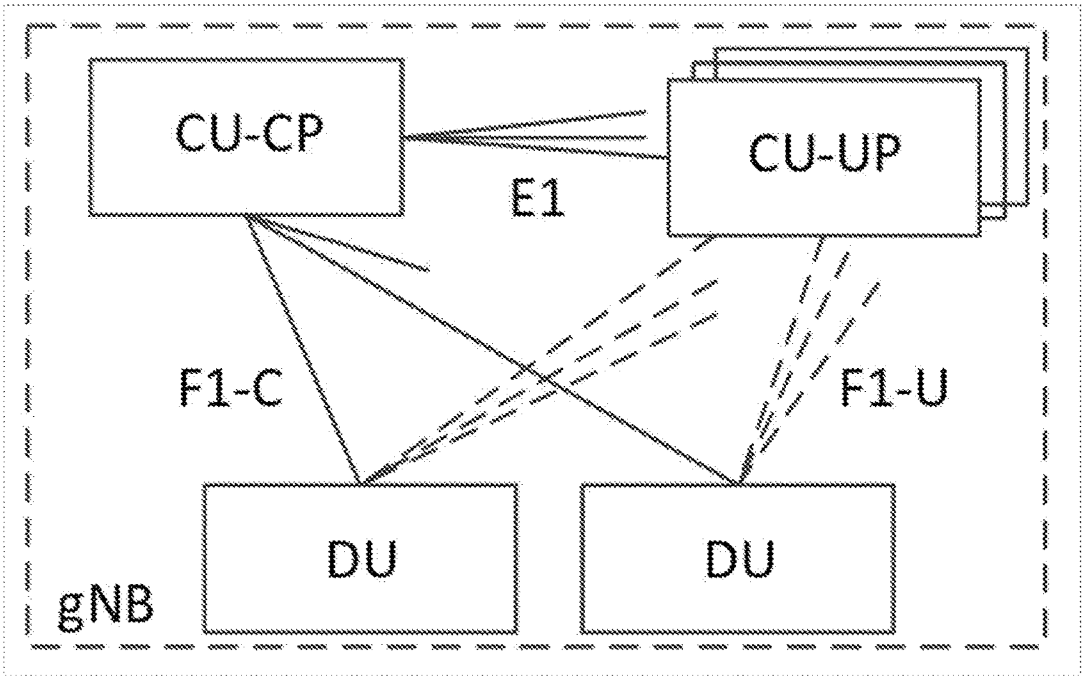
FIG. 2 shows control-plane (CP) and user-plane (UP) interfaces within the architecture shown in FIG. 1.

In the split node architecture shown in FIG. 1, centralized CP protocols (e.g., PDCP-C and RRC) can be hosted in a different CU than centralized UP protocols (e.g., PDCP-U). As mentioned above, a gNB-CU can be separated into a CU-CP function (including RRC and PDCP for SRBs) and CU-UP function (including PDCP for UP). FIG. 2 shows an exemplary gNB architecture that includes two DUs, a CU-CP, and one or more CU-UPs. As shown in FIG. 2, a single CU-CP can be associated with multiple CU-UPs in a gNB. The CU-CP and CU-UP communicate with each other using the E1-AP protocol over the E1 interface, as specified in 3GPP TS 38.463 (v15.4.0). Furthermore, the F1 interface between CU and DU (see FIG. 1) is functionally split into F1-C between DU and CU-CP and F1-U between DU and CU-UP. Three deployment scenarios for the split gNB architecture shown in FIG. 2 are defined in 3GPP TR 38.806 (v15.0.0):

Scenario 1: CU-CP and CU-UP centralized;

Scenario 2: CU-CP distributed and CU-UP centralized;

Scenario 3: CU-CP centralized and CU-UP distributed.

The RRC layer controls communications between a UE and a gNB at the radio interface, as well as the mobility of a UE between cells in the NGRAN. After a UE is powered ON it will be in the RRC_IDLE state until an RRC connection is established with the network, at which time the UE will transition to RRC_CONNECTED state (e.g., where data transfer can occur). The UE returns to RRC_IDLE after the connection with the network is released. In RRC_IDLE state, the UE does not belong to any cell, no RRC context has been established for the UE (e.g., in NG-RAN), and the UE is out of UL synchronization with the network. Even so, a UE in RRC_IDLE state is known in the 5GC and has an assigned IP address.

In RRC_IDLE state, the UE's radio is active on a discontinuous reception (DRX) schedule configured by upper layers. During DRX active periods (also referred to as "DRX On durations"), an RRC_IDLE UE receives system information (SI) broadcast by a serving cell, performs measurements of neighbor cells to support cell reselection, and monitors a paging channel for pages from the EPC via an eNB serving the cell in which the UE is camping.

A UE must perform a random-access (RA) procedure to move from RRC_IDLE to RRC_CONNECTED state. In RRC_CONNECTED state, the cell serving for the UE is known and an RRC context is established for the UE in the RAN node (e.g., gNB) serving the cell, such that the UE and RAN node can communicate. For example, a Cell Radio Network Temporary Identifier (C-RNTI)—a UE identity used for signaling between UE and network—is configured for a UE in RRC_CONNECTED state.

In addition to the RRC_IDLE and RRC_CONNECTED states, NR UEs also support an RRC_INACTIVE state. The main principle of RRC_INACTIVE state is that the UE can return to RRC_CONNECTED state as quickly and efficiently as possible. When the UE transitions to RRC_INACTIVE state, both the UE and the RAN store all the information necessary to quickly resume the connection. The message that transitions the UE to RRC_INACTIVE state contains a set of parameters for UE operation in RRC_INACTIVE state operation, such as a RAN Notification Area (RNA) within which the UE is allowed to move without notifying the network. Further, the message includes parameters needed for secure transition back to the RRC_CONNECTED state, such as a UE identifier and security information needed to support encrypted resume messages.

Figure 3:
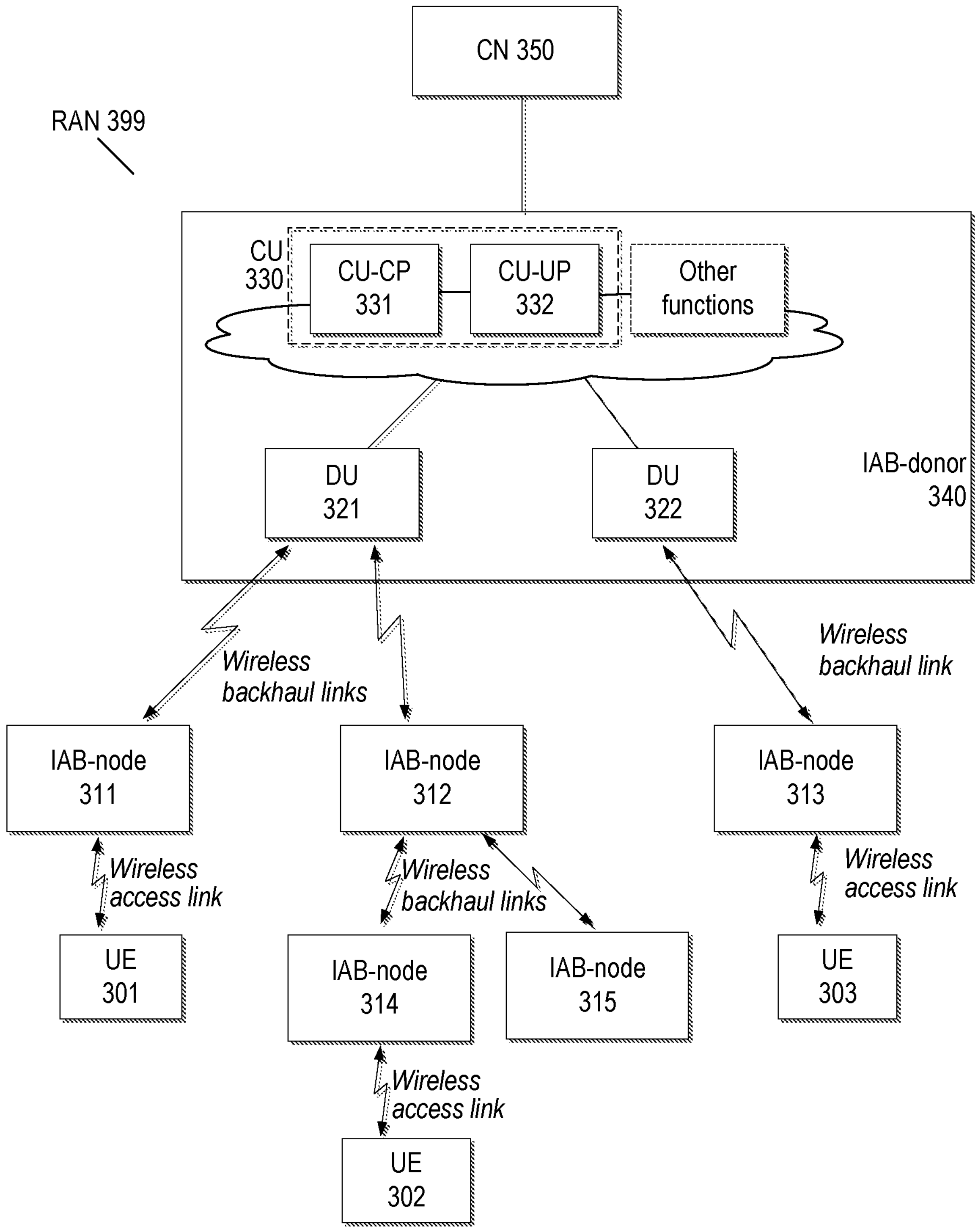
FIG. 3 shows an exemplary IAB network.

FIG. 3 shows a reference diagram for an IAB network in standalone mode, as further explained in 3GPP TR 38.874

(version 0.2.1). The IAB network shown in FIG. 3 includes one IAB-donor 340 and multiple IAB-nodes 311-315, all of which can be part of a radio access network (RAN 399) such as an NG-RAN. IAB donor 340 includes DUs 321, 322 connected to a CU 330, which is represented by functions CU-CP 331 and CU-UP 332. IAB donor 340 can communicate with core network (CN) 350 via the CU functionality shown.

Each of the IAB nodes 311-315 connects to the IAB-donor via one or more wireless backhaul links (also referred to herein as "hops"). More specifically, the Mobile-Termination (MT) function of each IAB-node 311-315 terminates the radio interface layers of a wireless backhaul link towards a corresponding "upstream" (or "northbound") DU function. This MT functionality is similar to functionality that enables UEs to access the IAB network and, in fact, has been specified by 3GPP as part of the Mobile Equipment (ME). However, IAB functionality is transparent to UEs, such that UEs are unaware if they are being served by a conventional gNB or an IAB-donor gNB via one or more intermediate IAB nodes.

In the context of FIG. 3, upstream DUs can include either DU 321 or 322 of IAB donor 340 and, in some cases, a DU function of an intermediate IAB node that is "downstream" (or "southbound") from IAB donor 340. As a more specific example, IAB-node 314 is downstream from IAB-node 312 and DU 321, IAB-node 312 is upstream from IAB-node 314 but downstream from DU 321, and DU 321 is upstream from IAB-nodes 312 and 314. The DU functionality of IAB nodes 311-315 also terminates the radio interface layers of wireless access links towards UEs (e.g., for network access via the DU) and wireless backhaul links towards other downstream IAB nodes. Accordingly, IAB-nodes 311, 313, and 314 can be considered "access IAB nodes" for UEs 301, 303, and 302, respectively, and that term will be used in the same manner hereinafter.

As shown in FIG. 3, IAB-donor 340 can be treated as a single logical node that comprises a set of functions such as gNB-DUs 321-322, gNB-CU-CP 331, gNB-CU-UP 332, and possibly other functions. In some deployments, the IAB-donor can be split according to these functions, which can all be either co-located or non-co-located as allowed by the 3GPP NG-RAN architecture. Also, some of the functions presently associated with the IAB-donor can be moved outside of the IAB-donor if such functions do not perform IAB-specific tasks.

In general, the existing MT, gNB-DU, gNB-CU, UPF, AMF, and SMF as well as the corresponding interfaces NR Uu (between MT and gNB), F1, NG, X2 and N4 are used as baseline for the IAB architectures. For example, each IAB5U connects to the IAB-donor CU using a modified form of F1, which is referred to as F1*. The user-plane portion of F1* (referred to as "F1*-U") runs over RLC channels on the wireless backhaul between the MT on the serving IAB1nd the DU on the IAB donor.

Figure 4:
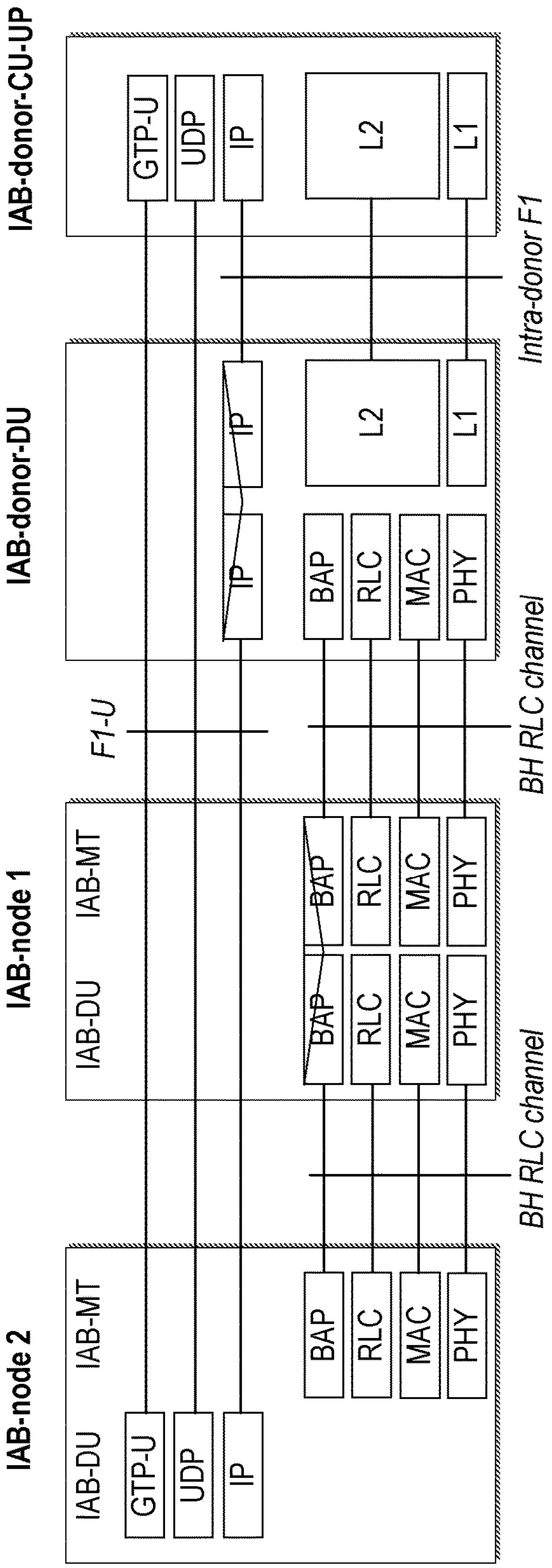
FIGS. 4-5 show exemplary IAB UP and CP protocol stacks, respectively.
Figure 5:
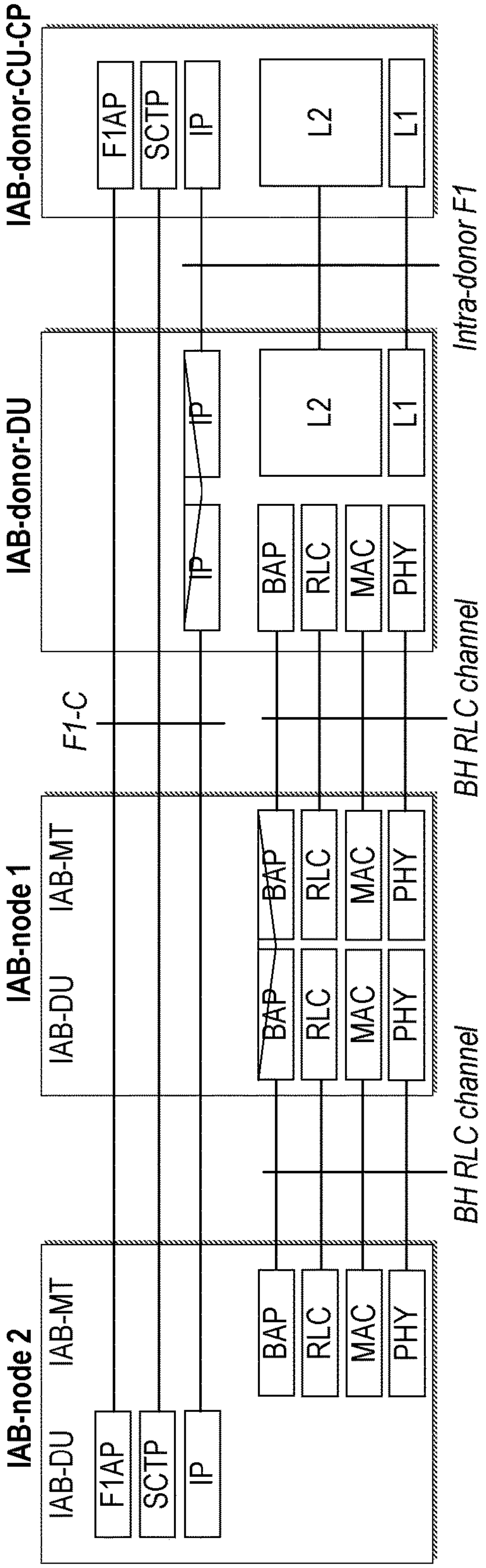

FIGS. 4-5 show exemplary IAB user plane (UP) and control plane (CP) protocol stacks, respectively, as defined in 3GPP Rel-16. As shown in these figures, the chosen protocol stacks reuse the current CU-DU split specified in 3GPP Rel-15. The full F1-U interface (GTP-U/UDP/IP) and the full F1-C interface (F1-AP/SCTP/IP) are terminated at the IAB node like a conventional DU. Network Domain Security (NDS) can be used to protect both UP and CP traffic: IPsec for UP, datagram transport layer security (DTLS) for CP. IPsec could also be used for the CP protection instead of DTLS.

A new Backhaul Adaptation Protocol (BAP) layer has been introduced in the IAB nodes and the IAB donor. The BAP layer routes packets to the appropriate downstream/upstream node. The BAP layer also maps UE bearer data to the proper backhaul RLC channel (also referred to herein as "backhaul RLC bearers"), as well as between ingress and egress backhaul RLC channels in intermediate IAB nodes. In particular, a node is a receiver on its ingress BH RLC channels and a transmitter on its egress BH RLC channels, irrespective of whether the direction is upstream or downstream in the IAB network. In contrast, communications between a UE and its access IAB node takes place over "access RLC channels."

The BAP layer can be configured to satisfy the end to end QoS requirements of bearers. On the IAB-node, the BAP sublayer contains one BAP entity at the MT function and a separate collocated BAP entity at the DU function. On the IAB-donor-DU, the BAP sublayer contains only one BAP entity. Each BAP entity has a transmitting part and a receiving part. Each transmitting part of a BAP entity on one end of a backhaul link has a corresponding receiving part of a BAP entity at the other end of the backhaul link across the backhaul link (e.g., in an IAB-node or an IAB-donor-DU, as the case may be).

In general, a BAP sublayer expects lower layers per RLC entity to provide acknowledged or unacknowledged data transfer service for BAP SDUs. In addition, the BAP sublayer supports the following functions:

- Data transfer;
- Determination of BAP destination and path for packets from upper layers;
- Determination of egress BH RLC channels for packets routed to next hop;
- Routing of packets to next hop;
- Differentiating traffic to be delivered to upper layers from traffic to be delivered to egress link; and
- Flow control feedback and polling signaling.

For the downstream direction, the BAP sublayer determines whether the packet has reached its final destination, in which case the packet will be transmitted to UEs for which the IAB node is an access node. In this case, the BAP layer passes the packet to higher layers in the IAB node which are in charge of mapping the packet to the various QoS flows and hence DRBs which are included in the packet. Otherwise, the IAB node will forward it to another IAB node in the right path. If the BAP sublayer determines that the packet has not reached its final destination, the BAP sublayer determines the proper egress BH RLC channel on the basis of the BAP destination, path IDs, and ingress BH RLC channel. Similar routing techniques are applied in the upstream direction, with the final destination being a specific donor DU/CU.

For these operations, the BAP layer must be configured with a routing table mapping ingress RLC channels to egress RLC channels, which may be different depending on the specific BAP destination and path of the packet. Hence, the BAP destination and path ID are included in the header of the BAP packet so that the BAP layer can determine where to forward the packet. Additionally, the BAP layer is involved in hop-by-hop flow control. For example, a child node can inform the parent node about possible congestions experienced locally at the child node, so that the parent node can throttle the traffic towards the child node. The parent node can also use the BAP layer to inform the child a node in case of radio link failure (RLF) issues experienced by the parent, so that the child can possibly re-establish its connection to another parent node.

Figure 6:
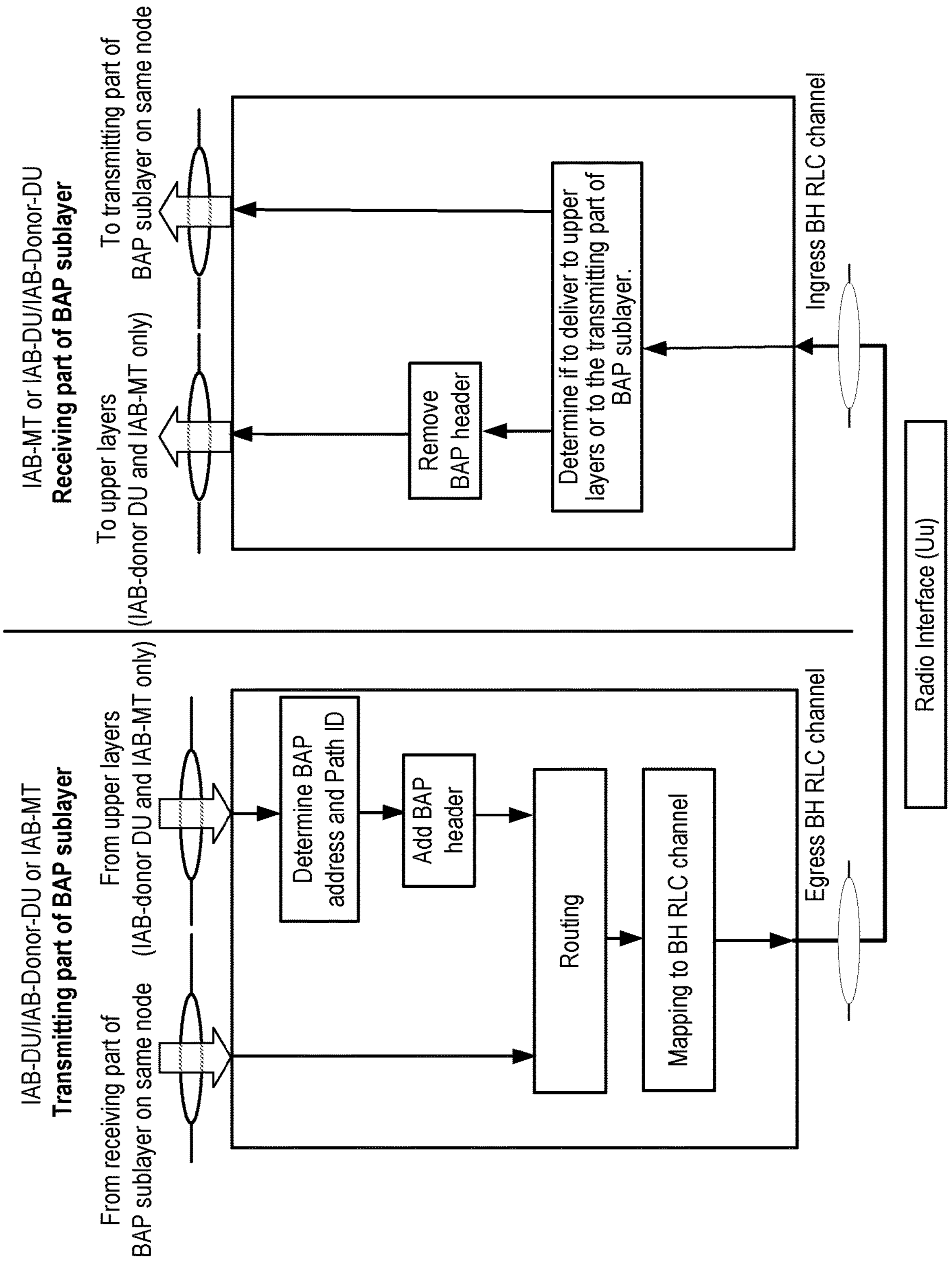
FIG. 6 shows an exemplary view of IAB backhaul adaptation protocol (BAP) sub-layer.

FIG. 6 shows an exemplary functional view of the IAB BAP sublayer, based on the radio interface protocol architecture defined in 3GPP TS 38.300. In the example of FIG. 6, the receiving part on the BAP entity delivers BAP PDUs (e.g., received on an ingress BH RLC channel) to the transmitting part on the BAP entity in the same node (e.g., MT to DU or vice versa). Likewise, the receiving part may deliver BAP SDUs to the transmitting part on the BAP entity in the same node (e.g., for transmission on an egress BH RLC channel). When passing BAP SDUs, the receiving part removes the BAP PDU header and the transmitting part adds the BAP header with the same BAP routing ID as carried on the BAP PDU header prior to removal. Passing BAP SDUs in this manner is therefore functionally equivalent to passing BAP PDUs, in implementation.

Figure 7:
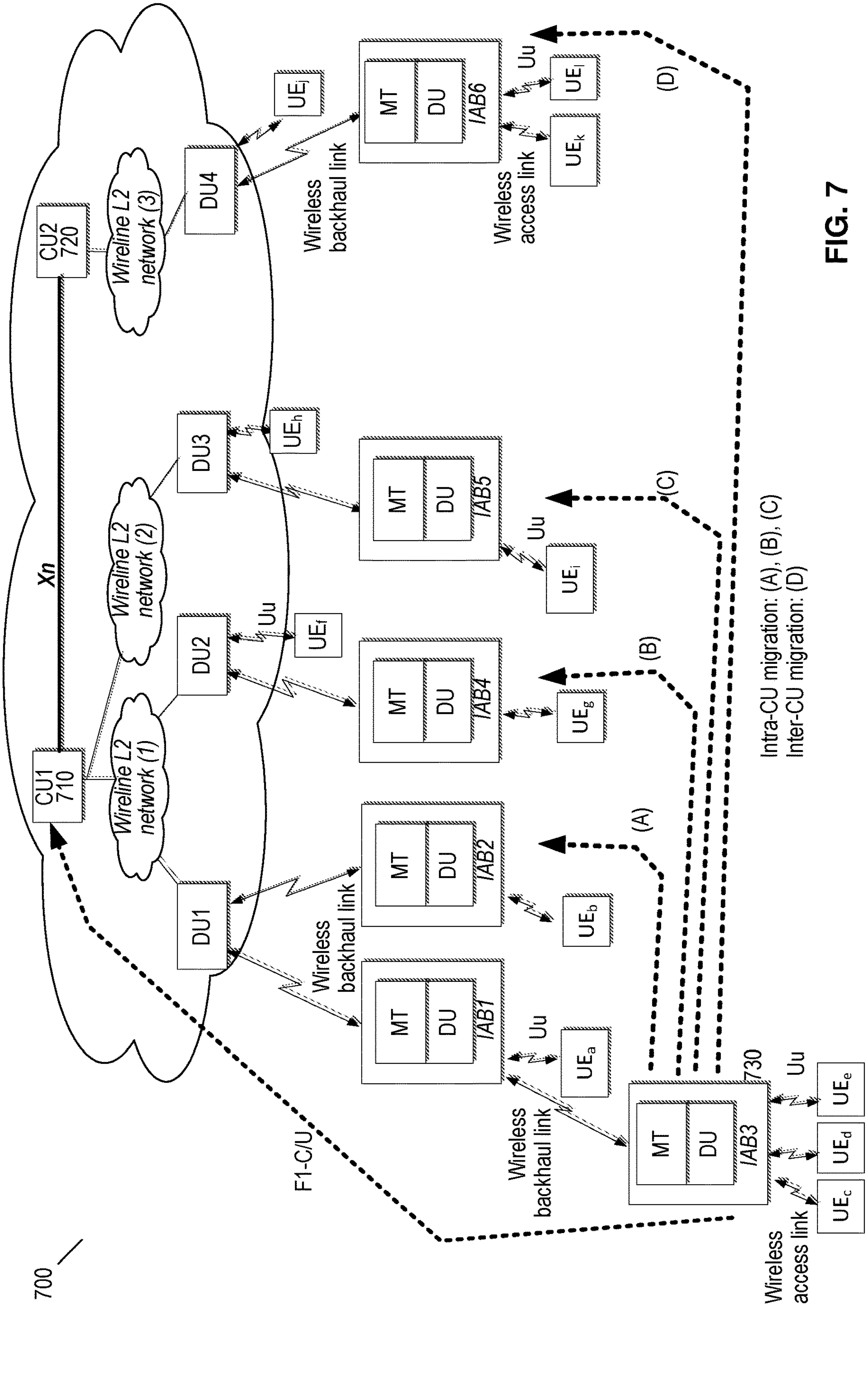
FIG. 7 illustrates four different IAB node migration scenarios, labelled A-D.
Figure 8A:
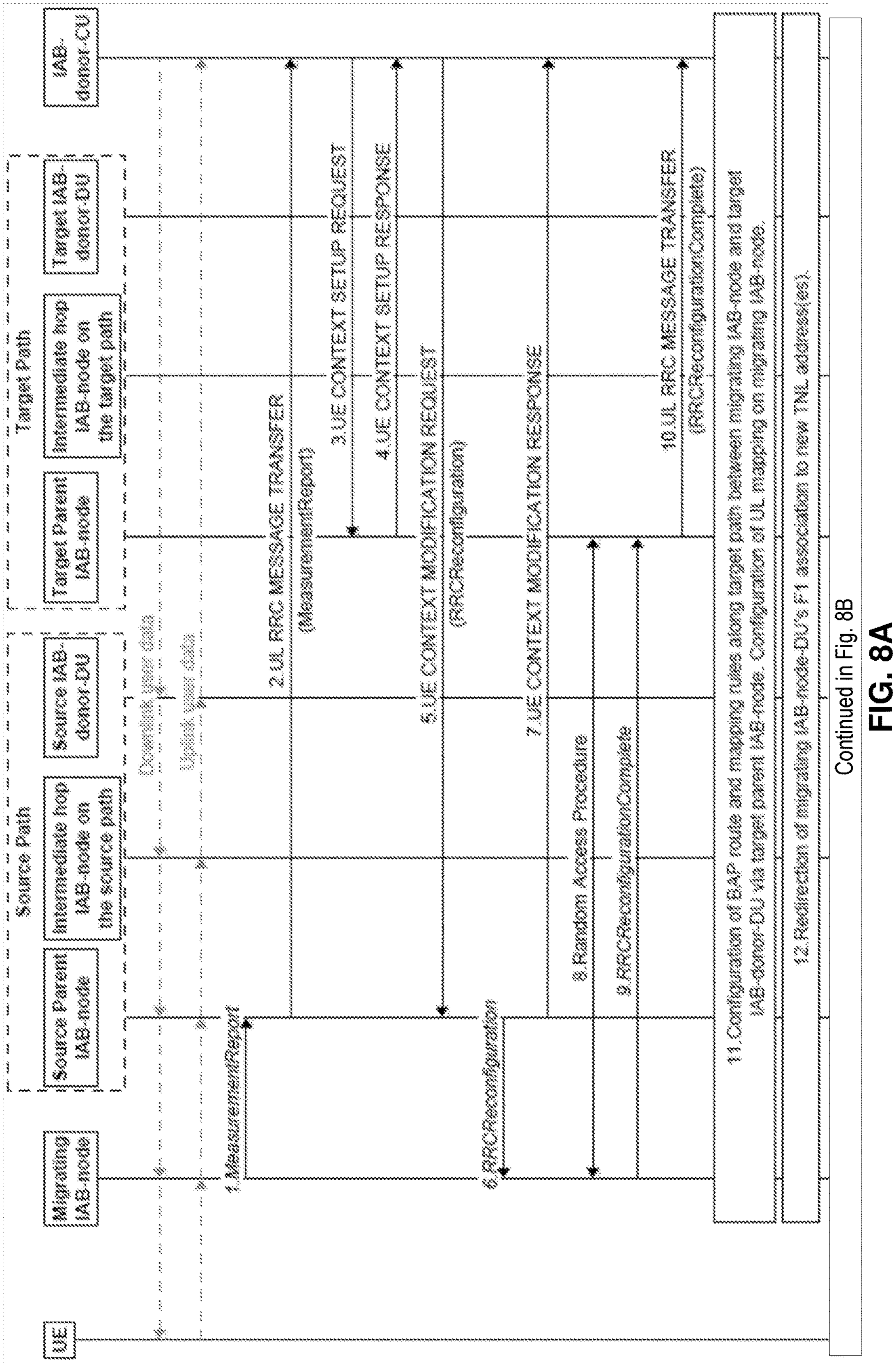
FIG. 8 shows an exemplary intra-CU topology adaptation procedure in which the target parent IAB-node uses a different IAB-donor-DU than the source parent IAB-node.
Figure 8B:
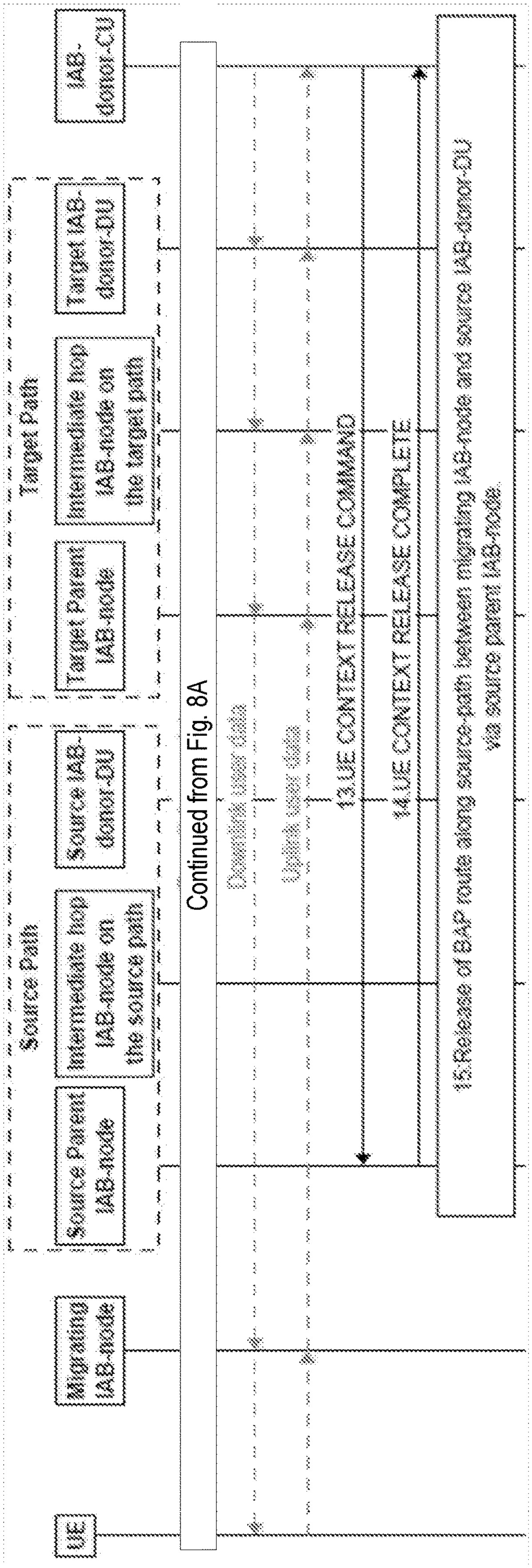

FIG. 7 illustrates four different IAB node migration scenarios, labelled A-D. These are described below in order of complexity. In all scenarios, the migrating IAB node (IAB3, designated 730) serves three different UEs, labelled UEc, UEd, and UEe.

In scenario A ("intra donor-DU"), IAB3 and its served UEs are moved to a new parent node, IAB2, that is under the same IAB-donor DU, i.e., DU1 (710). A successful intra-donor DU migration requires establishing UE context setup for IAB3's MT in the DU of new parent node IAB2, updating routing tables of IAB nodes along the path to IAB3, and allocating resources on the new path. The IP address for IAB3 will not change, but the F1-U tunnel/connection between donor CU1 (710) and IAB3's DU will be redirected through IAB2.

In scenario B ("intra donor-CU"), IAB3 and its served UEs are moved to a new parent node, IAB4, that is under a different IAB donor DU, DU2, but under the same donor CU1. The procedural requirements and/or complexity is the same as scenario A, discussed above. Also, since the new IAB donor DU (DU2) is connected to the same L2 network, migrating IAB3 can use the same IP address under new donor DU2. However, new donor DU2 will need to inform the network using IAB3's L2 address in order to get/keep the same IP address for IAB3, e.g., by employing some mechanism such as Address Resolution Protocol (ARP).

Scenario C is an "intra-donor CU" migration similar to scenario B, but new donor DU3 is connected to donor CU1 through a different wireline layer 2 (L2) network. As such, allocation of new IP address for IAB3 is required. If IPsec is used for the F1-U tunnel/connection between the donor-CU1 and IAB3's DU, then it might be possible to use an existing IP address along the path segment between donor CU1 and a security gateway (SeGW), and a new IP address for the IPsec tunnel between the SeGW and IAB3's DU.

In scenario D ("inter-CU", "inter-donor", or "inter-donor-CU"), IAB3 and its served UEs are moved to a new parent node, IAB6, that is under a different donor DU, DU4, and a different donor CU, CU2 (720). This is the most complicated scenario in terms of procedural requirements, which are beyond the scope of 3GPP Rel-16 specifications.

Considering that inter-CU migration will be an important feature of IAB Rel-17, enhancements to existing procedure are needed to reduce service interruption and signaling load for inter-CU migration of IAB-nodes. One possible use case is inter-donor load balancing, such as when a link between an IAB node and its parent becomes congested. In this case, the traffic of the entire network branch including the IAB node (herein referred to as the top-level IAB node) and its downstream (or descendant) nodes may be redirected to reach the top-level IAB node via another route. If the new route for the offloaded traffic includes traversing the network under another donor before reaching the top-level IAB node, the scenario is called "inter-donor routing". The offloaded traffic may include the traffic terminated at the top-level IAB node and its served UEs, and/or the traffic traversing the top-level IAB node and terminated at its descendant IAB nodes and UEs. The MT of the top-level IAB node ("top-level IAB-MT") may establish an RRC connection to another donor and release its RRC connection to the previous donor, and the traffic towards this node and its descendant devices is now sent via the new donor.

Another possible use case is inter-donor RLF recovery, where a top-level IAB node experiencing an RLF on its parent link attempts RRC reestablishment towards a new parent under another donor. According to 3GPP agreements, if the descendant IAB nodes and UEs of the top-level IAB node "follow" to the new donor, the parent-child relations are retained after the top-level IAB node connects to another donor.

The above use cases assume that the top-level IAB node's IAB-MT can connect to only one donor at a time. However, Rel-17 work will also consider the case where the top-level IAB-MT can simultaneously connect to two donors. For load balancing, the traffic reaching the top-level IAB node via one leg may be offloaded to reach the top-level IAB node (and, potentially, its descendant nodes) via the other leg that the node established to another donor. For RLF recovery, the traffic reaching the top-level IAB node via the broken leg can be redirected to reach the node via the "good" leg, towards the other donor.

3GPP Rel-17 specifications will allow two alternative solutions inter-donor topology adaptation that are currently under discussion in 3GPP. In a full migration solution, all the F1 and RRC connections of a top-level IAB node and its descendants and UEs are migrated to the new donor. In a proxy-based migration solution, based on the assumption that a top-level IAB-MT is capable of connecting to only one donor at a time, the top-level IAB-MT migrates to a new donor while the F1 and RRC connections of its collocated IAB-DU and all the descendant IAB-MTs, IAB-DUs, and UEs remain anchored at the old donor, even after inter-donor topology adaptation. Note that the proxy-based migration solution is also applicable in case when the top-level IAB-MT is simultaneously connected to two donors. In this case, some or all of the traffic traversing/terminating at the top-level IAB node is offloaded via the leg towards the other donor. The proxy-based migration may also be referred to as a "partial migration".

Using the topology shown in FIG. 7 as an example, one drawback of the full migration-based solution for inter-CU migration is that a new F1 connection must be set up from migrating IAB3 to CU2 and the old F1 connection to CU1 must be released. Releasing and relocating the F1 connection will impact all UEs (i.e., UEc, UEd, and UEe) and any descendant IAB nodes (and their served UEs) in at least two ways. First, it will cause a service interruption for the UEs and IAB nodes served by the top-level IAB node e since these UEs may need to re-establish their connection or to perform handover operation. This is the case even if they remain under the same IAB node, since 3GPP security principles mandate a key refresh whenever the serving CU/gNB is changed (e.g., at handover or reestablishment). In such case, an RRCReconfiguration with reconfigurationWithSync has to be sent to each UE. Second, it will cause a "signaling storm" when a large number of UEs, IAB-MTs and IAB-DUs have to perform re-establishment or handover at the same time.

In addition, it is preferrable to avoid any reconfiguration of descendant nodes of a top-level IAB node. In other words, the descendant nodes should preferably be unaware that the traffic is carried via CU2.

The proxy-based (or partial) migration solution addresses the above problems by providing inter-CU migration without handing over the UEs or IAB nodes directly or indirectly being served by the top-level IAB node, thereby making the handover of the directly and indirectly served UEs transparent to the target CU. In particular, only the RRC connection of the top-level IAB node is migrated to the target CU, while the CU-side termination of its F1 connection as well as the CU-side terminations of the F1 and RRC connections of its directly and indirectly served IAB nodes and UEs are kept at the source CU. In other words, the target donor CU serves as the proxy for these F1 and RRC connections that are kept at the source donor CU.

In this case, the target donor CU just needs to ensure that the ancestor node of the top-level IAB node is properly configured to handle the traffic from the top-level IAB node to the target donor, and from the target donor to the top-level IAB node. The configuration of the descendant IAB nodes of the top-level IAB node is still under the control of the source donor CU. As such, the target donor CU does not need to know the network topology and the QoS requirements or the configuration of the descendant IAB nodes and UEs.

Figure 9:
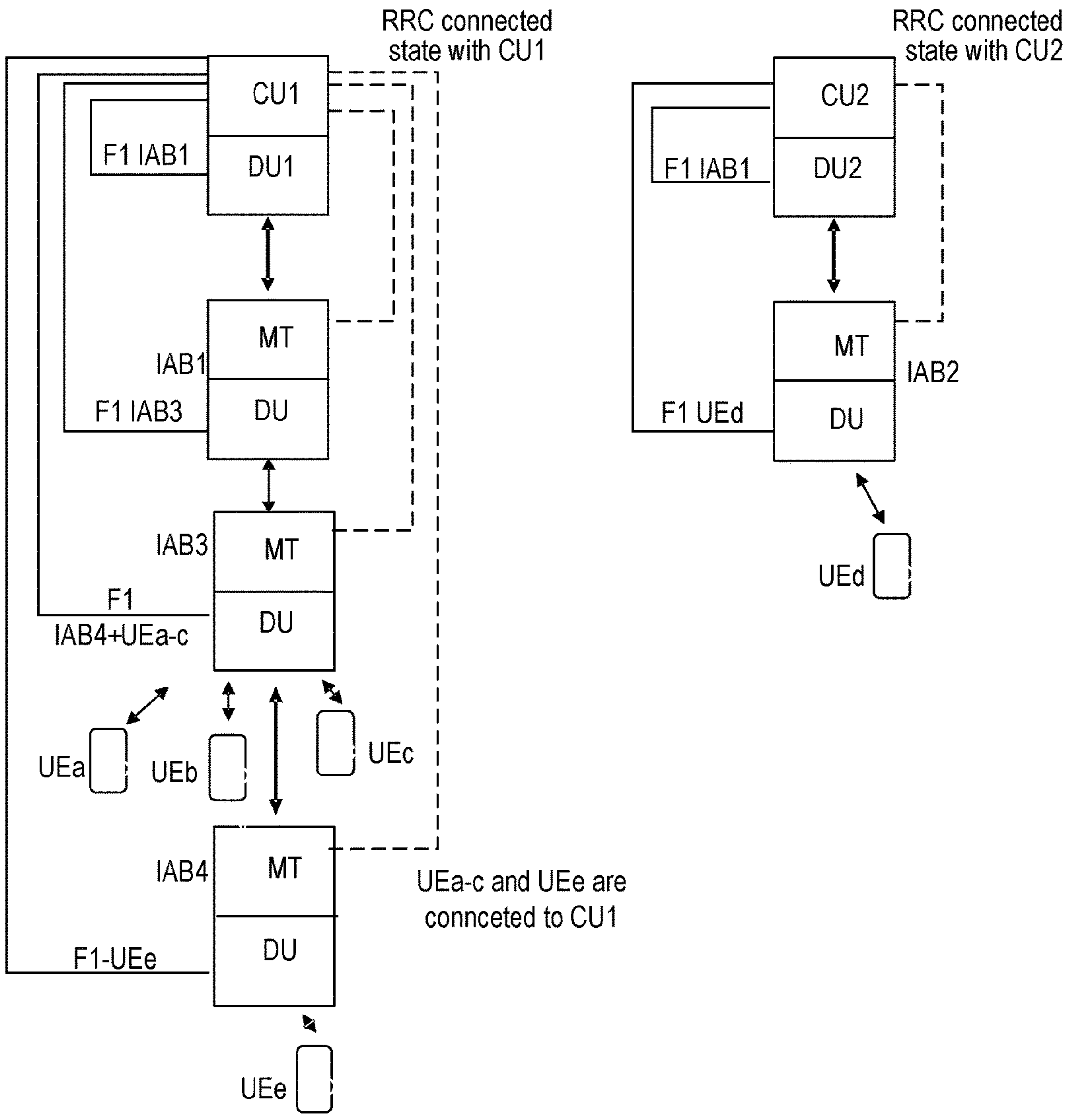
FIGS. 9-10 illustrate various aspects of IAB node migration between donor CUs.
Figure 10:
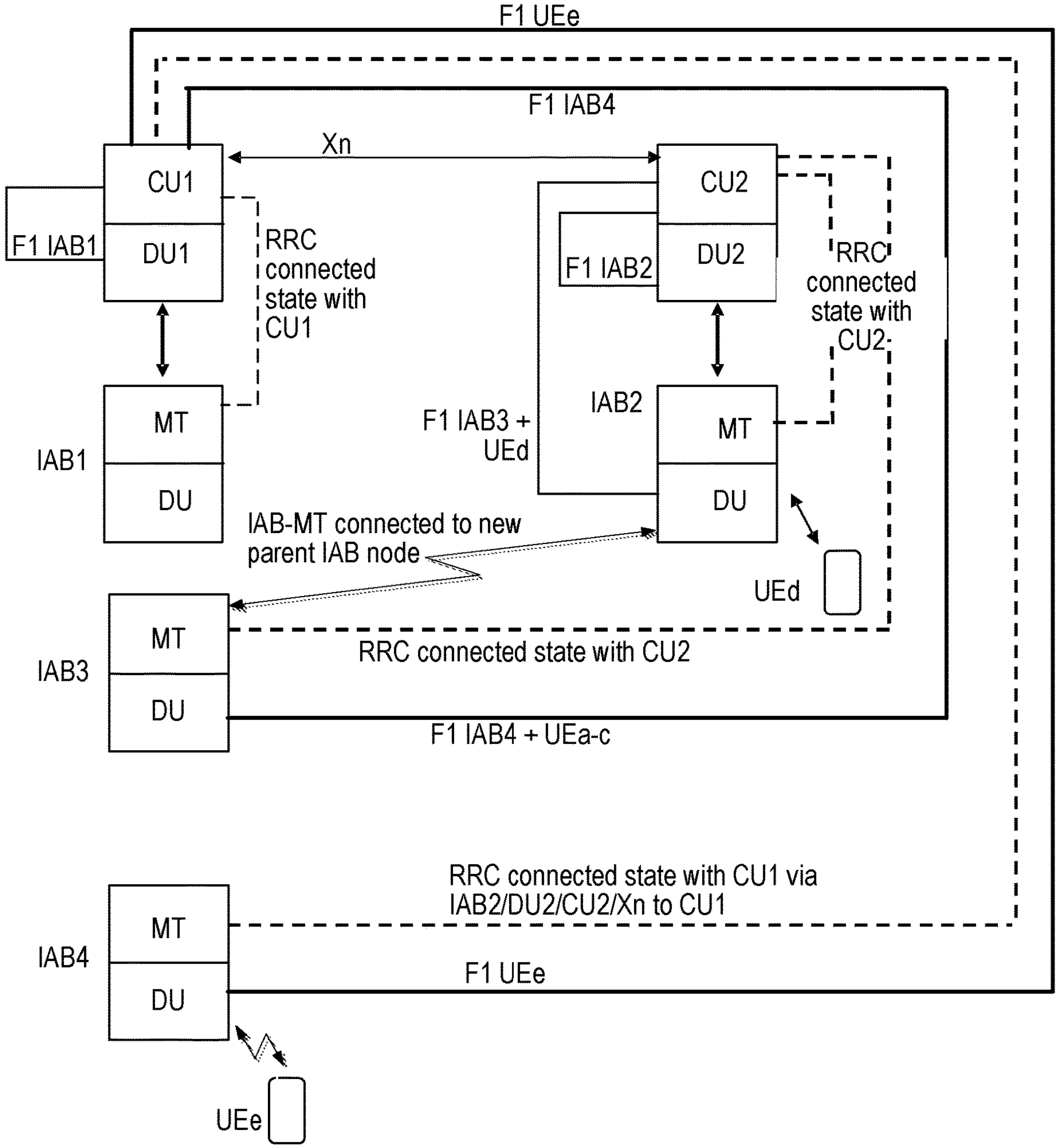

FIG. 9 illustrates the signalling connections when the F1 connections are maintained in donor CU1, while FIG. 10 illustrates how the F1-U interface is tunnelled over the Xn interface between CU1 and CU2 and then transparently forwarded to IAB donor DU2 after IAB node 4 is migrated to target donor CU2.

Figure 11:
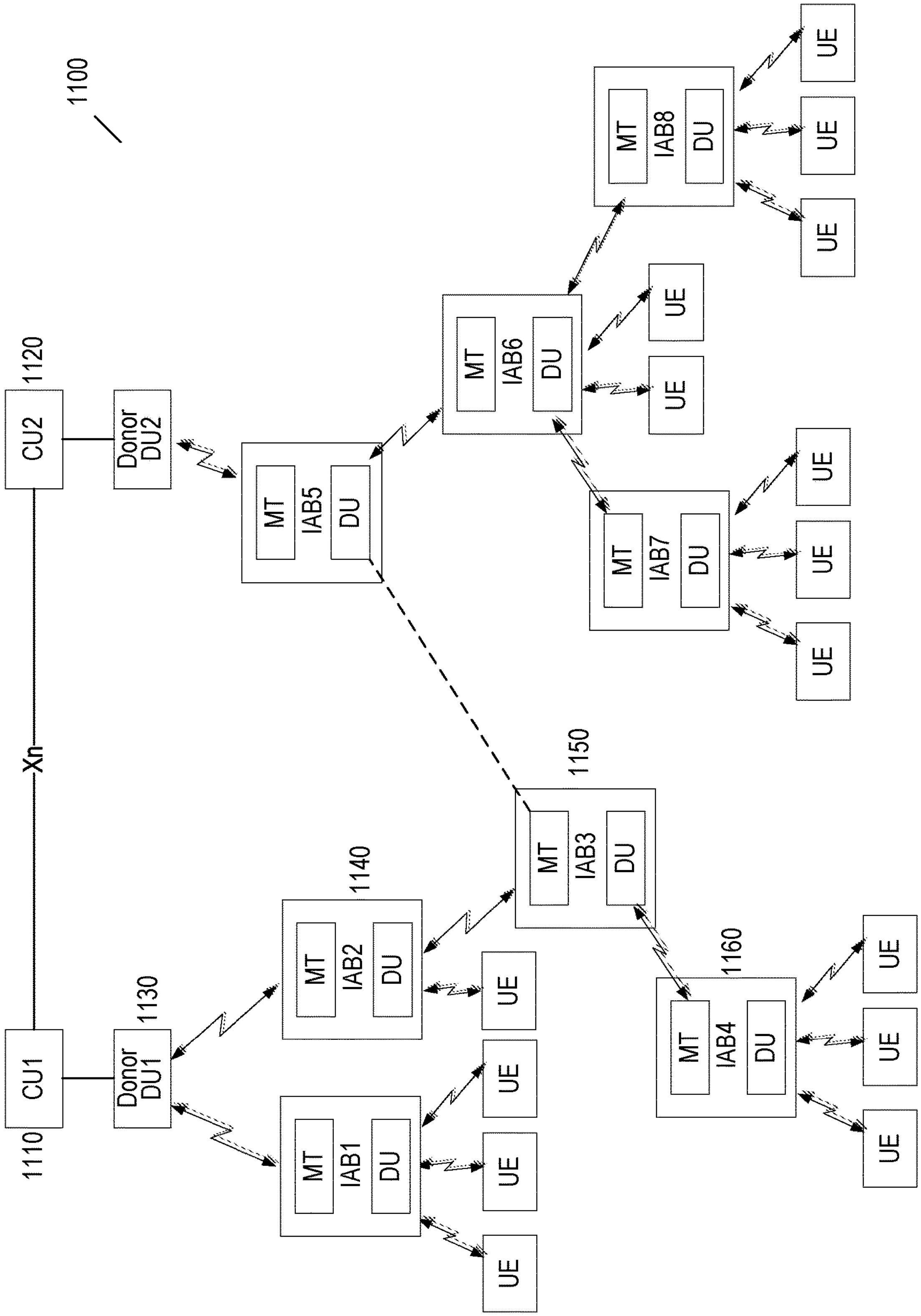
FIG. 11 shows an exemplary inter-donor CU load balancing scenario.

FIG. 11 shows an exemplary inter-donor load balancing scenario in an IAB network (1100), involving IAB3 (1150), its ancestors Donor DU1 (1130) and IAB2 (1140), its descendant IAB4 (1160), and the UEs that IAB3 and IAB4 serve. The proxy-based migration solution can be applied to the scenario shown in FIG. 11 as follows. Initially, IAB3-MT changes its RRC connection from CU1 (1110) to CU2 (1120), which are connected via an Xn interface. Meanwhile, the RRC connections of IAB4-MT and all the UEs served by IAB3 and IAB4, as well as the F1 connections of IAB3-DU and IAB4-DU, remain anchored at CU1 rather than being moved to CU2. However, the corresponding traffic of these connections is sent to/from IAB3/IAB4 and their served UEs using a path via CU2 and Donor DU2. In this manner, the traffic previously sent from source donor CU1 to the top-level IAB node (IAB3) and its descendants (e.g., IAB4) is offloaded ("proxied") via CU2. The old traffic path from CU1 to IAB4 is changed from CU1/Donor DU1/IAB2/IAB3/IAB4 to CU1/Donor DU2/IAB5/IAB3/IAB4, for load balancing purposes.

One assumption here is that direct rather than indirect routing is applied between CU1 and Donor DU2. For example, direct routing can be via IP routing between source donor CU1 and target donor DU2, or via an Xn connection between the two. In indirect routing, data can be sent between CU1 and CU2 via Xn interface, and between CU2 and Donor DU2 via F1 or IP routing. Although both direct and indirect routing are applicable, an advantage of direct routing is that the latency is usually smaller.

Handovers in NR can be considered "break-before-make" since the connection to the source cell is released before the connection to the target cell is established. As such, NR handovers involve a short interruption (e.g., 10-40 ms) during which no data can be exchanged between the UE and the network. A "make-before-break" (MBB) handover was introduced in LTE Rel-14 to significantly reduce handover interruption time. With MBB, the UE releases the connection with the source cell before the connection with the target cell is ready for packet transmission/reception resulting in interruption time of ~5 ms minimum. Even so, the timing for when a connection with a source cell is released to initiate re-tuning for connection to the target cell is UE implementation-specific.

To shorten this interruption time further, a MBB Dual Active Protocol Stacks (DAPS) handover was introduced for NR and LTE in Rel-16. In DAPS handover the UE maintains a connection with a source cell while a connection to the target is established. DAPS handover reduces the handover interruption but comes at the cost of increased UE complexity, since the UE must simultaneously receive from/transmit to two cells. However, a UE with a dual Tx/Rx can potentially support inter-frequency DAPS handovers.

Figure 12:
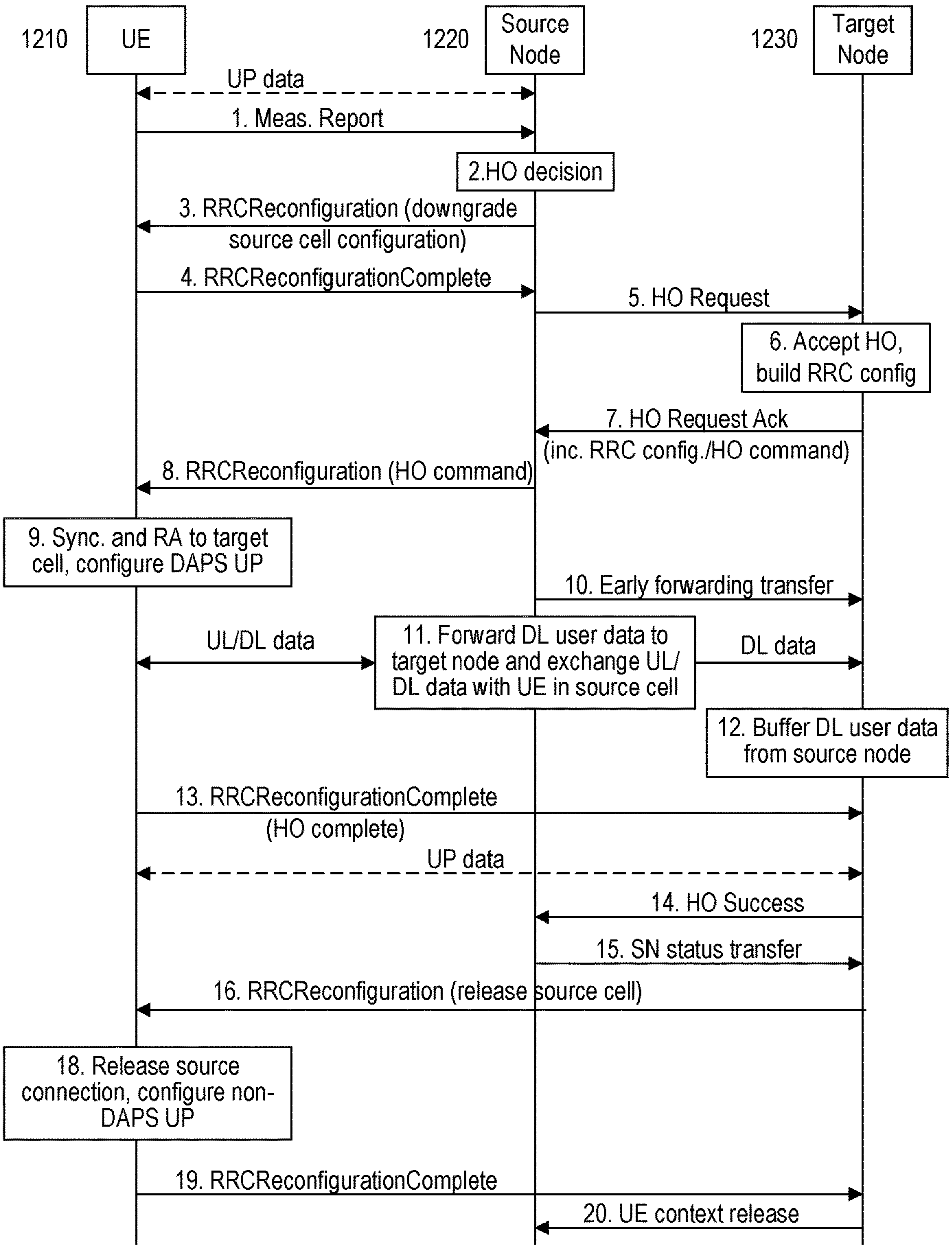
FIG. 12 illustrates an exemplary signaling flow between a UE, a source node, and a target node during a dual-active protocol stack (DAPS) handover in a wireless network.

FIG. 12 illustrates an exemplary signaling flow between a UE (1210), a source node (1220, e.g., source gNB), and a target node (1230, e.g., target gNB) during a DAPS handover procedure in an NR network. Although the operations are shown in FIG. 12 with numerical labels, these are intended to facilitate explanation rather than to imply any strict ordering of the operations, unless specifically stated in the following description.

Initially, the UE and source node have an established connection and are exchanging user data. The source node receives measurement reports from the UE (operation 1), makes a handover decision based on these reports (e.g., operation 2).

In order to avoid exceeding UE capabilities during a DAPS handover when the UE is simultaneously connected to both source and target nodes, the source node may need to reconfigure (also known as "downgrade") the UE's source cell configuration before triggering the DAPS handover. This can be done in operation 3 by sending an RRCReconfiguration message to the UE with a downgraded source cell configuration. An example of downgrading is to release SCGs, release SCells, release multi-TRP transmission/reception, etc. After the UE has applied the new configuration, it responds with a RRCReconfigurationComplete message (operation 4).

In operation 5, the source node sends a HO Request message to the target node with necessary information to prepare the DAPS handover at the target side. The information includes, e.g., the current (now downgraded) source configuration and some UE capabilities. In operation 6, the target node accepts the HO request and builds an RRC configuration for UE operation in the target cell. In operation 7, the target node responds with an acknowledgement message that includes a HO command (e.g., an RRCReconfiguration message) to be sent to the UE. The HO command includes information needed by the UE to access the target cell, e.g., random access configuration, new C-RNTI assigned by target node, and security parameters enabling the UE to calculate a target security key so it can send the HO complete message (e.g., an RRCReconfigurationComplete message). The HO command also indicates which DRBs to configure for DAPS handover.

In operation 8, the source node sends the UE the HO command (in RRCReconfiguration message containing reconfigurationWithSync field) received from the target node in operation 7. The HO command includes an indication to perform a DAPS handover, e.g., by indicating which data radio bearers (DRBs) to configure for DAPS handover. Upon reception of the handover command with indication of a DAPS handover, the UE starts synchronizing to the target cell (operation 9). For each DRBs to be configured for DAPS, the UE reconfigures the user plane protocol stack. Unlike in conventional HO, the UE keeps the connection in the source cell and continues to exchange UL/DL data with the source node even after it has received the HO command. In order to decrypt/encrypt DL/UL data, the UE needs to maintain both the source and target security keys until the source cell is released. The UE can differentiate the security key to be used based on the cell which the DL/UL packet is received/transmitted on. If header compression is used the UE also needs to maintain two separate RObust Header Compression (ROHC) contexts for the source and target cell.

In operation 10, the source node sends an EARLY FORWARDING TRANSFER message to the target node to convey the UE DL receiver status for early data transfer. In operation 11, the source node begins to forward DL data to the target node. In addition, the source node continues to exchange UL/DL data with the UE in the source cell. In other words, DL data to the UE may be duplicated by the source node. In operation 12, the target node buffers the DL data from the source node until the UE has connected with the target cell.

In operation 13, after the UE has completed random access to the target cell, the UE sends the HO complete message (a RRCReconfigurationComplete message) to the target node. After this point the UE receives DL data from both the source and target cells while UL data transmission is switched to the target cell. In operation 14, the target node sends a HO Success message to the source node indicating the UE has successfully established the target connection. In operation 15, upon reception of the handover success indication, the source node stops scheduling any further DL or UL data to the UE and sends a final SN STATUS TRANSFER message to target node indicating the latest PDCP SN and HFN transmitter and receiver status.

In operation 16, the target node instructs the UE to release the source connection by sending an RRCReconfiguration message with "release source cell" indication. In operation 17, the UE releases the source connection and reconfigures the UP protocol stack for not using DAPS ("non-DAPS"). In operation 18, the UE responds to the target node with an RRCReconfigurationComplete message. From this point on, the UE only exchanges DL and UL data in the target cell. Upon receipt of this message, the target node starts exchanging user data with the UE and requests the AMF to switch the UPF DL data path from the source node to the target node (not shown). Once the path switch is completed the target node sends a UE CONTEXT RELEASE message to the source node (operation 20).

Figure 13:
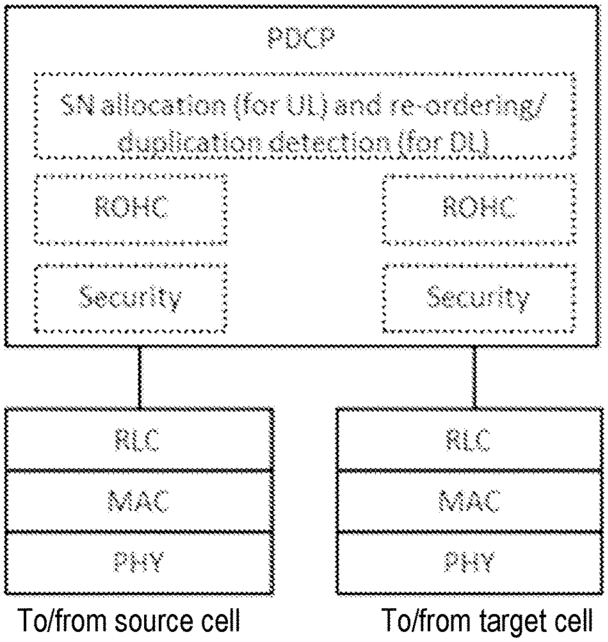
FIG. 13 shows an exemplary UE protocol stack for data radio bearers (DRBs) configured for DAPS handover.

FIG. 13 shows an exemplary UE protocol stack for DRBs that are configured for DAPS handover. Each DRB has an associated PDCP entity, now configured for DAPS, which in turn has two associated RLC entities—one for the source cell and one for the target cell. The PDCP entity uses different security keys and ROHC contexts for the source and target cells. However, the SN resource allocation (for UL transmission) and re-ordering/duplication detection (for DL reception) is common. Note that for NR, there is an additional protocol layer called SDAP on top of PDCP which is responsible for mapping QoS flows to bearers (not shown in FIG. 13).

Figure 14:
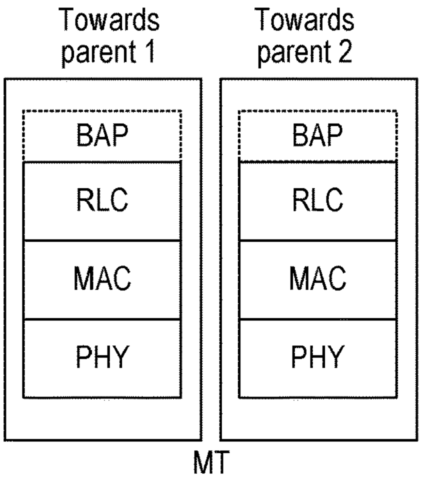
FIG. 14 shows an exemplary Dual IAB Protocol Stack (DIPS) arrangement.

Simultaneous connectivity of an IAB node to two donors can be based on a "DAPS-like" solution. FIG. 14 shows a Dual IAB Protocol Stack (DIPS) arrangement, which includes two independent protocol stacks (RLC/MAC/PHY), each connecting to a different CU. Each CU allocates its own resources (e.g., addresses, BH RLC channels, etc.) without the need for coordination, and configures each protocol stack. DIPS also includes one or two independent BAP entities with some common and some independent functionalities. The main difference from DAPS is the BAP entity(ies) instead of a PDCP layer. A set of BAP functions could be common, and another set of functions could be independent for each parent node.

DIPS can reduce complexity and/or improve performance in various ways. For example, each protocol stack can be configured independently using current signalling and procedures increasing robustness, although minimal signalling updates might be needed. Additionally, only the top-level IAB node is reconfigured while everything is transparent for other nodes and UEs that do not require any reconfiguration, resulting in decreasing signalling load and increasing robustness. As another example, DIPS eliminates service interruption since data can continue flowing over the initial link until the second is set-up. Furthermore, DIPS avoids the need of IP/BAP addresses and route IDs coordination between CUs, which reduces significantly the complexity and the network signalling.

When a first CU determines that load balancing is needed, the first CU starts the procedure requesting from a second CU some resources to offload part of the traffic of a top-level IAB node. The CUs can negotiate the configuration and the second CU will prepare the configuration to apply in the second protocol stack of the IAB-MT, the RLC backhaul channel(s), BAP address(es), etc. The top-level IAB-MT will use routing rules provided by the CU to route certain traffic to the first or the second CU. In the DL, the IAB-MT will translate the BAP addresses from the second CU to the BAP addresses from the first CU to reach the nodes under the control of the first CU.

As such, only the top-level IAB node (i.e., the IAB node from which traffic is offloaded) is affected and no other IAB nodes or UEs are aware of this situation. Furthermore, this procedure can be performed with only minor changes to current signalling procedures.

Figure 15:
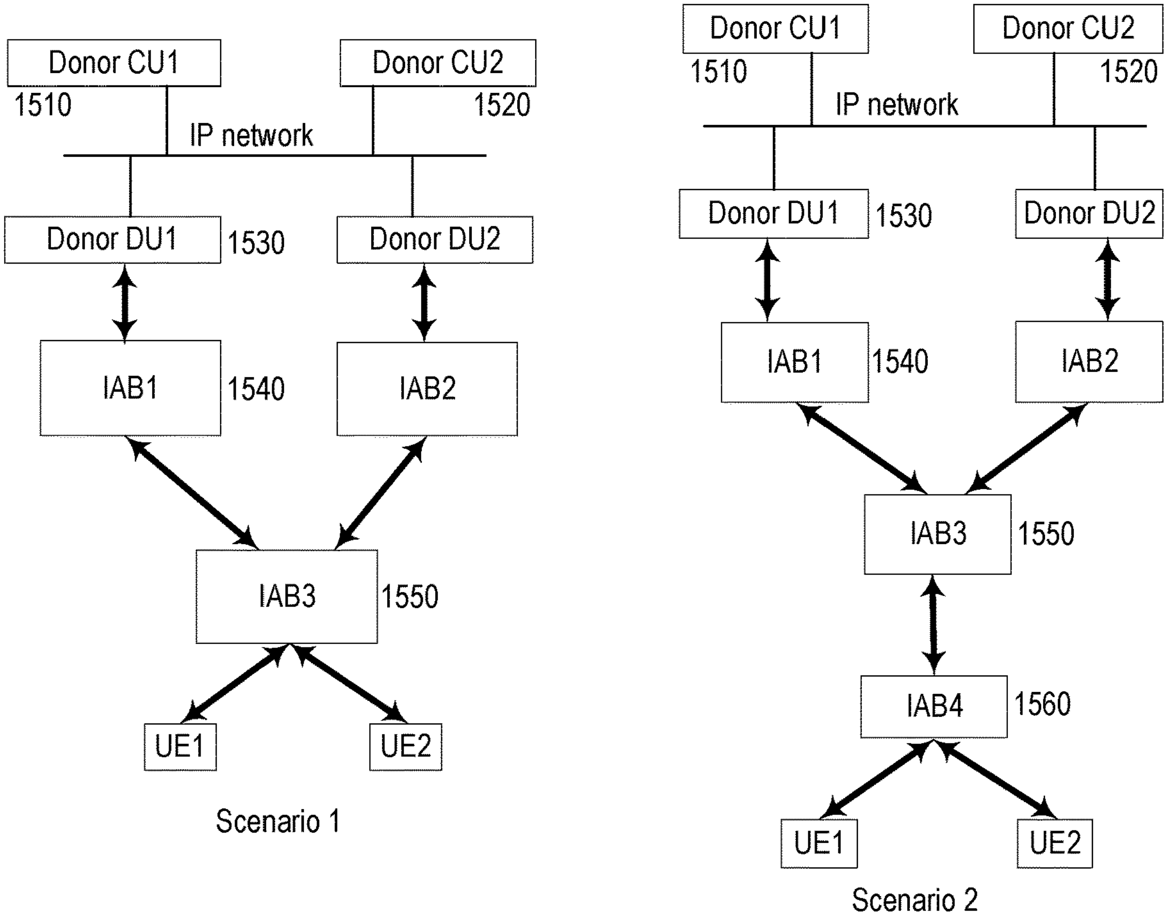
FIG. 15 shows two exemplary scenarios for inter-donor CU topology redundancy.
Figure 16:
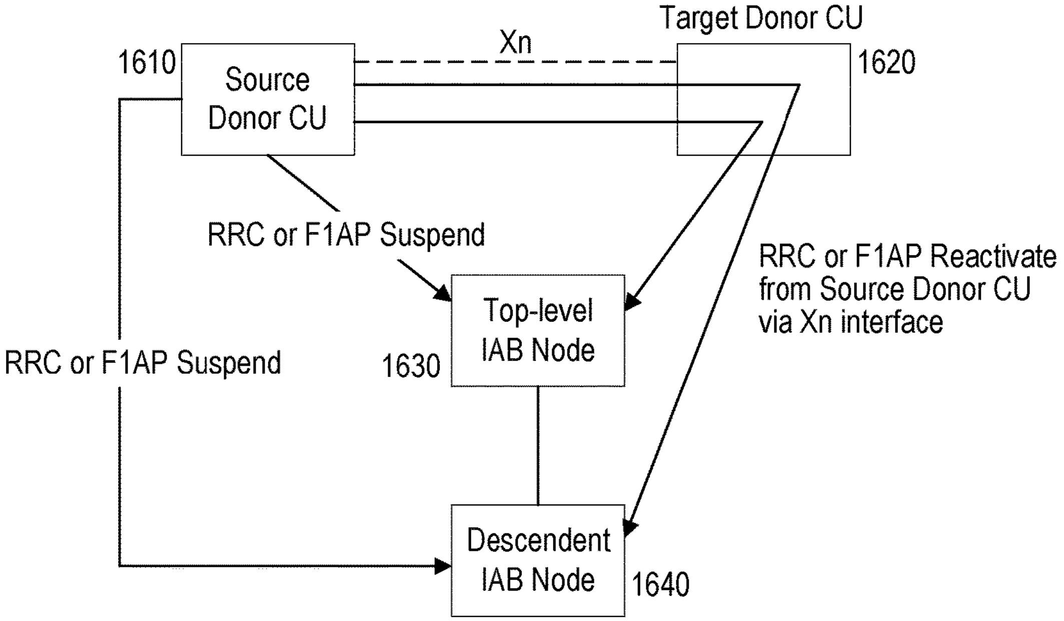
FIG. 16 shows an exemplary IAB node inter-CU migration scenario that illustrates various embodiments of the present disclosure.

FIG. 15 shows two exemplary scenarios for inter-donor CU topology redundancy. In scenario 1, IAB3 (1550) is multi-connected with Donor CU1 (1510) and Donor CU2 (1520). In scenario 2, IAB4 (1560) has a parent (or ancestor) node IAB3 (1550) that is multi-connected with two donors. The two donors (i.e., Donor CU/DU1 and Donor CU/DU2) are interconnected by an IP network.

In these two exemplary scenarios, the term "boundary IAB node" refers to an IAB node that accesses two different parent nodes connected to two different donor CUs, respectively. In FIG. 15, IAB3 is a boundary IAB node. In the present disclosure, the terms "top-level IAB node" and "boundary IAB node" are used synonymously.

Likewise, the term "descendant IAB node" refers to IAB node(s) accessing the network via a boundary IAB node, with a single connection to a parent node. In particular, IAB4 is a descendant IAB node. In addition, the term "F1-termination node" refers to the donor CU terminating F1 interface of the boundary IAB node and descendant node(s) while the term "non-F1-termination node" refers to a CU with donor functionalities that does not terminate F1 interface of the boundary IAB node and descendant node(s).

Even though the proxy-based topology adaptation discussed above can be used for offloading traffic, it is expected that the need to offload traffic to a second donor would be only temporary (e.g., during peak hours of the day) and that the traffic can eventually be returned to the first donor. It is also expected that millimeter wave (mmW) links will be generally stable with only rare, short interruptions. As such, when topology adaptation is due to inter-donor recovery from RLF, it is expected that an IAB node can re-establish a stable link towards its previous parent node under the first donor.

In such cases, there is a need to revoke previously established inter-CU proxy-based load balancing. This is needed for both a top-level IAB node connected to one donor (where traffic is moved from proxied path via CU2 to original path via CU1) and a top-level IAB node simultaneously connected to two donors (where traffic is moved from proxied leg via CU2 to original leg via CU1).

Returning to the example shown in FIG. 11, after the traffic offloading to CU2 is revoked, the traffic will again be sent towards the top-level (or boundary) IAB node (i.e., IAB3) via the CU1 network. To enable that, it may be necessary to re-build in the CU1 network the routing and other configurations for this traffic from scratch. For example, the old-new ancestors of top-level IAB3 (e.g., IAB2 in FIG. 11) need to be re-configured with BAP routing IDs pertaining to IAB3 and its ancestors. Donor DU-1 also needs to be re-configured with mapping of DL traffic towards/via IAB3. These re-configuration and/or rebuilding operations are time consuming and require extensive signaling, especially if the offloaded (and now returned) traffic pertains to many devices.

Embodiments of the present disclosure address these and other problems, challenges, and/or issues by providing mechanisms to suspend, at the first donor (e.g., CU1) the configurations previously used to serve traffic now offloaded to a second donor (e.g., CU2) and to re-activate these previously suspended configurations once the traffic has returned to the first donor network. The suspension/re-activation can be configured by the first donor (e.g., CU1) to a top-level IAB node, the ancestors of the top-level IAB node, and descendants of the top-level IAB node. For example, this can be performed via FIAP, BAP or RRC signaling to these devices. As a further example, the suspension/re-activation can be performed via a reconfiguration procedure.

In various embodiments, the suspended/re-activated configurations pertaining to offloaded/returned traffic can include any of the following:

- traffic mapping configurations for DL traffic at the source donor DU (e.g., Donor DU1 in FIG. 11);
- ingress-egress mapping configurations for BH RLC channels at ancestors of the top-level IAB node (e.g., IAB2 ancestor of IAB3 in FIG. 11);
- BAP routing tables at ancestors of the top-level IAB node pertaining to the offloaded traffic;
- UL traffic mapping configurations at the top-level IAB node (e.g., IAB3 in FIG. 11) and its descendants (e.g., IAB4 in FIG. 11).
- TNL addresses (e.g., IP addresses) used by the top-level IAB node and its descendants prior to traffic offloading.
- gNB-DU cell resource configuration at descendants of top-level IAB node.

Other embodiments include methods for the source donor CU (e.g., CU1) to indicate to the target donor CU (e.g., CU2) that a previously executed migration (e.g., full or proxy-based) is revoked.

By operating in this manner, embodiments of the present disclosure can simplify and/or accelerate the revocation of inter-donor topology adaptation by avoiding the need to rebuild from scratch all the configurations for serving traffic previously offloaded to another donor network and subsequently returned. For example, embodiments can reduce and/or eliminate excessive signaling traffic and node processing requirements associated with rebuilding such configurations according to conventional techniques.

Although embodiments are primarily described in terms of IAB nodes, certain embodiments described herein can apply to UEs, regardless of whether they are served by an IAB network or a "non-IAB" RAN node.

Also, although embodiments are primarily described in terms proxy-based inter-donor migration, the disclosed techniques are equally applicable to the full-migration solution in case the network decides or realizes that it may need to fully migrate back (e.g., from CU2 to CU1) the devices previously fully migrated (e.g., from CU1 to CU2).

Certain terms used in the present disclosure are defined in the bullets below:

- "suspending" a configuration means that the configuration is saved but cannot be used unless and until the configuration is "reactivated" for use. "Suspending" is different from "releasing", which effectively deletes the configuration. Advantage of suspension is that the previous parameters can be re-used with re-activation, whereas all parameters need to be provided again when a released configuration is re-established.
- "single-connected top-level IAB node" refers to a top-level IAB-MT that can connect to only one donor at a time;
- "dual-connected top-level IAB node" refers to a top-level IAB-MT that can simultaneously connect to two donors;
- "descendant" or "descendant node" refers to a top-level IAB node's child node(s) (e.g., immediate descendant), the child node's child node(s), etc.
- "ancestor" or "ancestor node" refers to a top-level IAB node's parent node (e.g., immediate ancestor), the parent node's parent node, etc.
- "parent" or "parent node" refers to an IAB node or an IAB-donor DU.
- "destination is IAB-DU" refers to traffic whose final destination is either the IAB-DU or a UE or IAB-MT served by the IAB-DU, and that includes top-level IAB-DU as well.
- "RRC connections of descendant devices" refers to the RRC connections of descendant IAB-MTs and UEs with the donor CU (e.g., source donor. and the F1 connections of the top-level IAB-DU and IAB-DUs of descendant IAB nodes of the top-level IAB node.
- "F1 connections of descendant devices" refers to the F1 connections with the donor (source donor) of the top-level IAB-DU and the IAB-DUs of descendant IAB nodes of the top-level IAB node.
- "proxied traffic" refers to traffic between the source donor CU (e.g., CU1) and the top-level IAB node and/or its descendant nodes including:
  - the IAB-DU part of the top-level IAB node (e.g., since the collocated IAB-MT part has migrated its RRC connection to the new donor),
  - the descendant IAB nodes of the top-level IAB node, and
  - the UEs served by the top-level IAB node and its descendant IAB nodes.
- "data" refers to user plane, control plane, and non-F1 traffic.

Additionally, each of the bullets below list terms that are used interchangeably in the present disclosure:

- "inter-donor traffic offloading", "inter-donor migration", "inter-donor topology adaptation";

"CU1", "donor CU1", "source donor", "source donor CU", and "old donor" refer to a donor CU that offloads traffic;

"CU2", "donor CU2", "target donor", "target donor CU, and "new donor" refer to a donor CU that receives offloaded traffic;

"DU1", "Donor DU1", "source donor DU", and "old donor DU"; and

"DU2", "Donor DU2", "target donor DU", and "new donor DU".

Additionally, the terms "migrating IAB node" and "top-level IAB node" are used interchangeably. In the proxy-based migration solution, these terms refer to the node's IAB-MT (e.g., IAB3-MT in FIG. 11) because the node's co-located IAB-DU does not migrate but rather maintains its F1 connection to the source donor. In the full migration solution, these terms refer to the entire IAB node, which migrates with its descendants to the target donor.

Embodiments described in more detail below are applicable to various scenarios or use cases, including but not limited to the following:

Inter-donor load balancing for a single-connected top-level IAB node (e.g., IAB3-MT in FIG. 11) using the proxy-based migration solution. The traffic carried to/from/via the top-level IAB node is taken over (i.e., proxied) by a target donor CU (e.g., CU2 in FIG. 11). The source donor CU (e.g., CU1 in FIG. 11) offloads the traffic pertaining to the ingress/egress BH RLC channels between the said IAB node and its parent node to the target donor.

Inter-donor load balancing for a dual-connected top-level IAB node (e.g., IAB3-MT for FIG. 11) by using the proxy-based migration solution. The traffic carried to/from/via the top-level IAB node is taken over (i.e., proxied) by a target donor CU for load balancing. The source donor CU offloads the traffic pertaining to the ingress/egress BH RLC channels between the top-level IAB node and its parent node to the top-level IAB node's leg towards the target donor CU.

Inter-donor RLF recovery of a single-connected top-level IAB node, caused by RLF on a link to the top-level IAB node's parent or on a link between the top-level IAB node's parent and the parent's parent, where the top-level IAB node performs reestablishment at a parent under the target donor CU.

Inter-donor RLF recovery of a dual-connected top-level IAB node, caused by RLF on a link to the top-level IAB node's parent or on a link between the top-level IAB node's parent and the parent's parent, where the traffic of the top-level IAB node is completely moved to the top-level IAB node's leg towards the target donor CU.

IAB node handover to another donor.

Local inter-donor rerouting (UL and/or DL), where the newly selected path towards the donor or the destination IAB node is via another donor.

Any of the example scenarios above, where full migration solution is applied instead of the proxy-based migration solution.

In the present disclosure, it is assumed that both UP and CP traffic are sent from/to the source donor via target donor to/from the top-level IAB node and its descendants by either direct or indirect routing, as explained in more detail above in relation to FIG. 11. Embodiments of the present disclosure are applicable to both static IAB nodes and mobile IAB nodes.

In some embodiments, a source donor CU can determine a need for inter-donor traffic offloading (e.g., due to load balancing), negotiates with a target donor CU, and performs offloading of the traffic to the target donor CU as negotiated. In case of inter-donor RLF recovery, the target donor CU, to which the top-level IAB node attempts reestablishments, requests the contexts of top-level IAB node and all its descendants from the source donor CU, and the source donor CU provides them.

Subsequently, the source donor CU suspends in its network the configurations pertaining to the offloaded traffic. This can be done in various ways. In some embodiments, the source donor CU can indicate to the ancestors of the top-level IAB node (e.g., via RRC Suspend to the IAB-MT parts or via F1 IAB UP Configuration Update to the IAB-DU parts of the ancestors) which configurations pertaining to the offloaded traffic should be suspended. As mentioned above, the suspended configurations can include ingress-egress BH RLC CH mappings, BAP routing IDs, IP addresses used by the top-level IAB node and its descendants, gNB-DU resource configuration for top-level IAB node cells, etc. In a variant, the source donor CU can indicate to the ancestors which nodes or traffic (e.g., identified by BAP routing IDs or destination BAP addresses) are to be migrated/offloaded. In such case, this indication can also operate as an implicit indication of configurations to be suspended.

In some embodiments, the source donor CU can indicate to the descendants of the top-level IAB node (e.g., via RRC Suspend to the IAB-MT parts or via F1 IAB UP Configuration Update to the IAB-DU parts of the descendants) which configurations pertaining to the offloaded traffic should be suspended. For proxy-based migration, this may be executed concurrently with indicating to the ancestors since the top-level IAB-DU and the descendants of the top-level IAB node remain connected to the source donor CU during proxying. For full migration, indicating to the ancestors and to the descendants must be done concurrently, before the F1/RRC connection towards the old donor CU is released.

In some embodiments, the source donor CU can indicate to top-level IAB node (e.g., via RRC Suspend to the IAB-MT part or via F1 IAB UP Configuration Update to the IAB-DU part) which configurations pertaining to the offloaded traffic should be suspended. For both proxy-based and full migration solutions, indicating to the ancestors and to the top-level IAB node may be done concurrently since the top-level IAB node and the top-level IAB-MT are about to connect to target donor CU. For full migration, indicating to the ancestors and to the top-level IAB node must be done concurrently, before the F1/RRC connection towards the old donor CU is released.

In some embodiments, a suspension indication (e.g., to top-level IAB node, its ancestors, and/or its descendants) may include a time reference to indicate at which point the suspension should be applied by the nodes receiving the indication. In other embodiments, the nodes receiving the indication may apply the suspension when UL and DL buffers containing data associated with the suspended configurations (e.g., BAP routing IDs) become empty. In other embodiments, the nodes receiving the indication may apply the suspension upon completion of transmissions of all RLC PDUs or RLC SDUs for which an RLC PDU was already transmitted. Remaining packets in the buffers containing data towards the suspended configurations can be then discarded.

In some embodiments, once the nodes receiving the indication have applied the suspension, the nodes can inform the source donor CU of this status.

In some embodiments, each configuration can be associated with an identifier (ID), and the suspension indication includes the ID(s) of the configuration(s) that should be suspended. For example, the ID could include a flag indicating whether the configuration is associated with the source donor CU or the target donor CU.

In some embodiments, the source donor CU determines that inter-donor traffic offloading (e.g., for load balancing) is no longer needed performs revocation of the previous offloading. Upon executing the revocation, the traffic of the top-level IAB node (and its descendant IAB nodes/UEs) is returned from the target donor CU to the source donor CU. In case a full migration was executed, the top-level IAB node (and its descendant IAB nodes/UEs) are migrated back to the source donor CU. In case of proxy-based migration, the traffic served by the top-level IAB node is offloaded from the target donor CU, such that the target donor CU ceases to act as a proxy for the traffic of the source donor CU.

The source donor CU also indicates to the target donor CU that offloading revocation is needed. There can be different methods for the source donor CU to indicate the need for revocation depending on whether a proxy-based or full migration was previous triggered, and whether the top-level IAB node is single- or dual-connected.

In case the migration was a proxy-based migration and the top-level IAB node was dual connected to the source donor CU and the target donor CU, the source donor CU may use a SN (Secondary Node) release request to indicate the revocation of the proxy-based migration.

In case the migration was a proxy-based migration and the top-level IAB node was single-connected to the target donor CU, the source donor CU may use a new message to revoke the traffic offloading. For example, a UE context release or an IAB context retrieval based on a Retrieve UE context modification or a Retrieve UE context release message can inform the target donor CU to remove the top-level IAB node RRC context. The source donor CU may also indicate the cause of this UE context release, such as "proxy-based migration revoked".

In case the migration was a full migration, the source donor CU may ask the target donor CU to hand over the top-level IAB node (and its descendant IAB nodes/UEs) to the source donor CU. For example, the source donor CU may base this decision on radio measurements related to the top-level IAB node that were provided by the target donor CU to the source donor CU. As another example, particularly in case of an RLF recovery, the source donor CU can base this decision on successful recovery of its BH link that triggered the migration. The source donor CU can in this case request the revocation using a new message such as "Revocation Request" for the top-level IAB node that was previously migrated to the target donor CU.

Subsequently, the source donor CU re-activates (resumes) the configurations pertaining to the traffic that was previously served by the source donor CU, offloaded to the target donor CU, and is now being returned to the source donor CU.

In some embodiments, the source donor CU can indicate to the ancestors of the top-level IAB node (e.g., via RRCResume or RRCReconfiguration to the IAB-MT parts or via F1 IAB UP Configuration Update to the IAB-DU parts) which configurations pertaining to the offloaded traffic should be reactivated. As mentioned above, the suspended/reactivated configurations can include ingress-egress BH RLC CH mappings, BAP routing IDs, IP addresses used by the top-level IAB node and its descendants, gNB-DU resource configuration for top-level IAB node cells, etc. In a variant, the source donor CU can indicate to the ancestors which nodes or traffic (e.g., identified by BAP routing IDs or destination BAP addresses) are to be returned. In such case, this indication can also operate as an implicit indication of configurations to be reactivated.

In some embodiments, the source donor CU can indicate to the descendants of the top-level IAB node (e.g., via RRCResume or RRCReconfiguration to the IAB-MT parts or via F1 IAB UP Configuration Update to the IAB-DU parts) which configurations pertaining to the offloaded traffic should be reactivated. For proxy-based return migration, this may be executed concurrently with the revocation since the top-level IAB-DU and the descendants of the top-level IAB node remain connected to the source donor CU during proxying. On the other hand, indicating to the descendants may be done after a full return migration to the source donor CU is completed, or before the return migration but via the target donor CU.

In some embodiments, the source donor CU can indicate to top-level IAB node (e.g., via RRCResume or RRCReconfiguration to the IAB-MT part or via F1 IAB UP Configuration Update to the IAB-DU part) which configurations pertaining to the offloaded traffic should be reactivated. For proxy-based return migration, indicating to the top-level IAB-DU may be executed before, concurrent with, or after the revocation since top-level IAB-DU remains connected to the source donor CU. Sending the indication to the top-level IAB-MT may be done via the target donor CU before top-level MT's return migration, or directly from the source donor CU after the top-level MT's return migration. On the other hand, indicating to the top-level IAB node may be done after a full return migration to the source donor CU is completed, or before the return migration but via the target donor CU.

Subsequently, the top-level IAB node and descendent IAB nodes are returned to the source donor CU.

In variants of the embodiments described above, each configuration can be associated with an identifier (ID), and the reactivation indication includes the ID(s) of the configuration(s) that should be reactivated. For example, the ID could include a flag indicating whether the configuration is associated with the source donor CU or the target donor CU.

In some embodiments, when the traffic is being returned to the source donor CU network (proxy-based migration) or when the nodes are migrated back to the source donor CU network (full migration), the target donor CU suspends the configurations in the ancestors of the top-level IAB node in the target donor CU network.

Figure 17:
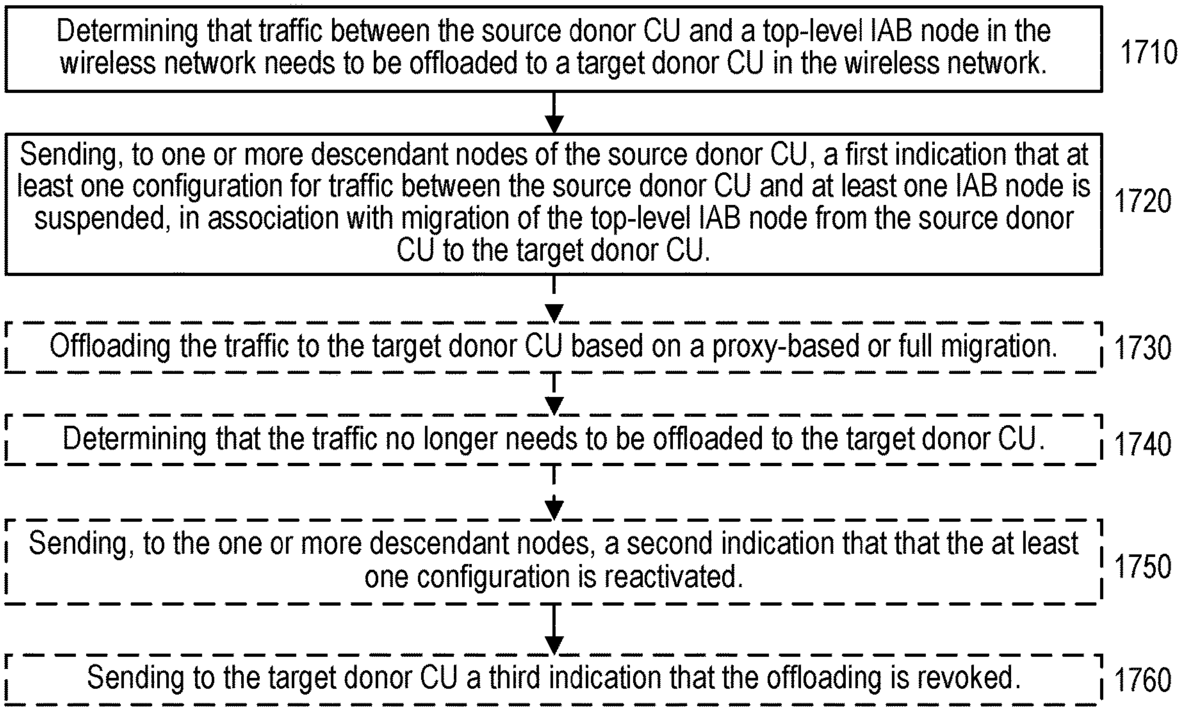
FIG. 17 shows an exemplary method (e.g., procedure) for a source donor CU in an IAB wireless network, according to various embodiments of the present disclosure.
Figure 18:
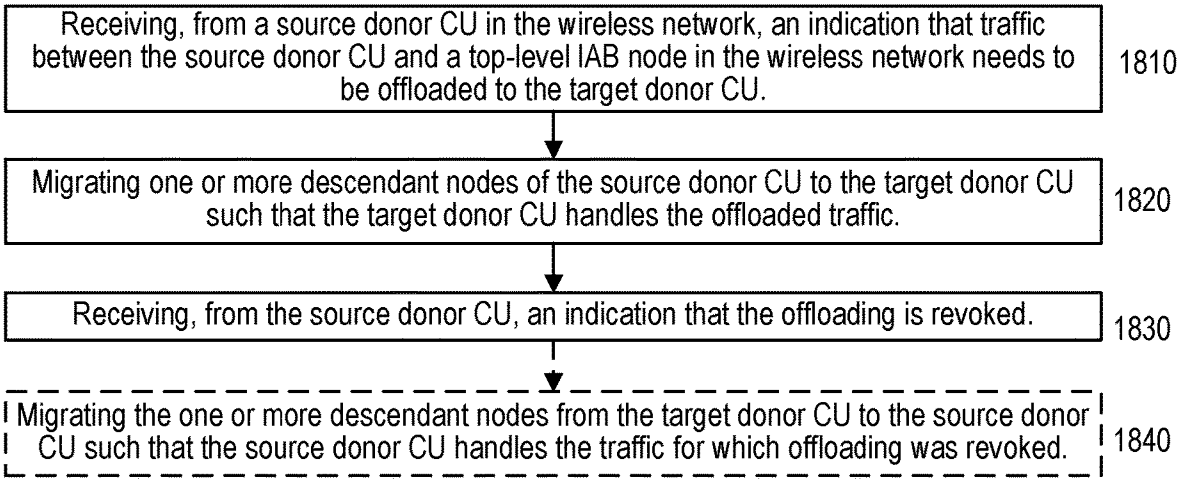
FIG. 18 shows an exemplary method (e.g., procedure) for a target donor CU in an IAB wireless network, according to various embodiments of the present disclosure.
Figure 19:
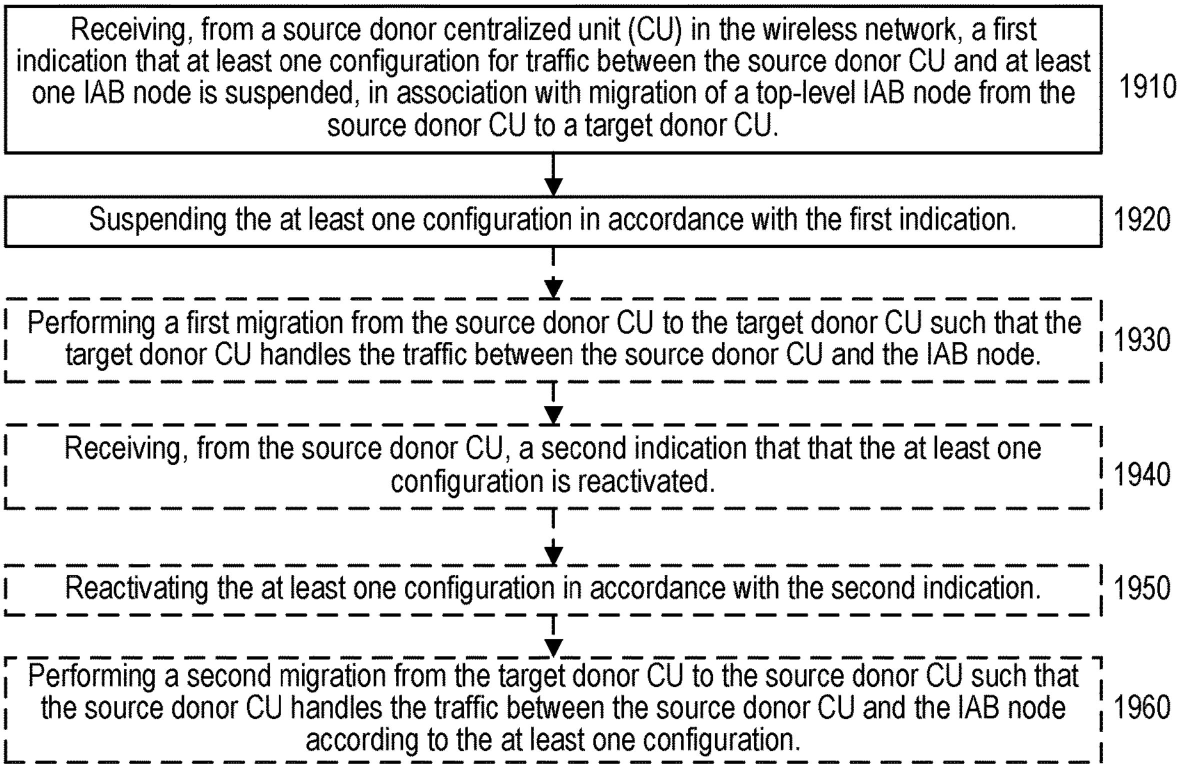
FIG. 19 shows an exemplary method (e.g., procedure) for an IAB node in a wireless network, according to various embodiments of the present disclosure.

These embodiments described above can be further illustrated with reference to FIGS. 17-19, which depict exemplary methods (e.g., procedures) performed by a source donor CU, a target donor CU, and an IAB node in a wireless network (e.g., NG-RAN), respectively. Put differently, various features of the operations described below correspond to various embodiments described above. The exemplary methods shown in FIGS. 17-19 can be complementary to each other such that they can be used cooperatively to provide benefits, advantages, and/or solutions to problems described herein. Although the exemplary methods are illustrated in FIGS. 17-19 by specific blocks in particular orders, the operations corresponding to the blocks can be performed in different orders than shown and can be combined and/or divided into blocks and/or operations having different functionality than shown. Optional blocks and/or operations are indicated by dashed lines.

More specifically, FIG. 17 illustrates an exemplary method (e.g., procedure) for a source donor CU in an IAB wireless network, according to various embodiments of the present disclosure. In various embodiments, the exemplary method shown in FIG. 17 can be performed by a CU such as described elsewhere herein.

The exemplary method can include the operations of block 1710, where the source donor CU can determine that the traffic between the source donor CU and a top-level IAB node in the wireless network needs to be offloaded to a target donor CU in the wireless network. The exemplary method can also include the operations of block 1720, where the source donor CU can send, to one or more descendant nodes of the source donor CU, a first indication that at least one configuration for traffic between the source donor CU and at least one IAB node is suspended, in association with migration of the top-level IAB node from the source donor CU to the target donor CU.

In some embodiments, the first indication includes respective first identifiers of the at least one configuration (i.e., one identifier per configuration). In other embodiments, the first indication includes respective second identifiers of at least one descendant node that needs to be migrated to the target donor CU, with each configuration being associated with only one of the descendant nodes. In this manner, the descendant node identifiers can indicate which configurations are suspended.

In some embodiments, the traffic between the source donor CU and the at least one IAB node, for which the at least one configuration is suspended, includes traffic between the source donor CU and any of the following:

- a DU part of the top-level IAB node;
- one or more IAB nodes that are descendant nodes of the top-level IAB node; and
- UEs served by the top-level IAB node or any of the descendent nodes.

In some embodiments, the exemplary method can also include the operations of block 1730, where the source donor CU can offload the traffic to the target donor CU based on one of the following:

- a proxy-based migration in which the top-level IAB node's MT part migrates to the target donor CU, but F1 and RRC connections of top-level IAB node's DU part and of all descendant nodes of the top-level IAB node remain anchored at the source donor CU; or
- a full migration in which all F1 and RRC connections of the top-level IAB and of all descendant nodes of the top-level IAB node are migrated to the target donor CU.

In some embodiments, the exemplary method can also include the operations of blocks 1740-1750, where the source donor CU can, after offloading the traffic to the target donor CU, determine that the traffic no longer needs to be offloaded to the target donor CU and send, to the one or more descendant nodes, a second indication that that the at least one configuration is reactivated. In some of these embodiments, the exemplary method can also include the operations of block 1760, where in response to determining that the traffic no longer needs to be offloaded, the source donor CU can send to the target donor CU a third indication that the offloading is revoked.

In some embodiments, the descendant nodes of the source donor CU include the top-level IAB node and a source donor DU and the at least one configuration for the traffic between the source donor DU and the top-level IAB node includes any of the following:

- mapping configurations for DL traffic at the source donor DU;
- mapping configurations for UL traffic at the top-level IAB node;
- IP addresses used by the top-level IAB node;
- ingress-egress mapping configurations for backhaul radio link control (BH RLC) channels at the top-level IAB node; and
- backhaul adaptation protocol (BAP) routing tables at the top-level IAB node.

In some embodiments, the descendant nodes of the source donor CU also include one or more ancestor nodes of the top-level IAB node and the at least one configuration for the traffic between the source donor DU and the top-level IAB node also includes any of the following at the ancestor nodes of the top-level IAB node:

- ingress-egress mapping configurations for BH RLC channels, and
- BAP routing tables.

In some embodiments, the descendant nodes of the source donor CU also include one or more descendant nodes of the top-level IAB node and the at least one configuration for the traffic between the source donor DU and the top-level IAB node also includes IP addresses and/or cell resource configurations used by the descendant nodes of the top-level IAB node.

In addition, FIG. 18 illustrates an exemplary method (e.g., procedure) for a target donor CU in a wireless network, according to various embodiments of the present disclosure. In various embodiments, the exemplary method shown in FIG. 18 can be performed by a CU such as described elsewhere herein.

The exemplary method can include the operations of block 1810, where the target donor CU can receive, from a source donor CU in the wireless network, an indication that traffic between the source donor CU and a top-level IAB node in the wireless network needs to be offloaded to the target donor CU. The exemplary method can also include the operations of block 1820, where the target donor CU can migrate one or more descendant nodes of the source donor CU to the target donor CU such that the target donor CU handles the offloaded traffic. The exemplary method can also include the operations of block 1830, where the target donor CU can receive, from the source donor CU, an indication that the offloading is revoked. In some embodiments, the exemplary method can also include the operations of block 1840, where based on the indication that the offloading is revoked, the target donor CU can migrate the one or more descendant nodes from the target donor CU to the source donor CU such that the source donor CU handles the traffic for which offloading was revoked.

In some embodiments, migrating the one or more descendant nodes of the source donor CU to the target donor CU (e.g., in block 1820) is based on one of the following:

- a proxy-based migration in which the top-level IAB node's MT part migrates to the target donor CU, but F1 and RRC connections of top-level IAB node's DU part and of all descendant nodes of the top-level IAB node remain anchored at the source donor CU; or
- a full migration in which all F1 and RRC connections of the top-level IAB and of all descendant nodes of the top-level IAB node are migrated to the target donor CU.

In some embodiments, the offloaded traffic includes traffic between the source donor CU and any of the following:

- a DU part of the top-level IAB node;
- one or more IAB nodes that are descendants of the top-level IAB node; and UEs served by the top-level IAB node or any of the descendant nodes.

In addition, FIG. 19 illustrates an exemplary method (e.g., procedure) for an IAB node a wireless network, according to various embodiments of the present disclosure. In various embodiments, the exemplary method shown in FIG. 19 can be performed by an IAB node (e.g., IAB-DU and IAB-MT) such as described elsewhere herein.

The exemplary method can include the operations of block 1910, where the IAB node can receive, from a source donor CU in the wireless network, a first indication that at least one configuration for traffic between the source donor CU and at least one IAB node is suspended, in association with migration of a top-level IAB node from the source donor CU to a target donor CU. The exemplary method can also include the operations of block 1920, where the IAB node can suspend the at least one configuration in accordance with the first indication.

In some embodiments, the exemplary method can also include the operations of blocks 1940-1950, where the IAB node can receive, from the source donor CU, a second indication that that the at least one configuration is reactivated and reactivate the at least one configuration in accordance with the second indication.

In some of these embodiments, the exemplary method can also include the operations of blocks 1930 and 1960. In block 1930, after or in conjunction with suspending the at least one configuration (e.g., in block 1920), the IAB node can perform a first migration from the source donor CU to the target donor CU such that the target donor CU handles the traffic between the source donor CU and the IAB node. In block 1960, after or in conjunction with reactivating the at least one configuration, the IAB node can perform a second migration from the target donor CU to the source donor CU such that the source donor CU handles the traffic between the source donor CU and the IAB node according to the at least one configuration.

In some of these embodiments, the IAB node is the top-level IAB node, and the first migration (e.g., in block 1930) is a proxy-based migration in which the top-level IAB node's MT part migrates to the target donor CU, but the F1 and RRC connections of top-level IAB node's DU part and all descendant nodes of the top-level IAB node remain anchored at the source donor CU. In other of these embodiments, the IAB node is the top-level IAB node or a descendant node of the top-level IAB node, and the first migration (e.g., in block 1930) is a full migration in which all F1 and RRC connections of the top-level IAB node and all descendant nodes of the top-level IAB node are migrated to the target donor CU.

In some embodiments, the first indication includes respective first identifiers of the at least one configuration (i.e., one identifier per configuration). In other embodiments, the first indication includes respective second identifiers of at least one descendant node that needs to be migrated to the target donor CU, with each configuration being associated with only one of the descendant nodes. In this manner, the descendant node identifiers can indicate which configurations are suspended.

In some embodiments, the IAB node is the top-level IAB node and the at least one configuration includes a configuration for traffic between the source donor CU and the (top-level) IAB node. This configuration includes one or more of the following:

- mapping configurations for DL traffic at a source donor DU associated with the source donor CU;
- mapping configurations for UL traffic at the IAB node;
- IP addresses used by the IAB node;
- ingress-egress mapping configurations for BH RLC channels at the IAB node; and
- BAP routing tables at the IAB node.

In other embodiments, the IAB node is an ancestor node of the top-level IAB node and the at least one configuration includes a configuration for traffic between the source donor CU and the (ancestor) IAB node. This configuration includes one or more of the following at the (ancestor) IAB node: ingress-egress mapping configurations for BH RLC channels, and BAP routing tables.

In other embodiments, the IAB node is a descendant node of the top-level IAB node and the at least one configuration includes a configuration for traffic between the source donor CU and the (descendant) IAB node. This configuration includes one or more of the following used by the (descendant) IAB node: Internet Protocol (IP) addresses, and cell resource configurations.

In some embodiments, the traffic between the source donor CU and the top-level IAB node includes traffic between the source donor CU and any of the following:

- a DU part of the top-level IAB node;
- one or more IAB nodes that are descendant nodes of the top-level IAB node; and
- UEs served by the top-level IAB node or any of the descendant nodes.

Figure 20:
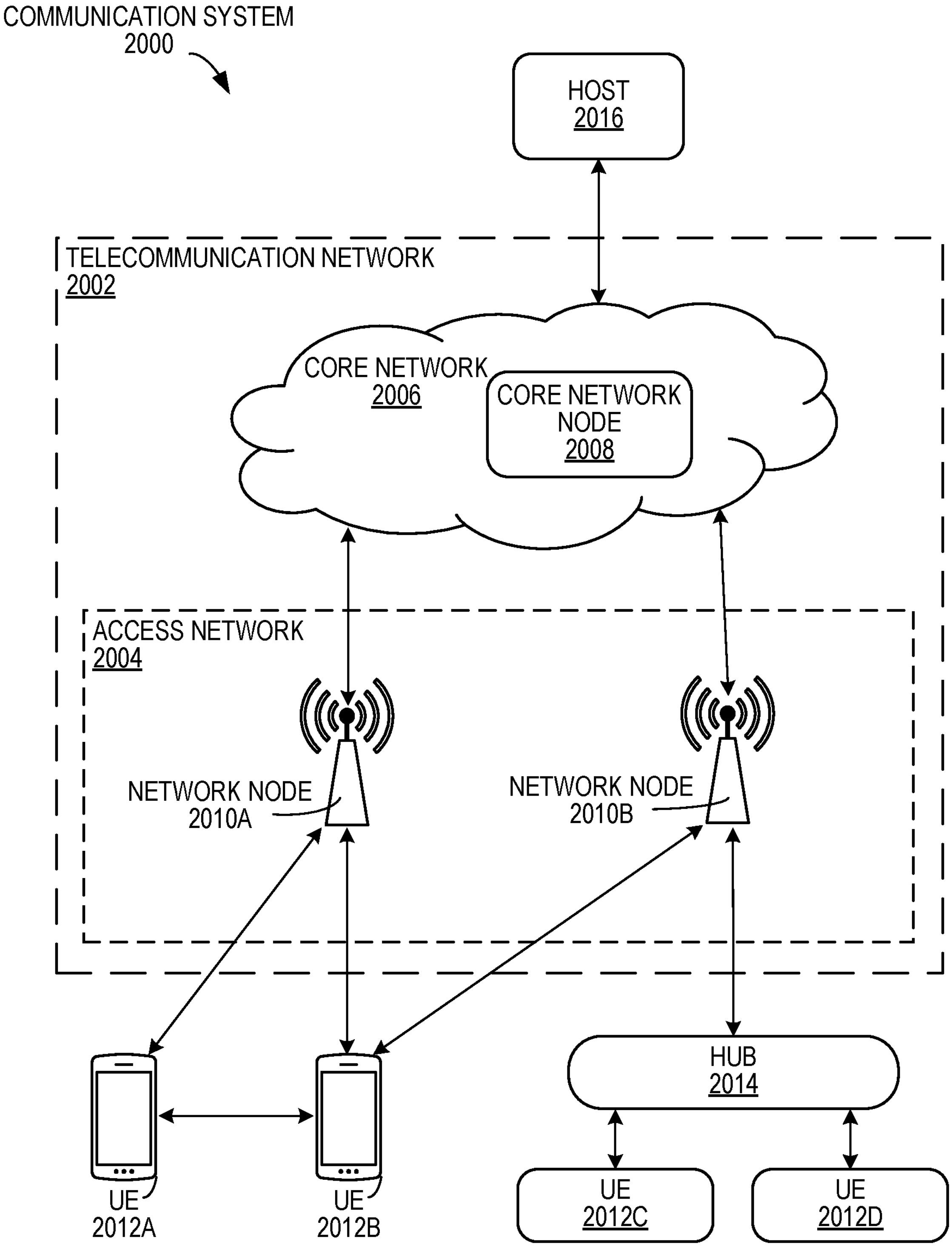
FIG. 20 shows a communication system according to various embodiments of the present disclosure.

FIG. 20 shows an example of a communication system 2000 in accordance with some embodiments. In this example, the communication system 2000 includes a telecommunication network 2002 that includes an access network 2004, such as a radio access network (RAN), and a core network 2006, which includes one or more core network nodes 2008. The access network 2004 includes one or more access network nodes, such as network nodes 2010*a* and 2010*b* (one or more of which may be generally referred to as network nodes 2010), or any other similar 3rd Generation Partnership Project (3GPP) access node or non-3GPP access point. The network nodes 2010 facilitate direct or indirect connection of user equipment (UE), such as by connecting UEs 2012*a*, 2012*b*, 2012*c*, and 2012*d* (one or more of which may be generally referred to as UEs 2012) to the core network 2006 over one or more wireless connections.

Example wireless communications over a wireless connection include transmitting and/or receiving wireless signals using electromagnetic waves, radio waves, infrared waves, and/or other types of signals suitable for conveying information without the use of wires, cables, or other material conductors. Moreover, in different embodiments, the communication system 2000 may include any number of wired or wireless networks, network nodes, UEs, and/or any other components or systems that may facilitate or participate in the communication of data and/or signals whether via wired or wireless connections. The communication system 2000 may include and/or interface with any type of communication, telecommunication, data, cellular, radio network, and/or other similar type of system.

The UEs 2012 may be any of a wide variety of communication devices, including wireless devices arranged, configured, and/or operable to communicate wirelessly with the network nodes 2010 and other communication devices. Similarly, the network nodes 2010 are arranged, capable, configured, and/or operable to communicate directly or indirectly with the UEs 2012 and/or with other network nodes or equipment in the telecommunication network 2002 to enable and/or provide network access, such as wireless network access, and/or to perform other functions, such as administration in the telecommunication network 2002.

In the depicted example, the core network 2006 connects the network nodes 2010 to one or more hosts, such as host 2016. These connections may be direct or indirect via one or more intermediary networks or devices. In other examples, network nodes may be directly coupled to hosts. The core network 2006 includes one more core network nodes (e.g., core network node 2008) that are structured with hardware and software components. Features of these components may be substantially similar to those described with respect to the UEs, network nodes, and/or hosts, such that the descriptions thereof are generally applicable to the corresponding components of the core network node 2008. Example core network nodes include functions of one or more of a Mobile Switching Center (MSC), Mobility Management Entity (MME), Home Subscriber Server (HSS), Access and Mobility Management Function (AMF), Session Management Function (SMF), Authentication Server Function (AUSF), Subscription Identifier De-concealing function (SIDF), Unified Data Management (UDM), Security Edge Protection Proxy (SEPP), Network Exposure Function (NEF), and/or a User Plane Function (UPF).

The host 2016 may be under the ownership or control of a service provider other than an operator or provider of the access network 2004 and/or the telecommunication network 2002, and may be operated by the service provider or on behalf of the service provider. The host 2016 may host a variety of applications to provide one or more service. Examples of such applications include live and pre-recorded audio/video content, data collection services such as retrieving and compiling data on various ambient conditions detected by a plurality of UEs, analytics functionality, social media, functions for controlling or otherwise interacting with remote devices, functions for an alarm and surveillance center, or any other such function performed by a server. As a whole, the communication system 2000 of FIG. 20 enables connectivity between the UEs, network nodes, and hosts. In that sense, the communication system may be configured to operate according to predefined rules or procedures, such as specific standards that include, but are not limited to: Global System for Mobile Communications (GSM); Universal Mobile Telecommunications System (UMTS); Long Term Evolution (LTE), and/or other suitable 2G, 3G, 4G, 5G standards, or any applicable future generation standard (e.g., 6G); wireless local area network (WLAN) standards, such as the Institute of Electrical and Electronics Engineers (IEEE) 802.11 standards (WiFi); and/or any other appropriate wireless communication standard, such as the Worldwide Interoperability for Microwave Access (WiMax), Bluetooth, Z-Wave, Near Field Communication (NFC) ZigBee, LiFi, and/or any low-power wide-area network (LPWAN) standards such as LoRa and Sigfox.

In some examples, the telecommunication network 2002 is a cellular network that implements 3GPP standardized features. Accordingly, the telecommunications network 2002 may support network slicing to provide different logical networks to different devices that are connected to the telecommunication network 2002. For example, the telecommunications network 2002 may provide Ultra Reliable Low Latency Communication (URLLC) services to some UEs, while providing Enhanced Mobile Broadband (eMBB) services to other UEs, and/or Massive Machine Type Communication (mMTC)/Massive IoT services to yet further UEs.

In some examples, the UEs 2012 are configured to transmit and/or receive information without direct human interaction. For instance, a UE may be designed to transmit information to the access network 2004 on a predetermined schedule, when triggered by an internal or external event, or in response to requests from the access network 2004. Additionally, a UE may be configured for operating in single- or multi-RAT or multi-standard mode. For example, a UE may operate with any one or combination of Wi-Fi, NR (New Radio) and LTE, i.e., being configured for multi-radio dual connectivity (MR-DC), such as E-UTRAN (Evolved-UMTS Terrestrial Radio Access Network) New Radio-Dual Connectivity (EN-DC).

In the example, the hub 2014 communicates with the access network 2004 to facilitate indirect communication between one or more UEs (e.g., UE 2012*c* and/or 2012*d*) and network nodes (e.g., network node 2010*b*). In some examples, the hub 2014 may be a controller, router, content source and analytics, or any of the other communication devices described herein regarding UEs. For example, the hub 2014 may be a broadband router enabling access to the core network 2006 for the UEs. As another example, the hub 2014 may be a controller that sends commands or instructions to one or more actuators in the UEs. Commands or instructions may be received from the UEs, network nodes 2010, or by executable code, script, process, or other instructions in the hub 2014. As another example, the hub 2014 may be a data collector that acts as temporary storage for UE data and, in some embodiments, may perform analysis or other processing of the data. As another example, the hub 2014 may be a content source. For example, for a UE that is a VR headset, display, loudspeaker or other media delivery device, the hub 2014 may retrieve VR assets, video, audio, or other media or data related to sensory information via a network node, which the hub 2014 then provides to the UE either directly, after performing local processing, and/or after adding additional local content. In still another example, the hub 2014 acts as a proxy server or orchestrator for the UEs, in particular in if one or more of the UEs are low energy IoT devices.

The hub 2014 may have a constant/persistent or intermittent connection to the network node 2010*b*. The hub 2014 may also allow for a different communication scheme and/or schedule between the hub 2014 and UEs (e.g., UE 2012*c* and/or 2012*d*), and between the hub 2014 and the core network 2006. In other examples, the hub 2014 is connected to the core network 2006 and/or one or more UEs via a wired connection. Moreover, the hub 2014 may be configured to connect to an M2M service provider over the access network 2004 and/or to another UE over a direct connection. In some scenarios, UEs may establish a wireless connection with the network nodes 2010 while still connected via the hub 2014 via a wired or wireless connection. In some embodiments, the hub 2014 may be a dedicated hub—that is, a hub whose primary function is to route communications to/from the UEs from/to the network node 2010*b*. In other embodiments, the hub 2014 may be a non-dedicated hub—that is, a device which is capable of operating to route communications between the UEs and network node 2010*b*, but which is additionally capable of operating as a communication start and/or end point for certain data channels.

Figure 21:
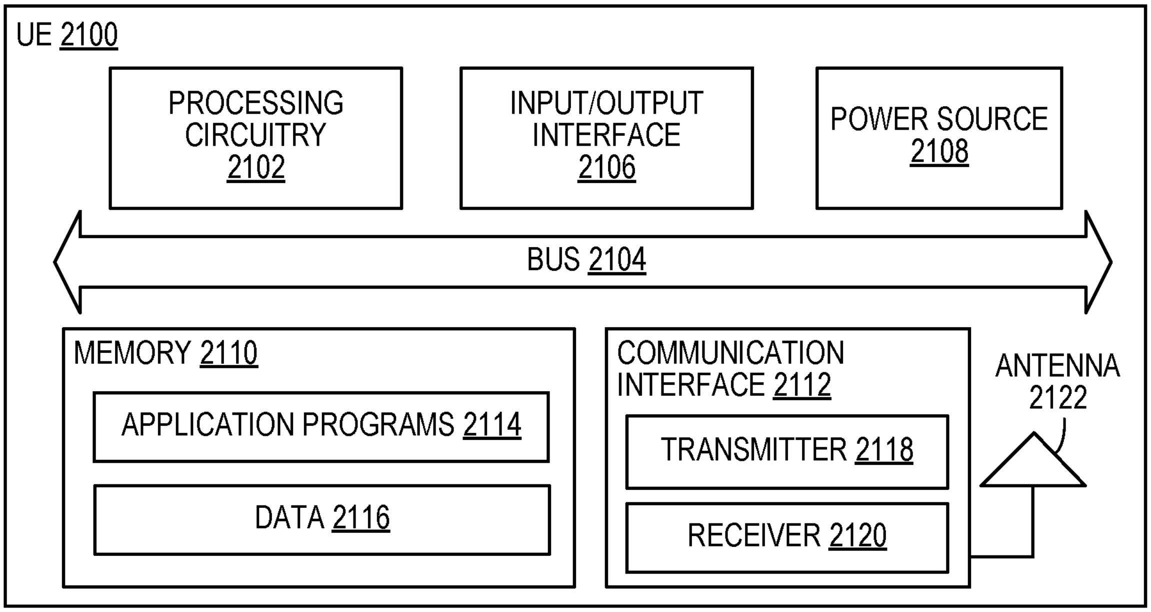
FIG. 21 shows a UE according to various embodiments of the present disclosure.

FIG. 21 shows a UE 2100 in accordance with some embodiments. As used herein, a UE refers to a device capable, configured, arranged and/or operable to communicate wirelessly with network nodes and/or other UEs. Examples of a UE include, but are not limited to, a smart phone, mobile phone, cell phone, voice over IP (VOIP) phone, wireless local loop phone, desktop computer, personal digital assistant (PDA), wireless cameras, gaming console or device, music storage device, playback appliance, wearable terminal device, wireless endpoint, mobile station, tablet, laptop, laptop-embedded equipment (LEE), laptop-mounted equipment (LME), smart device, wireless customer-premise equipment (CPE), vehicle-mounted or vehicle embedded/integrated wireless device, etc. Other examples include any UE identified by the 3rd Generation Partnership Project (3GPP), including a narrow band internet of things (NB-IOT) UE, a machine type communication (MTC) UE, and/or an enhanced MTC (eMTC) UE.

A UE may support device-to-device (D2D) communication, for example by implementing a 3GPP standard for sidelink communication, Dedicated Short-Range Communication (DSRC), vehicle-to-vehicle (V2V), vehicle-to-infrastructure (V2I), or vehicle-to-everything (V2X). In other examples, a UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter).

The UE 2100 includes processing circuitry 2102 that is operatively coupled via a bus 2104 to an input/output interface 2106, a power source 2108, a memory 2110, a communication interface 2112, and/or any other component, or any combination thereof. Certain UEs may utilize all or a subset of the components shown in FIG. 21. The level of integration between the components may vary from one UE to another UE. Further, certain UEs may contain multiple instances of a component, such as multiple processors, memories, transceivers, transmitters, receivers, etc.

The processing circuitry 2102 is configured to process instructions and data and may be configured to implement any sequential state machine operative to execute instructions stored as machine-readable computer programs in the memory 2110. The processing circuitry 2102 may be implemented as one or more hardware-implemented state machines (e.g., in discrete logic, field-programmable gate arrays (FPGAs), application specific integrated circuits (ASICs), etc.); programmable logic together with appropriate firmware; one or more stored computer programs, general-purpose processors, such as a microprocessor or digital signal processor (DSP), together with appropriate software; or any combination of the above. For example, the processing circuitry 2102 may include multiple central processing units (CPUs).

In the example, the input/output interface 2106 may be configured to provide an interface or interfaces to an input device, output device, or one or more input and/or output devices. Examples of an output device include a speaker, a sound card, a video card, a display, a monitor, a printer, an actuator, an emitter, a smartcard, another output device, or any combination thereof. An input device may allow a user to capture information into the UE 2100. Examples of an input device include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, a biometric sensor, etc., or any combination thereof. An output device may use the same type of interface port as an input device. For example, a Universal Serial Bus (USB) port may be used to provide an input device and an output device.

In some embodiments, the power source 2108 is structured as a battery or battery pack. Other types of power sources, such as an external power source (e.g., an electricity outlet), photovoltaic device, or power cell, may be used. The power source 2108 may further include power circuitry for delivering power from the power source 2108 itself, and/or an external power source, to the various parts of the UE 2100 via input circuitry or an interface such as an electrical power cable. Delivering power may be, for example, for charging of the power source 2108. Power circuitry may perform any formatting, converting, or other modification to the power from the power source 2108 to make the power suitable for the respective components of the UE 2100 to which power is supplied.

The memory 2110 may be or be configured to include memory such as random access memory (RAM), read-only memory (ROM), programmable read-only memory (PROM), erasable programmable read-only memory (EPROM), electrically erasable programmable read-only memory (EEPROM), magnetic disks, optical disks, hard disks, removable cartridges, flash drives, and so forth. In one example, the memory 2110 includes one or more application programs 2114, such as an operating system, web browser application, a widget, gadget engine, or other application, and corresponding data 2116. The memory 2110 may store, for use by the UE 2100, any of a variety of various operating systems or combinations of operating systems.

The memory 2110 may be configured to include a number of physical drive units, such as redundant array of independent disks (RAID), flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as tamper resistant module in the form of a universal integrated circuit card (UICC) including one or more subscriber identity modules (SIMs), such as a USIM and/or ISIM, other memory, or any combination thereof. The UICC may for example be an embedded UICC (eUICC), integrated UICC (iUICC) or a removable UICC commonly known as 'SIM card.' The memory 2110 may allow the UE 2100 to access instructions, application programs and the like, stored on transitory or non-transitory memory media, to off-load data, or to upload data. An article of manufacture, such as one utilizing a communication system may be tangibly embodied as or in the memory 2110, which may be or comprise a device-readable storage medium.

The processing circuitry 2102 may be configured to communicate with an access network or other network using the communication interface 2112. The communication interface 2112 may comprise one or more communication subsystems and may include or be communicatively coupled to an antenna 2122. The communication interface 2112 may include one or more transceivers used to communicate, such as by communicating with one or more remote transceivers of another device capable of wireless communication (e.g., another UE or a network node in an access network). Each transceiver may include a transmitter 2118 and/or a receiver 2120 appropriate to provide network communications (e.g., optical, electrical, frequency allocations, and so forth).

Moreover, the transmitter 2118 and receiver 2120 may be coupled to one or more antennas (e.g., antenna 2122) and may share circuit components, software or firmware, or alternatively be implemented separately.

In the illustrated embodiment, communication functions of the communication interface 2112 may include cellular communication, Wi-Fi communication, LPWAN communication, data communication, voice communication, multimedia communication, short-range communications such as Bluetooth, near-field communication, location-based communication such as the use of the global positioning system (GPS) to determine a location, another like communication function, or any combination thereof. Communications may be implemented in according to one or more communication protocols and/or standards, such as IEEE 802.11, Code Division Multiplexing Access (CDMA), Wideband Code Division Multiple Access (WCDMA), GSM, LTE, New Radio (NR), UMTS, WiMax, Ethernet, transmission control protocol/internet protocol (TCP/IP), synchronous optical networking (SONET), Asynchronous Transfer Mode (ATM), QUIC, Hypertext Transfer Protocol (HTTP), and so forth.

Regardless of the type of sensor, a UE may provide an output of data captured by its sensors, through its communication interface 2112, via a wireless connection to a network node. Data captured by sensors of a UE can be communicated through a wireless connection to a network node via another UE. The output may be periodic (e.g., once every 15 minutes if it reports the sensed temperature), random (e.g., to even out the load from reporting from several sensors), in response to a triggering event (e.g., when moisture is detected an alert is sent), in response to a request (e.g., a user initiated request), or a continuous stream (e.g., a live video feed of a patient).

As another example, a UE comprises an actuator, a motor, or a switch, related to a communication interface configured to receive wireless input from a network node via a wireless connection. In response to the received wireless input the states of the actuator, the motor, or the switch may change. For example, the UE may comprise a motor that adjusts the control surfaces or rotors of a drone in flight according to the received input or to a robotic arm performing a medical procedure according to the received input.

A UE, when in the form of an Internet of Things (IOT) device, may be a device for use in one or more application domains, these domains comprising, but not limited to, city wearable technology, extended industrial application and healthcare. Non-limiting examples of such an IoT device are a device which is or which is embedded in: a connected refrigerator or freezer, a TV, a connected lighting device, an electricity meter, a robot vacuum cleaner, a voice controlled smart speaker, a home security camera, a motion detector, a thermostat, a smoke detector, a door/window sensor, a flood/moisture sensor, an electrical door lock, a connected doorbell, an air conditioning system like a heat pump, an autonomous vehicle, a surveillance system, a weather monitoring device, a vehicle parking monitoring device, an electric vehicle charging station, a smart watch, a fitness tracker, a head-mounted display for Augmented Reality (AR) or Virtual Reality (VR), a wearable for tactile augmentation or sensory enhancement, a water sprinkler, an animal- or item-tracking device, a sensor for monitoring a plant or animal, an industrial robot, an Unmanned Aerial Vehicle (UAV), and any kind of medical device, like a heart rate monitor or a remote controlled surgical robot. A UE in the form of an IoT device comprises circuitry and/or software in dependence of the intended application of the IoT device in addition to other components as described in relation to the UE 2100 shown in FIG. 21.

As yet another specific example, in an IoT scenario, a UE may represent a machine or other device that performs monitoring and/or measurements, and transmits the results of such monitoring and/or measurements to another UE and/or a network node. The UE may in this case be an M2M device, which may in a 3GPP context be referred to as an MTC device. As one particular example, the UE may implement the 3GPP NB-IOT standard. In other scenarios, a UE may represent a vehicle, such as a car, a bus, a truck, a ship and an airplane, or other equipment that is capable of monitoring and/or reporting on its operational status or other functions associated with its operation.

In practice, any number of UEs may be used together with respect to a single use case. For example, a first UE might be or be integrated in a drone and provide the drone's speed information (obtained through a speed sensor) to a second UE that is a remote controller operating the drone. When the user makes changes from the remote controller, the first UE may adjust the throttle on the drone (e.g., by controlling an actuator) to increase or decrease the drone's speed. The first and/or the second UE can also include more than one of the functionalities described above. For example, a UE might comprise the sensor and the actuator, and handle communication of data for both the speed sensor and the actuators.

Figure 22:
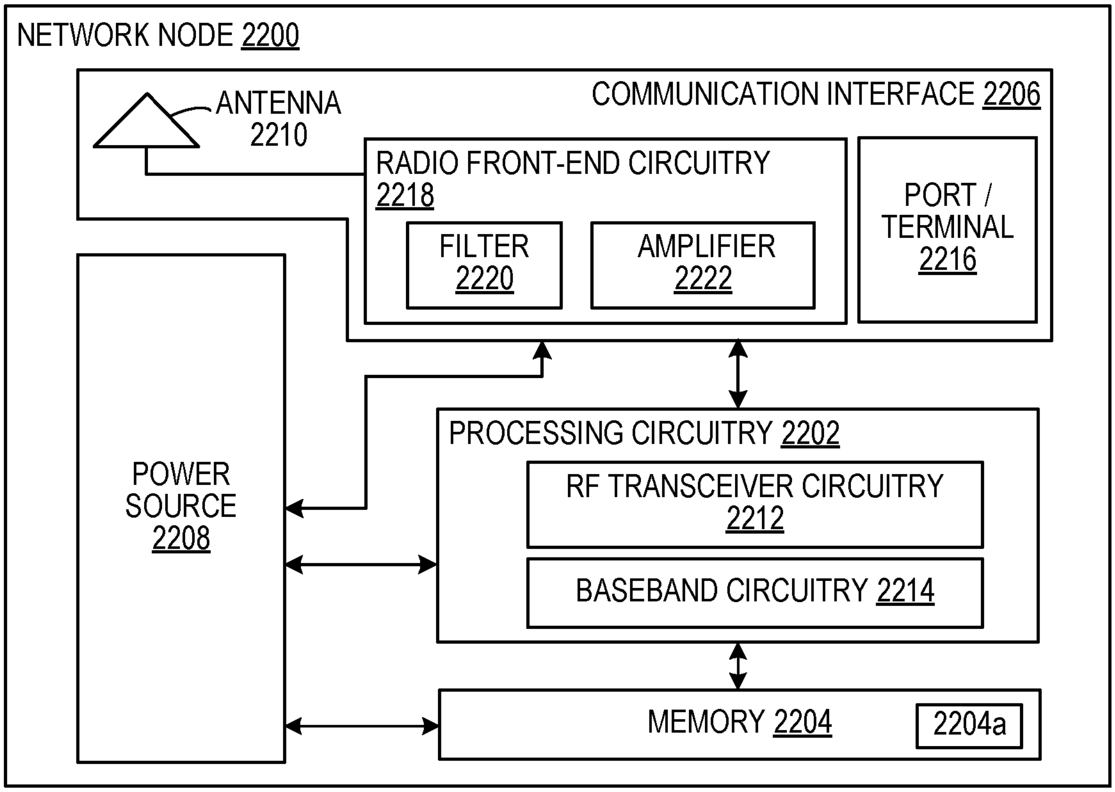
FIG. 22 shows a network node according to various embodiments of the present disclosure.

FIG. 22 shows a network node 2200 in accordance with some embodiments. As used herein, network node refers to equipment capable, configured, arranged and/or operable to communicate directly or indirectly with a UE and/or with other network nodes or equipment, in a telecommunication network. Examples of network nodes include, but are not limited to, access points (APs) (e.g., radio access points), base stations (BSs) (e.g., radio base stations, Node Bs, evolved Node Bs (eNBs) and NR NodeBs (gNBs)).

Base stations may be categorized based on the amount of coverage they provide (or, stated differently, their transmit power level) and so, depending on the provided amount of coverage, may be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS).

Other examples of network nodes include multiple transmission point (multi-TRP) 5G access nodes, multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), Operation and Maintenance (O&M) nodes, Operations Support System (OSS) nodes, Self-Organizing Network (SON) nodes, positioning nodes (e.g., Evolved Serving Mobile Location Centers (E-SMLCs)), and/or Minimization of Drive Tests (MDTs).

The network node 2200 includes a processing circuitry 2202, a memory 2204, a communication interface 2206, and a power source 2208. The network node 2200 may be composed of multiple physically separate components (e.g., a NodeB component and a RNC component, or a BTS component and a BSC component, etc.), which may each have their own respective components. In certain scenarios in which the network node 2200 comprises multiple separate components (e.g., BTS and BSC components), one or more of the separate components may be shared among several network nodes. For example, a single RNC may control multiple NodeBs. In such a scenario, each unique NodeB and RNC pair, may in some instances be considered a single separate network node. In some embodiments, the network node 2200 may be configured to support multiple radio access technologies (RATs). In such embodiments, some components may be duplicated (e.g., separate memory 2204 for different RATs) and some components may be reused (e.g., a same antenna 2210 may be shared by different RATs). The network node 2200 may also include multiple sets of the various illustrated components for different wireless technologies integrated into network node 2200, for example GSM, WCDMA, LTE, NR, WiFi, Zigbee, Z-wave, LoRaWAN, Radio Frequency Identification (RFID) or Bluetooth wireless technologies. These wireless technologies may be integrated into the same or different chip or set of chips and other components within network node 2200.

The processing circuitry 2202 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 2200 components, such as the memory 2204, to provide network node 2200 functionality.

In some embodiments, the processing circuitry 2202 includes a system on a chip (SOC). In some embodiments, the processing circuitry 2202 includes one or more of radio frequency (RF) transceiver circuitry 2212 and baseband processing circuitry 2214. In some embodiments, the radio frequency (RF) transceiver circuitry 2212 and the baseband processing circuitry 2214 may be on separate chips (or sets of chips), boards, or units, such as radio units and digital units. In alternative embodiments, part or all of RF transceiver circuitry 2212 and baseband processing circuitry 2214 may be on the same chip or set of chips, boards, or units.

The memory 2204 may comprise any form of volatile or non-volatile computer-readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device-readable and/or computer-executable memory devices that store information, data, and/or instructions that may be used by the processing circuitry 2202. The memory 2204 may store any suitable instructions, data, or information, including a computer program, software, an application including one or more of logic, rules, code, tables, and/or other instructions (collectively referred to as computer program product 2204*a*) capable of being executed by the processing circuitry 2202 and utilized by the network node 2200. The memory 2204 may be used to store any calculations made by the processing circuitry 2202 and/or any data received via the communication interface 2206. In some embodiments, the processing circuitry 2202 and memory 2204 is integrated.

The communication interface 2206 is used in wired or wireless communication of signaling and/or data between a network node, access network, and/or UE. As illustrated, the communication interface 2206 comprises port(s)/terminal(s) 2216 to send and receive data, for example to and from a network over a wired connection. The communication interface 2206 also includes radio front-end circuitry 2218 that may be coupled to, or in certain embodiments a part of, the antenna 2210. Radio front-end circuitry 2218 comprises filters 2220 and amplifiers 2222. The radio front-end circuitry 2218 may be connected to an antenna 2210 and processing circuitry 2202. The radio front-end circuitry may be configured to condition signals communicated between antenna 2210 and processing circuitry 2202. The radio front-end circuitry 2218 may receive digital data that is to be sent out to other network nodes or UEs via a wireless connection. The radio front-end circuitry 2218 may convert the digital data into a radio signal having the appropriate channel and bandwidth parameters using a combination of filters 2220 and/or amplifiers 2222. The radio signal may then be transmitted via the antenna 2210. Similarly, when receiving data, the antenna 2210 may collect radio signals which are then converted into digital data by the radio front-end circuitry 2218. The digital data may be passed to the processing circuitry 2202. In other embodiments, the communication interface may comprise different components and/or different combinations of components.

In certain alternative embodiments, the network node 2200 does not include separate radio front-end circuitry 2218, instead, the processing circuitry 2202 includes radio front-end circuitry and is connected to the antenna 2210. Similarly, in some embodiments, all or some of the RF transceiver circuitry 2212 is part of the communication interface 2206. In still other embodiments, the communication interface 2206 includes one or more ports or terminals 2216, the radio front-end circuitry 2218, and the RF transceiver circuitry 2212, as part of a radio unit (not shown), and the communication interface 2206 communicates with the baseband processing circuitry 2214, which is part of a digital unit (not shown).

The antenna 2210 may include one or more antennas, or antenna arrays, configured to send and/or receive wireless signals. The antenna 2210 may be coupled to the radio front-end circuitry 2218 and may be any type of antenna capable of transmitting and receiving data and/or signals wirelessly. In certain embodiments, the antenna 2210 is separate from the network node 2200 and connectable to the network node 2200 through an interface or port.

The antenna 2210, communication interface 2206, and/or the processing circuitry 2202 may be configured to perform any receiving operations and/or certain obtaining operations described herein as being performed by the network node. Any information, data and/or signals may be received from a UE, another network node and/or any other network equipment. Similarly, the antenna 2210, the communication interface 2206, and/or the processing circuitry 2202 may be configured to perform any transmitting operations described herein as being performed by the network node. Any information, data and/or signals may be transmitted to a UE, another network node and/or any other network equipment.

The power source 2208 provides power to the various components of network node 2200 in a form suitable for the respective components (e.g., at a voltage and current level needed for each respective component). The power source 2208 may further comprise, or be coupled to, power management circuitry to supply the components of the network node 2200 with power for performing the functionality described herein. For example, the network node 2200 may be connectable to an external power source (e.g., the power grid, an electricity outlet) via an input circuitry or interface such as an electrical cable, whereby the external power source supplies power to power circuitry of the power source 2208. As a further example, the power source 2208 may comprise a source of power in the form of a battery or battery pack which is connected to, or integrated in, power circuitry. The battery may provide backup power should the external power source fail.

Embodiments of the network node 2200 may include additional components beyond those shown in FIG. 22 for providing certain aspects of the network node's functionality, including any of the functionality described herein and/or any functionality necessary to support the subject matter described herein. For example, the network node 2200 may include user interface equipment to allow input of information into the network node 2200 and to allow output of information from the network node 2200. This may allow a user to perform diagnostic, maintenance, repair, and other administrative functions for the network node 2200.

Figure 23:
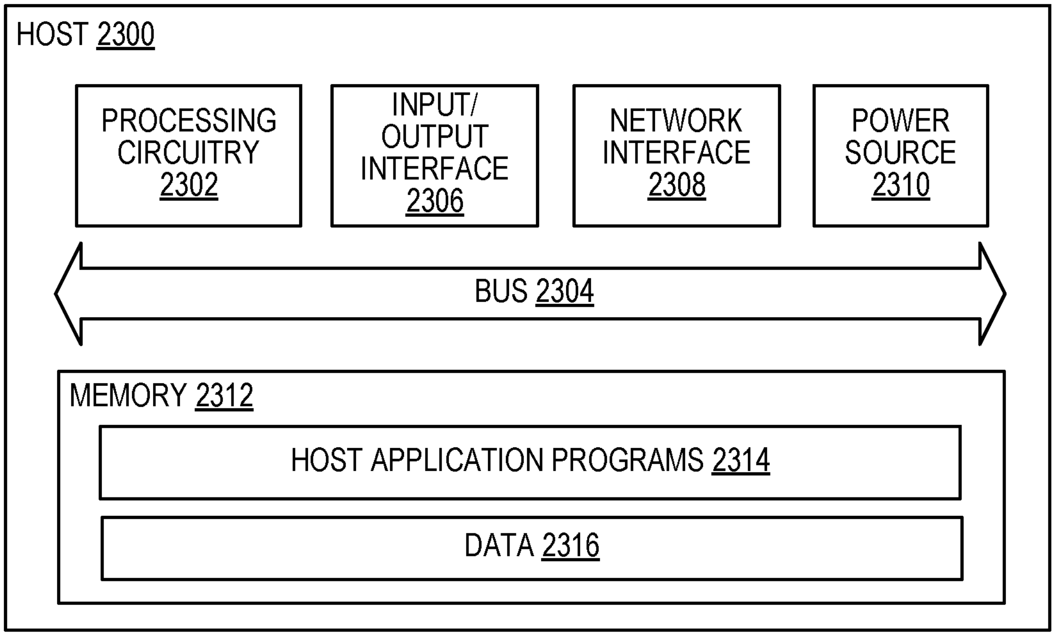
FIG. 23 shows host computing system according to various embodiments of the present disclosure.

FIG. 23 is a block diagram of a host 2300, which may be an embodiment of the host 2016 of FIG. 20, in accordance with various aspects described herein. As used herein, the host 2300 may be or comprise various combinations hardware and/or software, including a standalone server, a blade server, a cloud-implemented server, a distributed server, a virtual machine, container, or processing resources in a server farm. The host 2300 may provide one or more services to one or more UEs.

The host 2300 includes processing circuitry 2302 that is operatively coupled via a bus 2304 to an input/output interface 2306, a network interface 2308, a power source 2310, and a memory 2312. Other components may be included in other embodiments. Features of these components may be substantially similar to those described with respect to the devices of previous figures, such as FIGS. 21 and 22, such that the descriptions thereof are generally applicable to the corresponding components of host 2300.

The memory 2312 may include one or more computer programs including one or more host application programs 2314 and data 2316, which may include user data, e.g., data generated by a UE for the host 2300 or data generated by the host 2300 for a UE. Embodiments of the host 2300 may utilize only a subset or all of the components shown. The host application programs 2314 may be implemented in a container-based architecture and may provide support for video codecs (e.g., Versatile Video Coding (VVC), High Efficiency Video Coding (HEVC), Advanced Video Coding (AVC), MPEG, VP9) and audio codecs (e.g., FLAC, Advanced Audio Coding (AAC), MPEG, G.711), including transcoding for multiple different classes, types, or implementations of UEs (e.g., handsets, desktop computers, wearable display systems, heads-up display systems). The host application programs 2314 may also provide for user authentication and licensing checks and may periodically report health, routes, and content availability to a central node, such as a device in or on the edge of a core network. Accordingly, the host 2300 may select and/or indicate a different host for over-the-top services for a UE. The host application programs 2314 may support various protocols, such as the HTTP Live Streaming (HLS) protocol, Real-Time Messaging Protocol (RTMP), Real-Time Streaming Protocol (RTSP), Dynamic Adaptive Streaming over HTTP (MPEG-DASH), etc.

Figure 24:
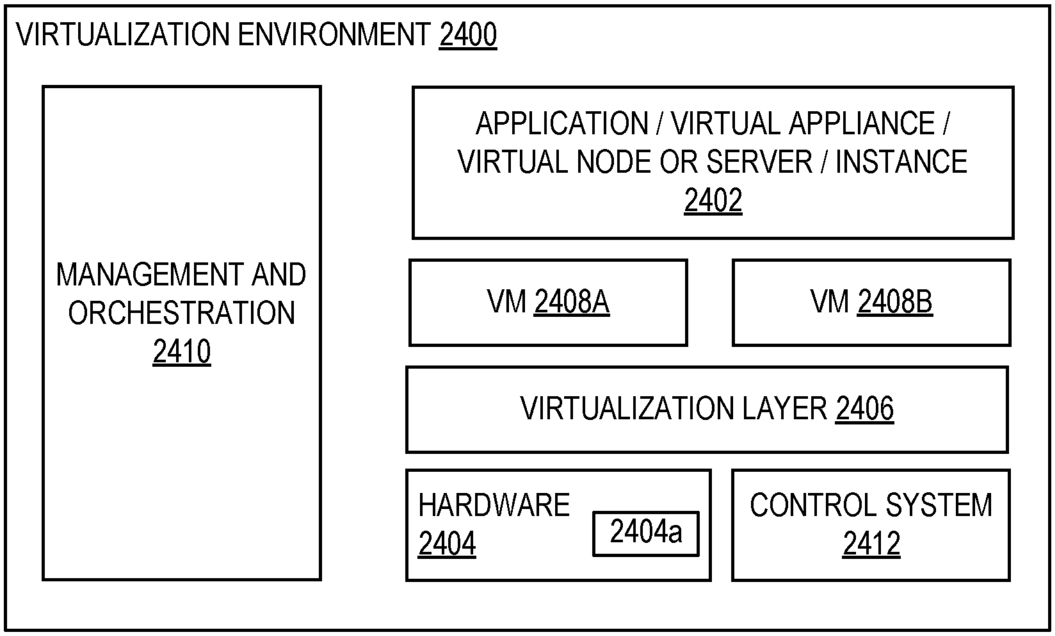
FIG. 24 is a block diagram of a virtualization environment in which functions implemented by some embodiments of the present disclosure may be virtualized.

FIG. 24 is a block diagram illustrating a virtualization environment 2400 in which functions implemented by some embodiments may be virtualized. In the present context, virtualizing means creating virtual versions of apparatuses or devices which may include virtualizing hardware platforms, storage devices and networking resources. As used herein, virtualization can be applied to any device described herein, or components thereof, and relates to an implementation in which at least a portion of the functionality is implemented as one or more virtual components. Some or all of the functions described herein may be implemented as virtual components executed by one or more virtual machines (VMs) implemented in one or more virtual environments 2400 hosted by one or more of hardware nodes, such as a hardware computing device that operates as a network node, UE, core network node, or host. Further, in embodiments in which the virtual node does not require radio connectivity (e.g., a core network node or host), then the node may be entirely virtualized.

Applications 2402 (which may alternatively be called software instances, virtual appliances, network functions, virtual nodes, virtual network functions, etc.) are run in the virtualization environment 2400 to implement some of the features, functions, and/or benefits of some of the embodiments disclosed herein.

Hardware 2404 includes processing circuitry, memory that stores software and/or instructions (collectively referred to as computer program product 2404*a*) executable by hardware processing circuitry, and/or other hardware devices as described herein, such as a network interface, input/output interface, and so forth. Software may be executed by the processing circuitry to instantiate one or more virtualization layers 2406 (also referred to as hypervisors or virtual machine monitors (VMMs)), provide VMs 2408*a* and 2408*b* (one or more of which may be generally referred to as VMs 2408), and/or perform any of the functions, features and/or benefits described in relation with some embodiments described herein. The virtualization layer 2406 may present a virtual operating platform that appears like networking hardware to the VMs 2408.

The VMs 2408 comprise virtual processing, virtual memory, virtual networking or interface and virtual storage, and may be run by a corresponding virtualization layer 2406. Different embodiments of the instance of a virtual appliance 2402 may be implemented on one or more of VMs 2408, and the implementations may be made in different ways. Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, a VM 2408 may be a software implementation of a physical machine that runs programs as if they were executing on a physical, non-virtualized machine. Each of the VMs 2408, and that part of hardware 2404 that executes that VM, be it hardware dedicated to that VM and/or hardware shared by that VM with others of the VMs, forms separate virtual network elements. Still in the context of NFV, a virtual network function is responsible for handling specific network functions that run in one or more VMs 2408 on top of the hardware 2404 and corresponds to the application 2402.

Hardware 2404 may be implemented in a standalone network node with generic or specific components. Hardware 2404 may implement some functions via virtualization. Alternatively, hardware 2404 may be part of a larger cluster of hardware (e.g., such as in a data center or CPE) where many hardware nodes work together and are managed via management and orchestration 2410, which, among others, oversees lifecycle management of applications 2402. In some embodiments, hardware 2404 is coupled to one or more radio units that each include one or more transmitters and one or more receivers that may be coupled to one or more antennas. Radio units may communicate directly with other hardware nodes via one or more appropriate network interfaces and may be used in combination with the virtual components to provide a virtual node with radio capabilities, such as a radio access node or a base station. In some embodiments, some signaling can be provided with the use of a control system 2412 which may alternatively be used for communication between hardware nodes and radio units.

Figure 25:
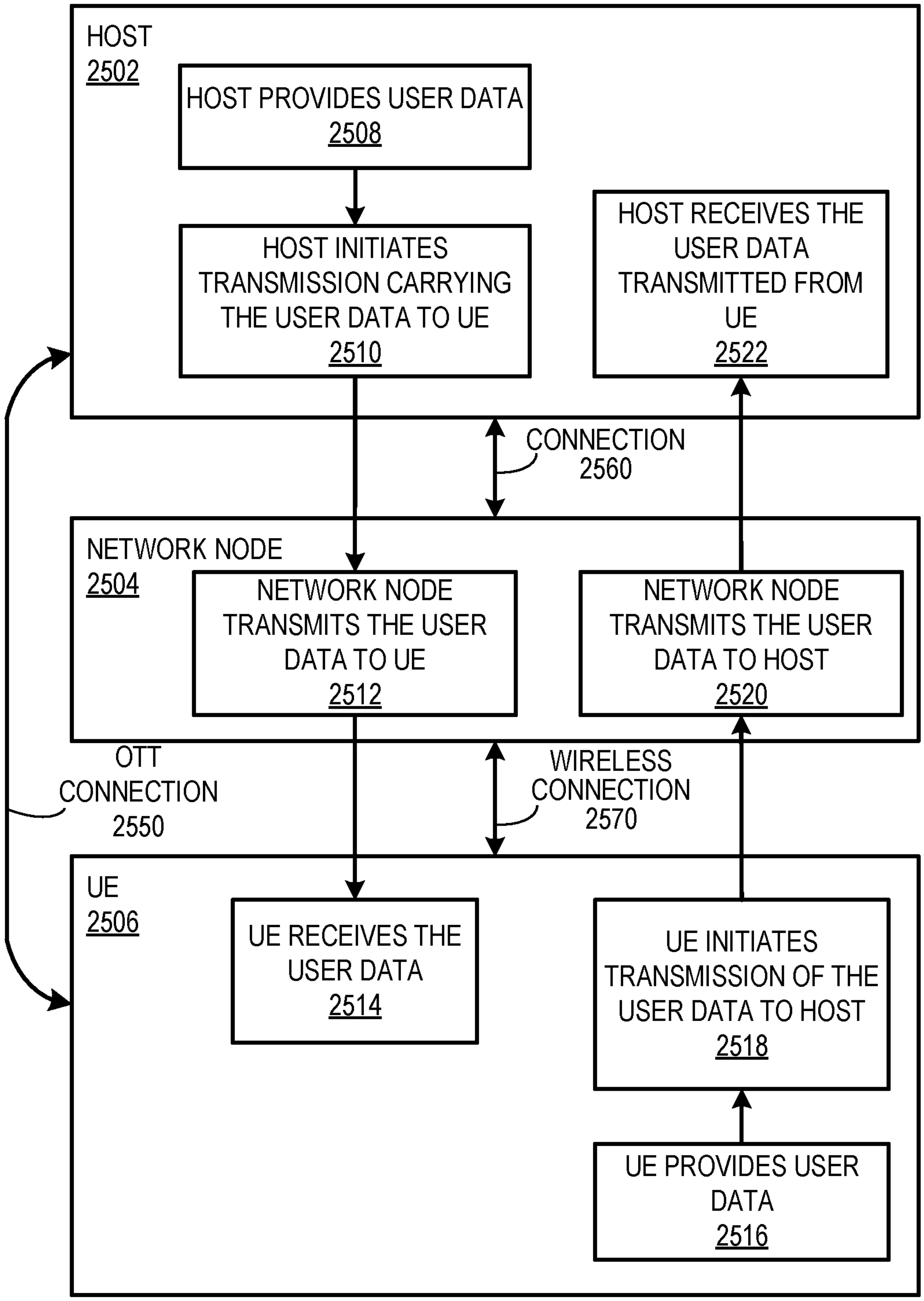
FIG. 25 illustrates communication between a host computing system, a network node, and a UE via multiple connections, at least one of which is wireless, according to various embodiments of the present disclosure.

FIG. 25 shows a communication diagram of a host 2502 communicating via a network node 2504 with a UE 2506 over a partially wireless connection in accordance with some embodiments. Example implementations, in accordance with various embodiments, of the UE (such as a UE 2012*a* of FIG. 20 and/or UE 2100 of FIG. 21), network node (such as network node 2010*a* of FIG. 20 and/or network node 2200 of FIG. 22), and host (such as host 2016 of FIG. 20 and/or host 2300 of FIG. 23) discussed in the preceding paragraphs will now be described with reference to FIG. 25.

Like host 2300, embodiments of host 2502 include hardware, such as a communication interface, processing circuitry, and memory. The host 2502 also includes software, which is stored in or accessible by the host 2502 and executable by the processing circuitry. The software includes a host application that may be operable to provide a service to a remote user, such as the UE 2506 connecting via an over-the-top (OTT) connection 2550 extending between the UE 2506 and host 2502. In providing the service to the remote user, a host application may provide user data which is transmitted using the OTT connection 2550.

The network node 2504 includes hardware enabling it to communicate with the host 2502 and UE 2506. The connection 2560 may be direct or pass through a core network (like core network 2006 of FIG. 20) and/or one or more other intermediate networks, such as one or more public, private, or hosted networks. For example, an intermediate network may be a backbone network or the Internet.

The UE 2506 includes hardware and software, which is stored in or accessible by UE 2506 and executable by the UE's processing circuitry. The software includes a client application, such as a web browser or operator-specific "app" that may be operable to provide a service to a human or non-human user via UE 2506 with the support of the host 2502. In the host 2502, an executing host application may communicate with the executing client application via the OTT connection 2550 terminating at the UE 2506 and host 2502. In providing the service to the user, the UE's client application may receive request data from the host's host application and provide user data in response to the request data. The OTT connection 2550 may transfer both the request data and the user data. The UE's client application may interact with the user to generate the user data that it provides to the host application through the OTT connection 2550.

The OTT connection 2550 may extend via a connection 2560 between the host 2502 and the network node 2504 and via a wireless connection 2570 between the network node 2504 and the UE 2506 to provide the connection between the host 2502 and the UE 2506. The connection 2560 and wireless connection 2570, over which the OTT connection 2550 may be provided, have been drawn abstractly to illustrate the communication between the host 2502 and the UE 2506 via the network node 2504, without explicit reference to any intermediary devices and the precise routing of messages via these devices.

As an example of transmitting data via the OTT connection 2550, in step 2508, the host 2502 provides user data, which may be performed by executing a host application. In some embodiments, the user data is associated with a particular human user interacting with the UE 2506. In other embodiments, the user data is associated with a UE 2506 that shares data with the host 2502 without explicit human interaction. In step 2510, the host 2502 initiates a transmission carrying the user data towards the UE 2506. The host 2502 may initiate the transmission responsive to a request transmitted by the UE 2506. The request may be caused by human interaction with the UE 2506 or by operation of the client application executing on the UE 2506. The transmission may pass via the network node 2504, in accordance with the teachings of the embodiments described throughout this disclosure. Accordingly, in step 2512, the network node 2504 transmits to the UE 2506 the user data that was carried in the transmission that the host 2502 initiated, in accordance with the teachings of the embodiments described throughout this disclosure. In step 2514, the UE 2506 receives the user data carried in the transmission, which may be performed by a client application executed on the UE 2506 associated with the host application executed by the host 2502.

In some examples, the UE 2506 executes a client application which provides user data to the host 2502. The user data may be provided in reaction or response to the data received from the host 2502. Accordingly, in step 2516, the UE 2506 may provide user data, which may be performed by executing the client application. In providing the user data, the client application may further consider user input received from the user via an input/output interface of the UE 2506. Regardless of the specific manner in which the user data was provided, the UE 2506 initiates, in step 2518, transmission of the user data towards the host 2502 via the network node 2504. In step 2520, in accordance with the teachings of the embodiments described throughout this disclosure, the network node 2504 receives user data from the UE 2506 and initiates transmission of the received user data towards the host 2502. In step 2522, the host 2502 receives the user data carried in the transmission initiated by the UE 2506.

One or more of the various embodiments improve the performance of OTT services provided to the UE 2506 using the OTT connection 2550, in which the wireless connection 2570 forms the last segment. More precisely, embodiments of the present disclosure can simplify and/or accelerate the revocation of inter-donor topology adaptation in IAB wireless networks by avoiding the need to rebuild from scratch all the configurations for serving traffic previously offloaded to another donor network and subsequently returned. More specifically, embodiments can reduce and/or eliminate excessive signaling traffic and node processing requirements associated with rebuilding such configurations according to conventional techniques. At a high level, embodiments can improve the robustness of IAB wireless networks used to deliver OTT services, which increases the value of such OTT services to both end-users and service providers.

In an example scenario, factory status information may be collected and analyzed by the host 2502. As another example, the host 2502 may process audio and video data which may have been retrieved from a UE for use in creating maps. As another example, the host 2502 may collect and analyze real-time data to assist in controlling vehicle congestion (e.g., controlling traffic lights). As another example, the host 2502 may store surveillance video uploaded by a UE. As another example, the host 2502 may store or control access to media content such as video, audio, VR or AR which it can broadcast, multicast or unicast to UEs. As other examples, the host 2502 may be used for energy pricing, remote control of non-time critical electrical load to balance power generation needs, location services, presentation services (such as compiling diagrams etc. from data collected from remote devices), or any other function of collecting, retrieving, storing, analyzing and/or transmitting data.

In some examples, a measurement procedure may be provided for the purpose of monitoring data rate, latency and other factors on which the one or more embodiments improve. There may further be an optional network functionality for reconfiguring the OTT connection 2550 between the host 2502 and UE 2506, in response to variations in the measurement results. The measurement procedure and/or the network functionality for reconfiguring the OTT connection may be implemented in software and hardware of the host 2502 and/or UE 2506. In some embodiments, sensors (not shown) may be deployed in or in association with other devices through which the OTT connection 2550 passes; the sensors may participate in the measurement procedure by supplying values of the monitored quantities exemplified above, or supplying values of other physical quantities from which software may compute or estimate the monitored quantities. The reconfiguring of the OTT connection 2550 may include message format, retransmission settings, preferred routing etc.; the reconfiguring need not directly alter the operation of the network node 2504. Such procedures and functionalities may be known and practiced in the art. In certain embodiments, measurements may involve proprietary UE signaling that facilitates measurements of throughput, propagation times, latency and the like, by the host 2502. The measurements may be implemented in that software causes messages to be transmitted, in particular empty or 'dummy' messages, using the OTT connection 2550 while monitoring propagation times, errors, etc.

As described herein, device and/or apparatus can be represented by a semiconductor chip, a chipset, or a (hardware) module comprising such chip or chipset; this, however, does not exclude the possibility that a functionality of a device or apparatus, instead of being hardware implemented, be implemented as a software module such as a computer program or a computer program product comprising executable software code portions for execution or being run on a processor. Furthermore, functionality of a device or apparatus can be implemented by any combination of hardware and software. A device or apparatus can also be regarded as an assembly of multiple devices and/or apparatuses, whether functionally in cooperation with or independently of each other. Moreover, devices and apparatuses can be implemented in a distributed fashion throughout a system, so long as the functionality of the device or apparatus is preserved. Such and similar principles are considered as known to a skilled person.

Furthermore, functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

In addition, certain terms used in the present disclosure, including the specification, drawings and embodiments thereof, can be used synonymously in certain instances, including, but not limited to, e.g., data and information. It should be understood that, while these words and/or other words that can be synonymous to one another, can be used synonymously herein, that there can be instances when such words can be intended to not be used synonymously. Further, to the extent that the prior art knowledge has not been explicitly incorporated by reference herein above, it is explicitly incorporated herein in its entirety. All publications referenced are incorporated herein by reference in their entireties.

As used herein unless expressly stated to the contrary, the phrases "at least one of" and "one or more of," followed by a conjunctive list of enumerated items (e.g., "A and B", "A, B, and C"), are intended to mean "at least one item, with each item selected from the list consisting of" the enumerated items. For example, "at least one of A and B" is intended to mean any of the following: A; B; A and B. Likewise, "one or more of A, B, and C" is intended to mean any of the following: A; B; C; A and B; B and C; A and C; A, B, and C.

As used herein unless expressly stated to the contrary, the phrase "a plurality of" followed by a conjunctive list of enumerated items (e.g., "A and B", "A, B, and C") is intended to mean "multiple items, with each item selected from the list consisting of" the enumerated items. For example, "a plurality of A and B" is intended to mean any of the following: more than one A; more than one B; or at least one A and at least one B.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements, and procedures that, although not explicitly shown or described herein, embody the principles of the disclosure and can be thus within the spirit and scope of the disclosure. Various embodiments can be used together with one another, as well as interchangeably therewith, as should be understood by those having ordinary skill in the art.

Example embodiments of the techniques and apparatus described herein include, but are not limited to, the following enumerated embodiments:

A1. A method for a source donor centralized unit (CU) in an integrated access backhaul (IAB) wireless network, the method comprising:
- providing, to one or more descendant nodes of the source donor CU, at least one configuration for traffic between the source donor CU and a top-level IAB node in the wireless network;
- determining that the traffic between the source donor CU and the top-level IAB node needs to be offloaded to a target donor CU in the wireless network; and
- sending, to the one or more descendant nodes, a first indication that that the at least one configuration is suspended.

A2. The method of embodiment A1, wherein the first indication includes one of the following:

respective first identifiers of the at least one configuration; or respective second identifiers of at least one descendant node that needs to be migrated to the target donor CU, wherein each configuration is associated with only one of the descendant nodes.

A3. The method of any of embodiments A1-A2, further comprising:

after offloading the traffic to the target donor CU, determining that the traffic no longer needs to be offloaded to the target donor CU; and sending, to the one or more descendant nodes, a second indication that that the at least one configuration is reactivated.

A4. The method of embodiment A3, further comprising, in response to determining that the traffic no longer needs to be offloaded, sending to the target donor CU a third indication that the offloading is revoked.

A5. The method of any of embodiments A1-A4, wherein:

the descendant nodes of the source donor CU include the top-level IAB node and a source donor distributed unit (DU); and the at least one configuration for the traffic between the source donor DU and the top-level IAB node includes any of the following:

mapping configurations for downlink (DL) traffic at the source donor DU;

mapping configurations for uplink (UL) traffic at the top-level IAB node; and Internet Protocol (IP) addresses used by the top-level IAB node.

A6. The method of embodiment A5, wherein:

the descendant nodes of the source donor CU also include one or more ancestor nodes of the top-level IAB node; and the at least one configuration for the traffic between the source donor DU and the top-level IAB node also includes any of the following at the ancestor nodes of the top-level IAB node:

ingress-egress mapping configurations for backhaul radio link control (BH RLC) channels; and backhaul adaptation protocol (BAP) routing tables.

A7. The method of any of embodiments A5-A6, wherein:

the descendant nodes of the source donor CU also include one or more descendant nodes of the top-level IAB node; and the at least one configuration for the traffic between the source donor DU and the top-level IAB node also includes any of the following used by the descendant nodes of the top-level IAB node: Internet Protocol (IP) addresses, and cell resource configurations.

A8. The method of any of embodiments A1-A7, wherein the traffic between the source donor CU and the top-level IAB node includes traffic between the source donor CU and any of the following:

a distributed unit (DU) part of the top-level IAB node;

one or more IAB nodes that are descendants of the top-level IAB node;

user equipment (UEs) served by the top-level IAB node; and UEs served by the one or more IAB nodes.

A9. The method of any of embodiments A1-A8, further comprising offloading the traffic to the target donor CU based on one of the following:

a proxy-based migration in which the top-level IAB's mobile terminal (MT) part migrates to the target donor CU, but the F1 and RRC connections of top-level IAB's distributed unit (DU) part and all descendant nodes of the top-level IAB node remain anchored at the source donor CU; or a full migration in which all F1 and RRC connections of the top-level IAB and all descendant nodes of the top-level IAB node are migrated to the target donor CU.

B1. A method for a target donor centralized unit (CU) in an integrated access backhaul (IAB) wireless network, the method comprising:

receiving, from a source donor CU in the wireless network, an indication that traffic between the source donor CU and a top-level IAB node in the wireless network needs to be offloaded to the target donor CU;

migrating one or more descendant nodes of the source donor CU to the target donor CU such that the target donor CU handles the offloaded traffic; and receiving, from the source donor CU, an indication that the offloading is revoked.

B2. The method of embodiment B1, wherein the traffic between the source donor CU and the top-level IAB node includes traffic between the source donor CU and any of the following:

a distributed unit (DU) part of the top-level IAB node;

one or more IAB nodes that are descendants of the top-level IAB node;

user equipment (UEs) served by the top-level IAB node; and

UEs served by the one or more IAB nodes.

B3. The method of any of embodiments B1-B2, wherein migrating the one or more descendant nodes is based on one of the following:

a proxy-based migration in which the top-level IAB's mobile terminal (MT) part migrates to the target donor CU, but the F1 and RRC connections of top-level IAB's distributed unit (DU) part and all descendant nodes of the top-level IAB node remain anchored at the source donor CU; or a full migration in which all F1 and RRC connections of the top-level IAB and all descendant nodes of the top-level IAB node are migrated to the target donor CU.

B4. The method of any of embodiments B1-B3, further comprising, based on the indication that the offloading is revoked, migrating the one or more descendant nodes from the target donor CU to the source donor CU such that the source donor CU handles the traffic.

C1. A method, for an integrated access backhaul (IAB) node in a wireless network, the method comprising:

receiving, from a source donor centralized unit (CU) in the wireless network, at least one configuration for traffic between the source donor CU and a top-level IAB node in the wireless network;

receiving, from the source donor CU, a first indication that that the at least one configuration is suspended; and migrating from the source donor CU to the target donor CU such that the target donor CU handles the traffic between the source donor CU and the top-level IAB node.

C2. The method of embodiment C1, wherein the first indication includes one of the following:

respective first identifiers of the at least one configuration; or respective second identifiers of at least one descendant node that needs to be migrated to the target donor CU, wherein each configuration is associated with only one of the descendant nodes.

C3. The method of any of embodiments C1-C2, further comprising:
- receiving, from the source donor CU, a second indication that that the at least one configuration is reactivated; and
- migrating from the target donor CU to the source donor CU such that the source donor CU handles the traffic between the source donor CU and the top-level IAB node.

C4. The method of any of embodiments C1-C3, wherein:
- the IAB node is the top-level IAB node; and
- the at least one configuration for the traffic between the source donor DU and the top-level IAB node includes any of the following:
  - mapping configurations for downlink (DL) traffic at a source donor distributed unit (DU) associated with the source donor CU;
  - mapping configurations for uplink (UL) traffic at the top-level IAB node; and
  - Internet Protocol (IP) addresses used by the top-level IAB node.

C5. The method of any of embodiments C1-C3, wherein:
- the IAB node is an ancestor node of the top-level IAB node; and
- the at least one configuration for the traffic between the source donor DU and the top-level IAB node includes any of the following:
  - ingress-egress mapping configurations for backhaul radio link control (BH RLC) channels at the IAB node; and
  - backhaul adaptation protocol (BAP) routing tables at the IAB node.

C6. The method of any of embodiments C1-C3, wherein:
- the IAB node is a descendant node of the top-level IAB node; and
- the at least one configuration for the traffic between the source donor DU and the top-level IAB node includes any of the following used by the IAB node: Internet Protocol (IP) addresses, and cell resource configurations.

C7. The method of any of embodiments C1-C6, wherein the traffic between the source donor CU and the top-level IAB node includes traffic between the source donor CU and any of the following:
- a distributed unit (DU) part of the top-level IAB node;
- one or more IAB nodes that are descendants of the top-level IAB node;
- user equipment (UEs) served by the top-level IAB node; and
- UEs served by the one or more IAB nodes.

C8. The method of any of embodiments A1-A8, wherein migrating from the source donor CU to the target donor CU is based on one of the following:
- a proxy-based migration in which the top-level IAB's mobile terminal (MT) part migrates to the target donor CU, but the F1 and RRC connections of top-level IAB's distributed unit (DU) part and all descendant nodes of the top-level IAB node remain anchored at the source donor CU; or
- a full migration in which all F1 and RRC connections of the top-level IAB and all descendant nodes of the top-level IAB node are migrated to the target donor CU.

D1. A source donor centralized unit (CU) in an integrated access backhaul (IAB) wireless network, the source donor CU comprising:
- communication interface circuitry configured to communicate with a target donor CU and one or more descendant nodes of the source donor CU; and
- processing circuitry operably coupled to the communication interface circuitry, whereby the processing circuitry and the communication interface circuitry are configured to perform operations corresponding to any of the methods of embodiments A1-A9.

D2. A source donor centralized unit (CU) in an integrated access backhaul (IAB) wireless network, the source donor CU being configured to perform operations corresponding to any of the methods of embodiments A1-A9.

D3. A non-transitory, computer-readable medium storing computer-executable instructions that, when executed by processing circuitry of a source donor centralized unit (CU) in an integrated access backhaul (IAB) wireless network, configure the source donor CU to perform operations corresponding to any of the methods of embodiments A1-A9.

D4. A computer program product comprising computer-executable instructions that, when executed by processing circuitry of a source donor centralized unit (CU) in an integrated access backhaul (IAB) wireless network, configure the source donor CU to perform operations corresponding to any of the methods of embodiments A1-A9.

E1. A target donor centralized unit (CU) in an integrated access backhaul (IAB) wireless network, the target donor CU comprising:
- communication interface circuitry configured to communicate with a source donor CU and one or more descendant nodes of the source donor CU; and
- processing circuitry operably coupled to the communication interface circuitry, whereby the processing circuitry and the communication interface circuitry are configured to perform operations corresponding to any of the methods of embodiments C1-C3.

E2. A target donor centralized unit (CU) in an integrated access backhaul (IAB) wireless network, the target donor CU being configured to perform operations corresponding to any of the methods of embodiments C1-C3.

E3. A non-transitory, computer-readable medium storing computer-executable instructions that, when executed by processing circuitry of a target donor centralized unit (CU) in an integrated access backhaul (IAB) wireless network, configure the target donor CU to perform operations corresponding to any of the methods of embodiments C1-C3.

E4. A computer program product comprising computer-executable instructions that, when executed by processing circuitry of a target donor centralized unit (CU) in an integrated access backhaul (IAB) wireless network, configure the target donor CU to perform operations corresponding to any of the methods of embodiments C1-C3.

F1. An integrated access backhaul (IAB) node configured to operate in a wireless network, the IAB node comprising:
- radio interface circuitry and processing circuitry configured as a mobile terminal (IAB-MT) and a distributed unit (IAB-DU), wherein the processing circuitry and radio interface circuitry are further configured to perform operations corresponding to any of the methods of embodiments C1-C8.

F2. An integrated access backhaul (IAB) node configured to operate in a wireless network, the IAB node being configured as a mobile terminal (IAB-MT) and a distributed unit (IAB-DU) and being further configured to perform operations corresponding to any of the methods of embodiments C1-C8.

F3. A non-transitory, computer-readable medium storing computer-executable instructions that, when executed by processing circuitry of an integrated access backhaul (IAB) node, configure the IAB node to perform operations corresponding to any of the methods of embodiments C1-C8.

F4. A computer program product comprising computer-executable instructions that, when executed by processing circuitry of an integrated access backhaul (IAB) node, configure the IAB node to perform operations corresponding to any of the methods of embodiments C1-C8.

The invention claimed is:

1. A method for a source donor centralized unit (CU) in an integrated access backhaul (IAB) wireless network, the method comprising:

determining that traffic between the source donor CU and a top-level IAB node in the wireless network needs to be offloaded to a target donor CU in the wireless network;

sending, to one or more descendant nodes of the source donor CU, a first indication that at least one configuration for traffic between the source donor CU and at least one IAB node is suspended, in association with migration of the top-level IAB node from the source donor CU to the target donor CU;

after offloading the traffic to the target donor CU, determining that the traffic no longer needs to be offloaded to the target donor CU; and sending, to the one or more descendant nodes, a second indication that that the at least one suspended configuration is reactivated.

2. The method of claim 1, wherein the first indication includes one of the following:

respective first identifiers of the at least one configuration; or respective second identifiers of at least one descendant node that needs to be migrated to the target donor CU, wherein each configuration is associated with only one of the descendant nodes.

3. The method of claim 1, further comprising, in response to determining that the traffic no longer needs to be offloaded, sending to the target donor CU a third indication that the offloading is revoked.

4. The method of claim 1, wherein:

the descendant nodes of the source donor CU include the top-level IAB node and a source donor distributed unit (DU); and the at least one configuration for the traffic between the source donor DU and the top-level IAB node includes any of the following:

mapping configurations for downlink (DL) traffic at the source donor DU;

mapping configurations for uplink (UL) traffic at the top-level IAB node; and

Internet Protocol (IP) addresses used by the top-level IAB node, ingress-egress mapping configurations for backhaul radio link control (BH RLC) channels at the top-level IAB node; and backhaul adaptation protocol (BAP) routing tables at the top-level IAB node.

5. The method of claim 4, wherein:

the descendant nodes of the source donor CU also include one or more ancestor nodes of the top-level IAB node; and the at least one configuration for the traffic between the source donor DU and the top-level IAB node also includes any of the following at the ancestor nodes of the top-level IAB node:

ingress-egress mapping configurations for backhaul radio link control (BH RLC) channels; and backhaul adaptation protocol (BAP) routing tables.

6. The method of claim 4, wherein:

the descendant nodes of the source donor CU also include one or more descendant nodes of the top-level IAB node; and the at least one configuration for the traffic between the source donor DU and the top-level IAB node also includes any of the following used by the descendant nodes of the top-level IAB node: Internet Protocol (IP) addresses, and cell resource configurations.

7. The method of claim 1, wherein the traffic between the source donor CU and the at least one IAB node, for which the at least one configuration is suspended, includes traffic between the source donor CU and any of the following:

a distributed unit (DU) part of the top-level IAB node;

one or more IAB nodes that are descendant nodes of the top-level IAB node; and user equipment (UEs) served by the top-level IAB node or any of the descendent nodes.

8. The method of claim 1, further comprising offloading the traffic to the target donor CU based on one of the following:

a proxy-based migration in which the top-level IAB node's mobile terminal (MT) part migrates to the target donor CU, but F1 and radio resource control (RRC) connections of top-level IAB node's distributed unit (DU) part and of all descendant nodes of the top-level IAB node remain anchored at the source donor CU; or a full migration in which all F1 and RRC connections of the top-level IAB and all descendant nodes of the top-level IAB node are migrated to the target donor CU.

9. A method for a target donor centralized unit (CU) in an integrated access backhaul (IAB) wireless network, the method comprising:

receiving, from a source donor CU in the wireless network, an indication that traffic between the source donor CU and a top-level IAB node in the wireless network needs to be offloaded to the target donor CU;

migrating one or more descendant nodes of the source donor CU to the target donor CU such that the target donor CU handles the offloaded traffic;

receiving, from the source donor CU, an indication that the offloading is revoked; and based on the indication that the offloading is revoked, migrating the one or more descendant nodes from the target donor CU to the source donor CU such that the source donor CU handles the traffic for which offloading was revoked.

10. The method of claim 9, wherein the offloaded traffic includes traffic between the source donor CU and any of the following:

a distributed unit (DU) part of the top-level IAB node;

one or more IAB nodes that are descendant nodes of the top-level IAB node; and user equipment (UEs) served by the tope-level IAB node or any of the descendant nodes.

11. The method of claim 9, wherein migrating the one or more descendant nodes of the source donor CU to the target donor CU is based on one of the following:

a proxy-based migration in which the top-level IAB node's mobile terminal (MT) part migrates to the target donor CU, but F1 and radio resource control (RRC) connections of top-level IAB node's distributed unit (DU) part and of all descendant nodes of the top-level IAB node remain anchored at the source donor CU; or a full migration in which all F1 and RRC connections of the top-level IAB and of all descendant nodes of the top-level IAB node are migrated to the target donor CU.

12. A method for an integrated access backhaul (IAB) node in a wireless network, the method comprising:

receiving, from a source donor centralized unit (CU) in the wireless network, a first indication that at least one configuration for traffic between the source donor CU and at least one IAB node is suspended, in association with migration of a top-level IAB node from the source donor CU to a target donor CU in the wireless network, wherein the IAB node is a descendant node or an ancestor node of the top-level IAB node;

suspending the at least one configuration in accordance with the first indication;

receiving, from the source donor CU, a second indication that that the at least one suspended configuration is reactivated; and reactivating the at least one suspended configuration in accordance with the second indication.

13. The method of claim 12, further comprising:

after or in conjunction with suspending the at least one configuration, performing a first migration from the source donor CU to the target donor CU such that the target donor CU handles the traffic between the source donor CU and the IAB node; and after or in conjunction with reactivating the at least one configuration, performing a second migration from the target donor CU to the source donor CU such that the source donor CU handles the traffic between the source donor CU and the IAB node according to the at least one configuration.

14. The method of claim 13, wherein the IAB node is a descendant node of the top-level IAB node, and the first migration is a full migration in which all F1 and RRC connections of the top-level IAB and of all descendant nodes of the top-level IAB node are migrated to the target donor CU.

15. The method of claim 12, wherein the first indication includes one of the following:

respective first identifiers of the at least one configuration; or respective second identifiers of at least one descendant node that needs to be migrated to the target donor CU, wherein each configuration is associated with only one of the descendant nodes.

16. The method of claim 12, wherein:

the IAB node is a descendant node of the top-level IAB node;

the at least one configuration includes a configuration for traffic between the source donor CU and the IAB node; and the configuration for the traffic between the source donor DU and the IAB node includes any of the following used by the IAB node: Internet Protocol (IP) addresses; and cell resource configurations.

17. The method of claim 12, wherein:

the IAB node is an ancestor node of the top-level IAB node;

the at least one configuration includes a configuration for traffic between the source donor CU and the IAB node; and the at least one configuration for the traffic between the source donor DU and the IAB node also includes any of the following at the IAB node:

ingress-egress mapping configurations for backhaul radio link control (BH RLC) channels; and backhaul adaptation protocol (BAP) routing tables.

18. The method of claim 12, wherein the traffic between the source donor CU and the at least one IAB node, for which the at least one configuration is suspended, includes traffic between the source donor CU and any of the following:

a distributed unit (DU) part of the IAB node;

one or more IAB nodes that are descendant nodes of the IAB node; and user equipment (UEs) served by the IAB node or any of the descendant nodes of the IAB node.

19. A source donor centralized unit (CU) configured to operate in an integrated access backhaul (IAB) wireless network, the source donor CU comprising communication interface circuitry and processing circuitry that are operably coupled and are configured to perform the method of claim 1.

20. A target donor centralized unit (CU) configured to operate in an integrated access backhaul (IAB) wireless network, the target donor CU comprising communication interface circuitry and processing circuitry that are operably coupled and are configured to perform the method of claim 9.

21. An integrated access backhaul (IAB) node configured to operate in a wireless network, the IAB node comprising:

processing circuitry and communication interface circuitry configured as a mobile terminal, IAB-MT, and a distributed unit, IAB-DU, wherein the processing circuitry and communication interface circuitry are further configured to perform the method of claim 12.

* * * * *